United States Patent
Cha et al.

(10) Patent No.: US 10,436,318 B2
(45) Date of Patent: Oct. 8, 2019

(54) CONTROLLING APPARATUS FOR TRANSMISSION

(71) Applicant: SL Corporation, Daegu (KR)

(72) Inventors: Hong Jun Cha, Daegu (KR); Young Eon Jung, Daegu (KR); Tae Won Park, Daegu (KR); Chang Su Lee, Daegu (KR); Keon Chan Ahn, Daegu (KR); Dong Hwan Lee, Daegu (KR)

(73) Assignee: SL Corporation, Daegu (KR)

( * ) Notice: Subject to any disclaimer, the term of this patent is extended or adjusted under 35 U.S.C. 154(b) by 33 days.

(21) Appl. No.: 15/856,767

(22) Filed: Dec. 28, 2017

(65) Prior Publication Data

US 2018/0180177 A1    Jun. 28, 2018

(30) Foreign Application Priority Data

Dec. 28, 2016  (KR) .................. 10-2016-0180734
Nov. 20, 2017  (KR) .................. 10-2017-0154962

(51) Int. Cl.
*F16H 61/32*    (2006.01)
*F16H 61/00*    (2006.01)
(Continued)

(52) U.S. Cl.
CPC ......... *F16H 61/32* (2013.01); *F16H 61/0003* (2013.01); *F16H 61/0006* (2013.01); *F16H 61/28* (2013.01); *F16H 63/3491* (2013.01)

(58) Field of Classification Search
CPC .. F16H 61/32; F16H 61/0003; F16H 61/0006; F16H 61/28; F16H 63/3491
See application file for complete search history.

(56) References Cited

U.S. PATENT DOCUMENTS 9,394,991 B2 *   7/2016  Swaita ............... F16H 61/22
10,234,028 B2 *  3/2019  Jeon .................. F16H 61/28
(Continued)

FOREIGN PATENT DOCUMENTS

WO     2009/066306 A1    5/2009

OTHER PUBLICATIONS

Extended European Search Report dated May 24, 2018 issued in counterpart European Patent Application 17210852.4.

*Primary Examiner* — Zakaria Elahmadi
(74) *Attorney, Agent, or Firm* — Mintz Levin Cohn Ferris Glovsky and Popeo, P.C.; Kongsik Kim; Jhongwoo Jay Peck

(57) ABSTRACT

A controlling apparatus for a transmission capable of returning a shift stage of the transmission to an initial stage is provided. The apparatus includes a first gear component configured to rotate based on a driving force provided from a driving component, an output component configured to generate an operating force to control the transmission an elastic component with a first end fixed and a second end supported by the output component, a driving force transfer component configured to be selectively coupled to the output component to transfer the driving force from the first gear component to the output component and a returning component configured to actuate the driving force transfer component to be separated from the output component. The output component includes a shaft configured to be connected to the transmission, and the first gear component and the driving force transfer component are configured to rotate around the shaft.

20 Claims, 50 Drawing Sheets

(51) Int. Cl.
    *F16H 61/28*     (2006.01)
    *F16H 63/34*     (2006.01)

(56) References Cited

U.S. PATENT DOCUMENTS

| | | | |
|---|---|---|---|
| 2010/0275716 A1* | 11/2010 | Mourad | F16H 63/18 74/473.36 |
| 2011/0107862 A1* | 5/2011 | Jeong | F16H 61/32 74/473.3 |
| 2011/0126657 A1* | 6/2011 | Ganter | F16H 61/12 74/473.12 |
| 2013/0305855 A1* | 11/2013 | Skogward | F16H 61/32 74/89.14 |
| 2015/0126318 A1* | 5/2015 | Larkin | B60K 17/344 475/149 |
| 2016/0312882 A1* | 10/2016 | Heo | F16H 59/08 |
| 2017/0175885 A1* | 6/2017 | Jeon | F16H 61/28 |

* cited by examiner

1

CONTROLLING APPARATUS FOR TRANSMISSION

CROSS-REFERENCE TO RELATED APPLICATION

This application claims priority from Korean Patent Application No. 10-2016-0180734 filed on Dec. 28, 2016 and Korean Patent Application No. 10-2017-0154962 filed on Nov. 20, 2017, the disclosures of which are incorporated herein by reference in its entirety.

TECHNICAL FIELD

The present disclosure relates to a controlling apparatus for a transmission, and more particularly, to a controlling apparatus for a transmission capable of returning a shift stage of a transmission to an initial stage.

RELATED ART

In general, the transmission is controlled to adjust a gear ratio in order to maintain a rotational speed of an engine constant in accordance with the vehicle speed, and a shift lever is disposed within the vehicle to allow a driver to adjust the gear ratio of the transmission.

Transmissions include several shift modes. In a manual shift mode, the driver manually shifts the gear, and in an automatic shift mode, the gear is automatically selected based on the vehicle speed when at a drive stage (D). Some vehicles also include a sports mode, which is a combination of the manual and automatic shift modes. In the sports mode, the transmission primarily operates in the automatic mode while still giving the driver an ability to manually shift the gear up or down.

Recently, shift-by-wire systems are replacing mechanical shift levers. While the mechanical shift lever is connected to the transmission by a mechanical cable, the electronic shift lever in the shift-by-wire system produces an operating signal corresponding to the manipulation of the shift lever by the driver, and the operation signal is transferred to control the transmission. The shift-by-wire system does not transfer the shift lever operating force of the driver to the transmission via mechanically-connecting structures, but transfers the operating signal corresponding to the driver manipulation of the shift lever to the transmission including the actuator or the like from the electronic shift lever to control the transmission.

The shift-by-wire system does not include mechanically-connecting structure and transfers the driver's shift lever operation by the electrical signal. Accordingly, the shift-by-wire system has an improved lever-operating force and an improved tactile operation; reduces the required area; and has a simplified operation.

The shift-by-wire system typically returns the shift stage to the initial stage when the driver finishes driving and turns off the vehicle to prevent an occurrence of confusion when the driver operates the vehicle again. However, in an emergency situation such as abnormal turning-off of the startup of the vehicle or discharging of battery, when the shift stage is not returned to the initial stage, there is an increased possibility for an accident. Accordingly, an approach for returning the shift stage to the initial stage in the case of an emergency is required.

SUMMARY

Aspects of the present disclosure provide a controlling apparatus for a transmission capable of returning the shift stage of the transmission to the initial stage when at least one returning condition is satisfied.

In an aspect of an exemplary embodiment of the present disclosure, a controlling apparatus for a transmission may include a first gear component which is configured to rotate based on a driving force provided from a driving component, an output component which is configured to generate an operating force to control the transmission, an elastic component which is fixed at a first end and supported at a second end by the output component, a driving force transfer component that is configured to be selectively coupled to the output component to transfer the driving force from the first gear component to the output component, a returning component which is configured to actuate the driving force transfer component to be separated from the output component when at least one returning condition is satisfied. The output component may include a shaft coupled to the transmission, and the first gear component and the driving force transfer component may be configured to rotate around the shaft.

In some exemplary embodiments, the first gear component may include an extending portion which extends in a lengthwise direction of the shaft from a periphery of a first aperture through which the shaft passes, and a first end of the elastic component may be inserted into a fixing groove formed on one side of the extending portion. The first gear component may include an insertion rib which is inserted into an insertion groove formed in the driving force transfer component, and the insertion rib may be formed to extend from the extending portion toward the driving force transfer component to enable the driving force transfer component to be movable along the insertion rib.

In other exemplary embodiments, the controlling apparatus for the transmission may further include a rotary component which may be coupled with the shaft and configured to around the shaft, having a support portion formed to support the second end of the elastic component. The support portion may be formed on a side of an outer peripheral end of the rotary component. The support portion may include a support groove, and a support pin inserted into the support groove to support the second end of the elastic component.

Additionally, the driving force transfer component may include a coupling rib configured to be selectively inserted into a coupling groove formed in the rotary component, and the coupling rib may be detached from the coupling groove when the output component and the driving force transfer component are separated from each other. The coupling groove may include a guide surface which is inclined at a predetermined angle from a first end to a second end disposed at one side of the insertion port into which the coupling rib is inserted. The coupling rib may be guided into the coupling groove by the guide surface when the driving force transfer component is rotated by the driving component.

The controlling apparatus for the transmission may further include a stopper disposed on a rotary path of the support portion to restrict the rotation of the driving force transfer component. The output component may be configured to rotate to a point where the support portion abuts the stopper to enable the shaft to be rotated to a parking stage position. After the output component and the driving force transfer component are separated from each other and the shaft is returned to the parking stage position, the driving component may be configured to rotate the first gear component to enable the output component and the driving force transfer component to be coupled with each other and the elastic component to be compressed.

The controlling apparatus for the transmission may further include a second gear component which may be configured to rotate about the shaft to enable the driving force transfer component to be separated from the output component. A returning component may be configured to rotate the second gear component to enable the driving force transfer component to be axially displaced along the shaft to separate the output component and the driving force transfer component from each other. The second gear component may be configured to displace the driving force transfer component away from the rotary component and toward the first gear component to enable the output component and the driving force transfer component to be separated from each other.

The driving force transfer component may include a first protruding portion formed on a surface facing the second gear component, the second gear component may include a second protruding portion formed on a surface facing the driving force transfer component, and the first protruding portion and the second protruding portion may have the same rotary path. The first protruding portion and the second protruding portion may have inclined contact surfaces that abut each other. The driving force transfer component may be separated from the output component when one of the first protruding portion or the second protruding portion is disposed on the upper side of the other thereof. The first protruding portion may be disposed to protrude toward the second gear component through a passage aperture formed in the rotary component. Further, the first protruding portion may be disposed at a first end of the passage aperture by the restoring force of the elastic component when the output component and the driving force transfer component are separated from each other. The first protruding portion may be disposed at a second end of the passage aperture while the elastic component is compressed when the output component and the driving force transfer component are coupled with each other.

In some exemplary embodiment, the first gear component may include a first rod formed to pass through an insertion aperture formed in the output component. The driving force transfer component may include a second rod coupled to the first rod through the insertion aperture. The first rod may be disposed at a first end of the insertion aperture while the elastic component is compressed when the output component and the driving force transfer component are coupled with each other, and the first rod may be configured to be disposed at a second end of the insertion aperture by the restoring force of the elastic component when the output component and the driving force transfer component are separated from each other. The first rod or the second rod may include an insertion groove formed therein, and the other of the first or second rods is inserted into the insertion groove. A spring component may be disposed in the insertion groove formed in the first rod or the second rod to enable position of the driving force transfer component to be variable by movement of the second rod in a direction of compressing or relaxing the spring component.

The controlling apparatus for the transmission may further include a spring component disposed between the first gear component and the driving force transfer component. The spring component may be compressed when the driving force transfer component is displaced in a direction of being separated from the output component by a force applied to the driving force transfer component. On the other hand, a restoring force may be generated to enable the driving force transfer component to be displaced in a direction of being coupled with the output component when the force applied to the driving force transfer component is removed. The driving force transfer component may be configured to rotate in a direction opposite to the output component by the restoring force of the elastic component when the driving force transfer component is separated from the output component.

In another exemplary embodiment of the present disclosure, the shaft may include a first end which is configured to be connected to the transmission, and a second end to which a working tool for manually operating the transmission may be connected.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
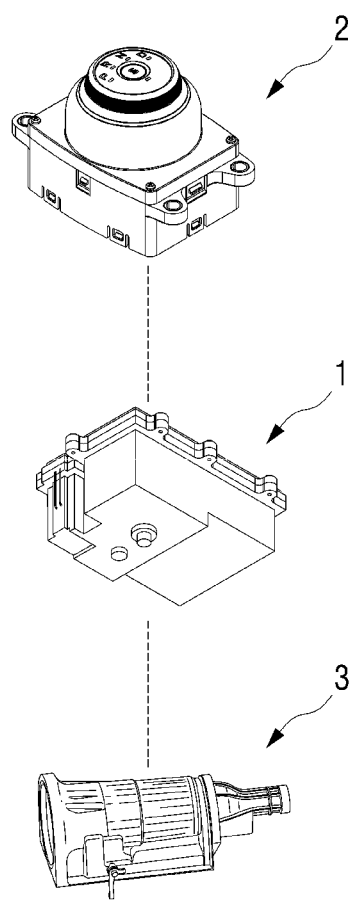
FIG. 1 is an exemplary schematic view illustrating a controlling apparatus for a transmission according to an exemplary embodiment of the present disclosure.
Figure 2:
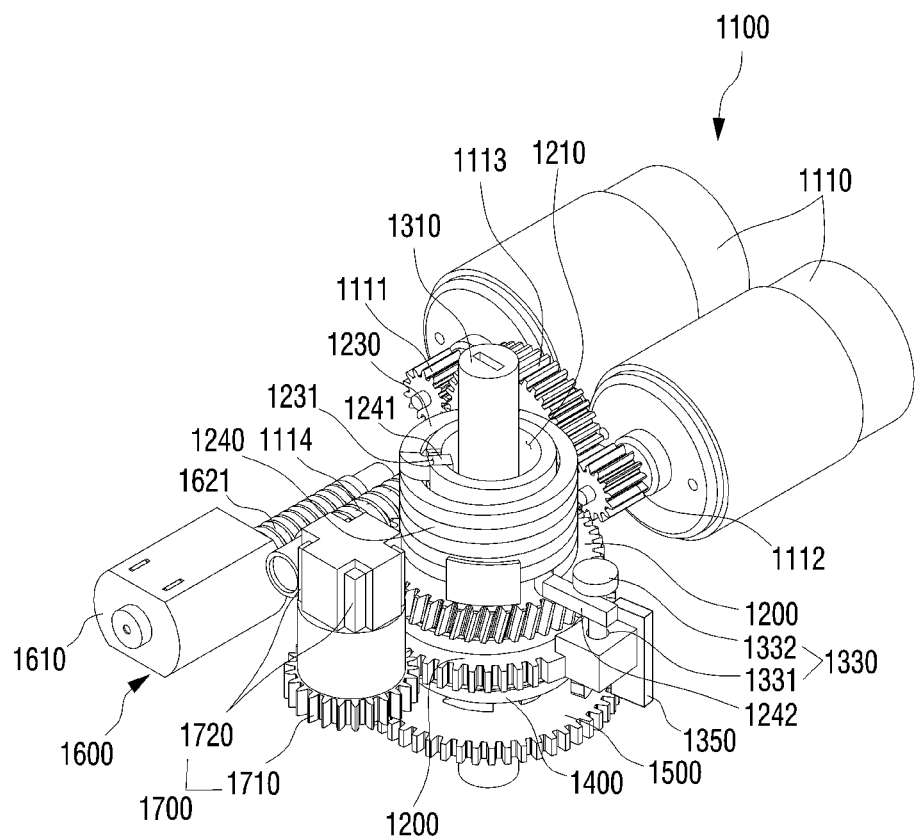
FIGS. 2 to 5 are exemplary perspective views illustrating the controlling apparatus for the transmission according to an exemplary embodiment of the present disclosure.
Figure 3:
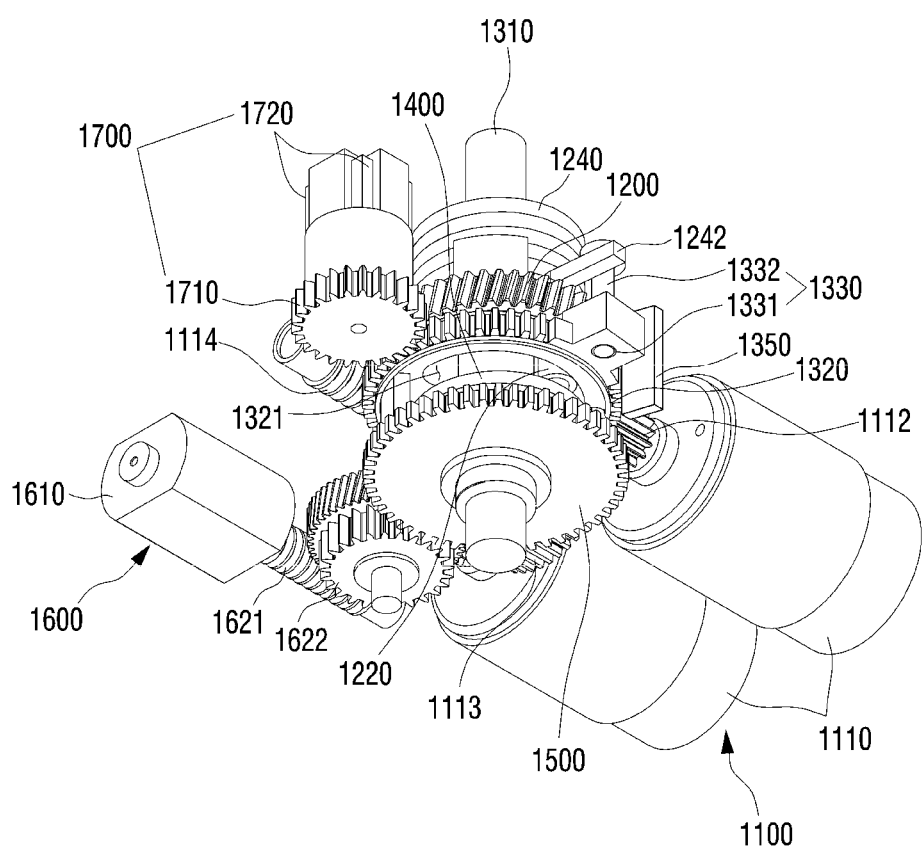
Figure 4:
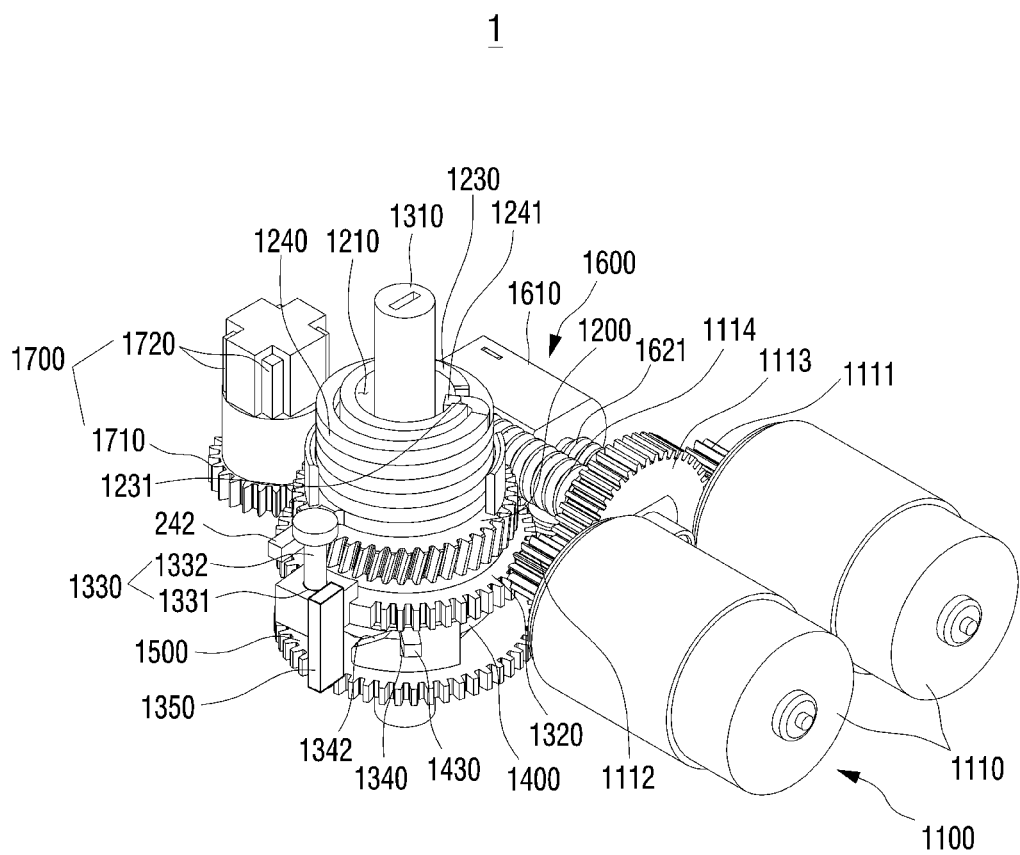
Figure 5:
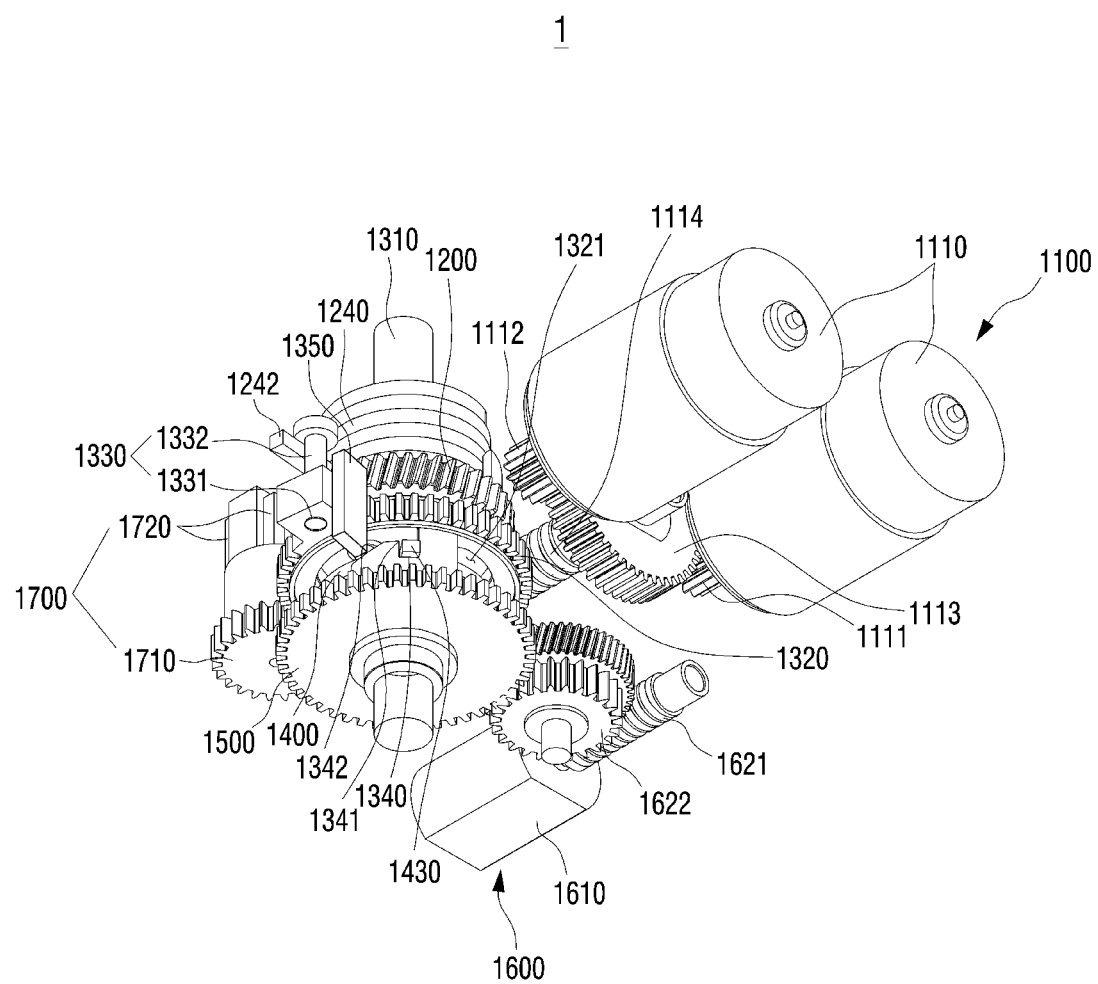

Advantages and features of the present disclosure and methods of achieving the same will become apparent with reference to the exemplary embodiments described in detail below in conjunction with the accompanying drawings. However, the present disclosure is not limited to the exemplary embodiments disclosed below, but may be provided in various different forms. The present exemplary embodiments are merely provided to make the disclosure complete and to fully inform the category of the disclosure to a person having ordinary knowledge in the technical field to which the present disclosure pertains, and the present disclosure is only defined by the scope of the claims. The same reference numerals refer to the same constituent elements throughout the specification.

Accordingly, in some embodiments, well-known process steps, well-known structures and well-known techniques will not be specifically described in order to avoid ambiguous interpretation of the present disclosure. The terms used in the present specification are for the purpose of illustrating the examples and do not limit the present disclosure. As used herein, the singular form also includes the plural forms unless specifically stated in a phrase. The terms "comprises" and/or "comprising" used in the specification are used in the meaning of not excluding the presence or addition of one or more other constituent elements, steps, operations and/or elements, in addition to the referenced constituent elements, step, operation and/or element. Further, the term "and/or" includes each and one or more combinations of the referenced items.

The exemplary embodiments described herein will be also described with reference to cross-sectional and/or schematic views, which are ideal exemplary views of the present disclosure. Therefore, the forms of the exemplary views may be modified by manufacturing technique and/or tolerance and the like. Therefore, the exemplary embodiments of the present disclosure also include a change in the form generated according to the manufacturing process, without being limited to the illustrated specific form. Further, in each drawing illustrated in the present disclosure, the respective constituent elements may be illustrated by being slightly enlarged or reduced for the convenience of explanation. The same reference numerals refer to the same elements throughout the specification.

Figure 6:
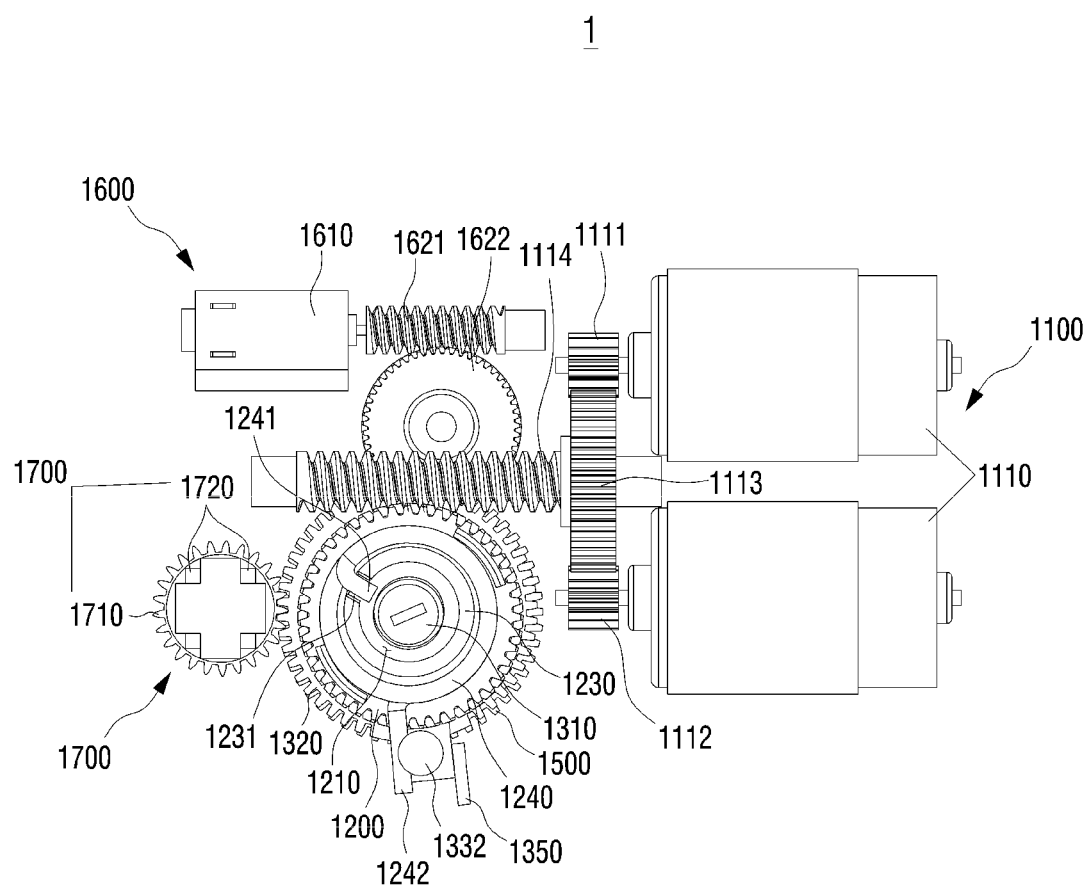
FIG. 6 is an exemplary plan view illustrating the controlling apparatus for the transmission according to an exemplary embodiment of the present disclosure.
Figure 7:
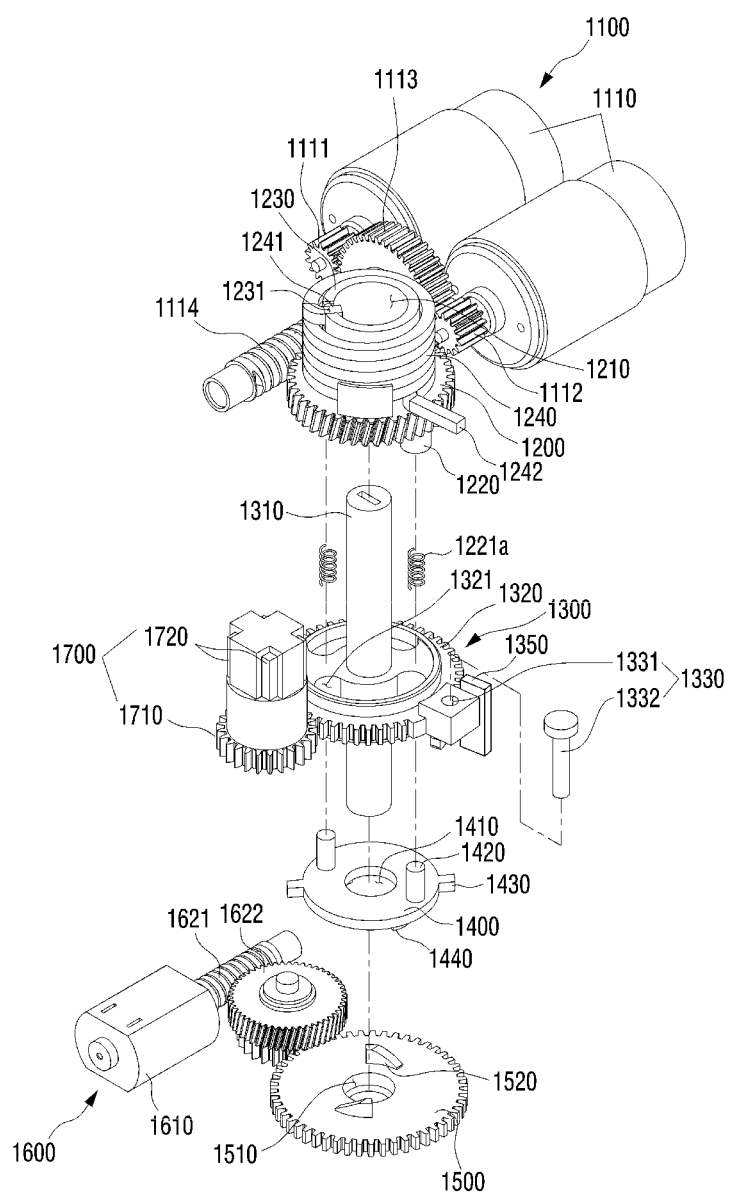
FIGS. 7 to 10 are exemplary exploded perspective views illustrating the controlling apparatus for the transmission according to an exemplary embodiment of the present disclosure.
Figure 8:
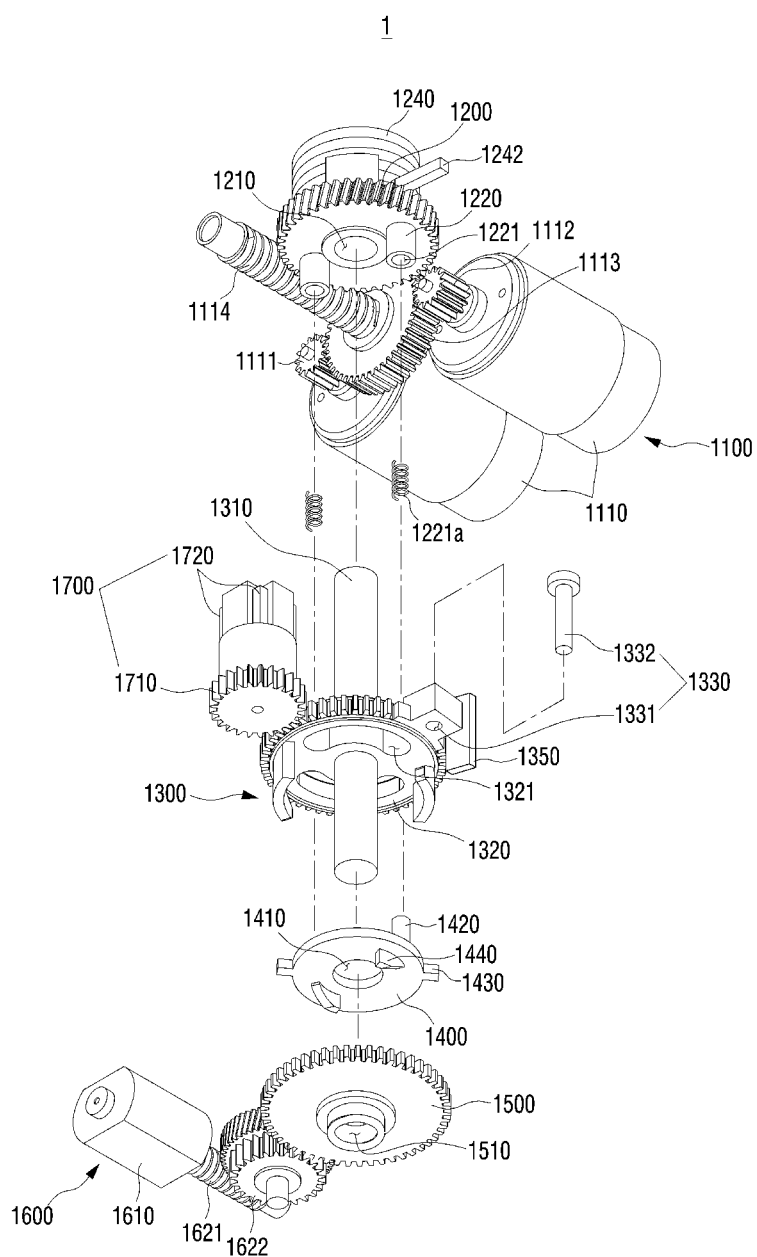
Figure 9:
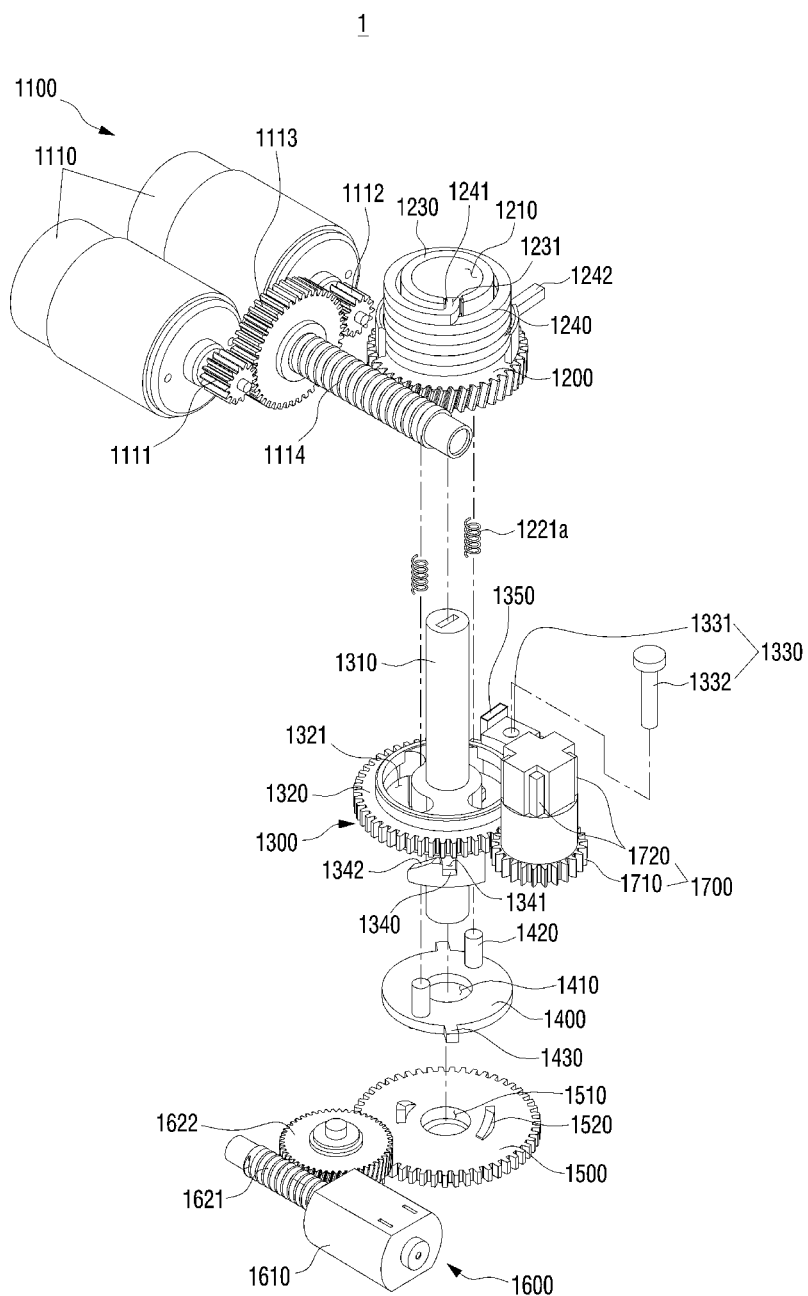

Hereinafter, the present disclosure will be described with reference to the drawings for explaining a controlling apparatus for a transmission according to an exemplary embodiment of the present disclosure. FIG. 1 is an exemplary schematic view illustrating the controlling apparatus for the transmission according to an exemplary embodiment of the present disclosure. FIGS. 2 to 5 are exemplary perspective views illustrating the controlling apparatus for the transmission according to an exemplary embodiment of the present disclosure. FIG. 6 is an exemplary plan view illustrating the controlling apparatus for the transmission according to an exemplary embodiment of the present disclosure. FIGS. 7 to 9 are exemplary exploded perspective views illustrating the controlling apparatus for the transmission according to an exemplary embodiment of the present disclosure. Referring to FIGS. 1 to 9, a controlling apparatus 1 for the transmission according to a first exemplary embodiment of the present disclosure may include a driving component 1100, a first gear component 1200, an output component 1300, a driving force transfer component 1400, a second gear component 1500, a returning component 1600, and a position detecting component 1700.

The controlling apparatus 1 for the transmission according to the first exemplary embodiment of the present disclosure may serve to receive an operating signal of a shift lever 2 in a shift-by-wire system to change the shift stage of the transmission 3, and may return the transmission 3 to the initial stage when at least one returning condition is satisfied. The controlling apparatus 1 for the transmission of the present disclosure may generally operate based on a power supply provided from a vehicle. However, in order to return the transmission 3 to the initial stage when the battery of the vehicle is discharged or the vehicle is abnormally turned off, an auxiliary power supply device such as an auxiliary battery may be included. Further, the controlling apparatus 1 for the transmission of the present disclosure may be disposed to expose a shaft 1310 connected to the transmission 3 to the exterior of the housing, and the shift stage of the transmission 3 may be changed based on the rotational direction (e.g. angular position) of the shaft 1310.

In an exemplary embodiment of the present disclosure, a dial-type shift lever is shown as the shift lever 2 for an example. However, the shift lever 2 is not limited thereto, and may be a joystick-type or a combination thereof. Further, in an exemplary embodiment of the present disclosure will describe a case where the shift lever 2 can select the shift stage from a parking stage (P), a reverse stage (R), a neutral stage (N), a drive stage (D), and the like. However, the shift stage options may vary.

The driving component 1100 may provide the driving force to change the shift stage based on the shift stage selected by the operation of the shift lever 2 by the driver. The driving component 1100 may include an actuator 1110, and at least one driving gears 1111, 1112, 1113, and 1114 which transfers the driving force generated from the actuator 1110. The number of the actuator 1110 may depend on the required driving force. The type or the number of the driving gears 1111, 1112, 1113, and 1114 may be varied depending on a driving force transfer mechanism, a speed reduction ratio or the like. For example, when a plurality of actuators 1110 are used, the driving gears 1111, 1112, 1113, and 1114 may include a spur gear 1111 and 1112 disposed on the rotary shaft of each actuator 110, a worm wheel gear 1113 which meshes with the spur gears 1111 and 1112 and has a diameter greater than the diameter of the spur gears 1111 and 1112 to achieve speed reduction, and a worm gear 1114 disposed at the rotational axis of the worm wheel gear 1113. The present disclosure is not limited to this example. The driving component 1100 may be operated by a controller (not illustrated) which determines a shift stage according to the operating signal transferred from the shift lever 2 and controls the power supplied to the driving component 1100 to rotate the shaft 1310 based on the determined shift stage.

The shaft 1310 may be connected to the transmission 3 through a first aperture 1210 formed in the first gear component 1200. The first gear component 1200 may be configured to rotate around the shaft 1310 based on the driving force provided from the driving component 1100. At least a part of the outer periphery of the first gear component 1200 may include a portion with gear teeth that may mesh with at least one driving gears 1111, 1112, 1113, and 1114, and the driving force may be transferred to the first gear component 1200 through at least one driving gears 1111, 1112, 1113, and 1114. The output component 1300 may include a shaft 1310, one end of which is connected to the transmission 3, and a rotary component 1320 connected to the shaft 1310 and centered on the shaft 1310. When the rotary component 1320 is rotated, the shaft 1310 may be configured to rotate at the same time, and the shift stage of the transmission 3 may be changed. The shaft 1310 may be directly or indirectly connected to the transmission 3 at one end. The statement that the shaft 1310 is indirectly connected to the transmission 3 may refer to a configuration in which the rotational force of the shaft 1310 is transferred to the transmission 3 by at least one transfer component capable of transferring the rotational force, such as gears or links.

The rotary component 1320 may include an insertion aperture 1321 through which a first rod 1220 formed in the first gear component 1200 is inserted. The insertion aperture 1321 may have a predetermined length along the rotational direction of the rotary component 1320 and may form a passage, through which the first rod 1220 may move. A detailed description thereof will be presented later. In an exemplary embodiment of the present disclosure, the description will be given for a case where the insertion aperture 1321 is formed on both sides of the rotary component 1320 around the shaft 1310, but the present disclosure is not limited thereto. The number and the placement of the insertion aperture 1321 may be varied corresponding to the number and the position of the first rods 1220.

The first gear component 1200 and the output component 1300 may support a first end 1241 and a second end 1242 of the elastic component 1240, respectively. Accordingly, a rotation of either the first gear component 1200 or the output component 1300 may elastically deform or relax the elastic component 1240 and generate a restoring force. The first gear component 1200 may include an extending portion 1230 extending in a longitudinal (e.g. lengthwise) direction of the shaft 1310 from at least a portion of the periphery of the first aperture 1210, and the extending portion 1230 may have a fixing groove 1231. The first end 1241 of the elastic component 1240 may be inserted into the fixing groove 1231.

The second end 1242 of the elastic component 1240 may be wound around the extending portion 1230 and may be supported by a support portion 1330 formed on the output component 1300. The support portion 1330 may include a support groove 1331 on one side of the outer periphery of the rotary component 1320, and a support pin 1332 inserted into the support groove 1331. The second end 1242 of the elastic component 1240 may be supported by the support pin 1332.

In an exemplary embodiment of the present disclosure, the first end 1241 of the elastic component 1240 may be inserted into and fixed at the fixing groove 1231, and the second end 1242 may be supported by the support pin 1332. However, the present disclosure is not limited thereto, and the structure which fixes either ends 1241 or 1242 of the elastic component 1240 may vary.

For example, in an exemplary embodiment of the present invention, the first end 1241 of the elastic member 1240 is inserted into and fixed at the fixing groove 1231 formed in the extending part 1230 of the first gear unit 1200. However, the present invention is not limited thereto, and the first end 1241 of the elastic component 1240 may be fixed to a housing or another fixing structure, as well as the first gear component 1200. Further, the present disclosure describes an exemplary embodiment where a torsion spring is used as the elastic component 1240, but the present invention is not limited thereto. The elastic component 1240 may include various types of springs (e.g., leaf springs, torsion springs, or the like) capable of being compressed or relaxed by rotation of either the first gear component 1200 or the output component 1300.

A second aperture 1410 through which the shaft 1310 passes may be formed in the driving force transfer component 1400, and the driving force transfer component 1400 may include a second rod 1420 inserted into an insertion groove 1221 of the first rod 1220 through the insertion aperture 1321. Therefore, since the second rod 1420 is inserted and disposed in the insertion groove 1221 of the first rod 1220, the first gear component 1200 and the driving force transfer component 1400 may be coupled and rotate together. The number or the placement of the second rods 1420 may be varied according to the number or the position of the first rod 1220. Further, since the second rod 1420 is inserted and located in the insertion groove 1221 of the first rod 1220 via the insertion aperture 1321, the first gear component 1200 and the driving force transfer component 1400 may be disposed at both (e.g., opposite) sides of the rotary component 1320 based on the lengthwise direction along the shaft 1310. In other words, the first gear component 1200 may be disposed at one side of the rotary component 1320, and the driving force transfer component 1400 may be disposed at the other side thereof along the lengthwise direction of the shaft 1310.

Figure 10:
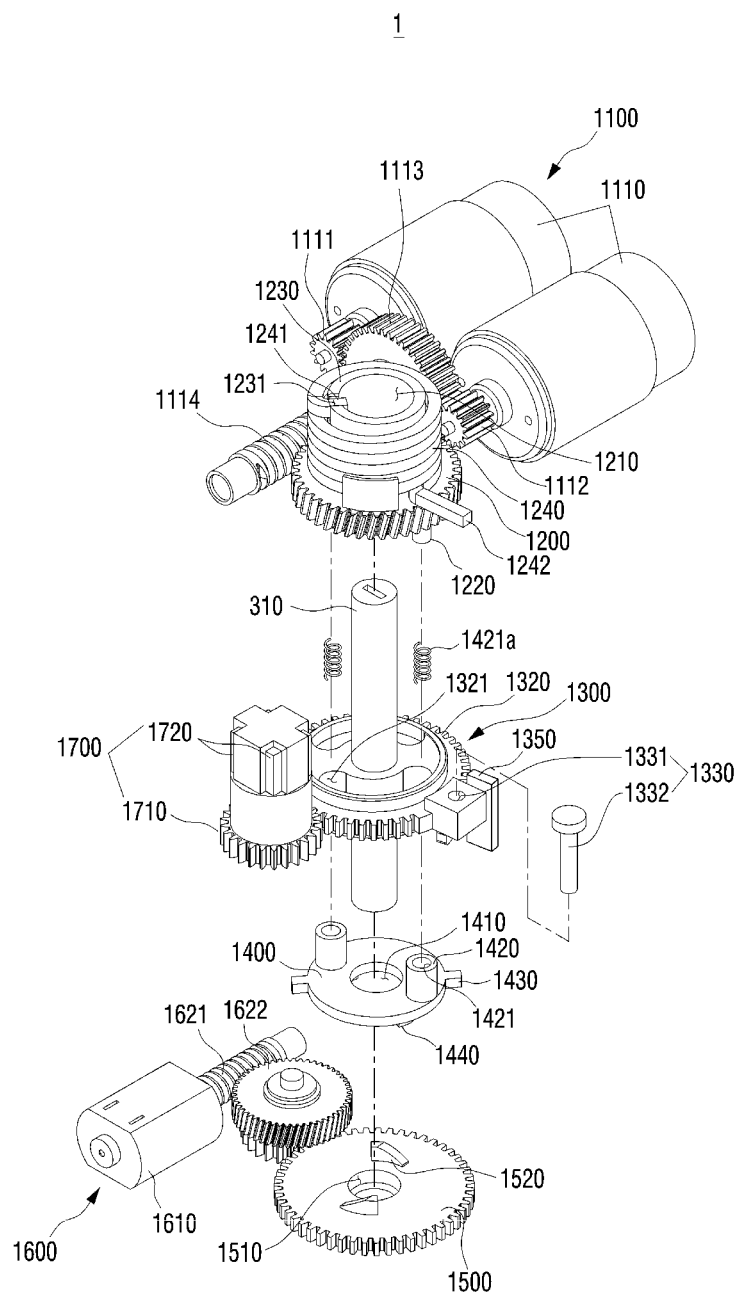

In addition, a spring component 1221a may be disposed in the insertion groove 1221 of the first rod 1220, enabling the position of the driving force transfer component 1400 to be variable by movement of the second rod 1420 in a direction of compressing or relaxing the spring component. In the aforementioned exemplary embodiment, the first rod 1220 formed in the first gear unit 1200 has the insertion groove 1221 and the second rod 1420 formed in the driving force transfer component 1400 is inserted into the insertion groove 1221 of the first rod 1220. However, the opposite case is also possible. For example, as illustrated in FIG. 10, an insertion groove 1421 may be formed in the second rod 1420 to receive the first rod 1220, and the insertion groove 1421 of the second rod 1420 may include a spring component 1421a. Even in this case, the second rod 1420 may move in the direction of compressing or relaxing the spring component 1421a, and the driving force transfer component 1400 may move in the longitudinal (e.g., lengthwise) direction of the shaft 1310, making the position thereof variable.

The driving force transfer component 1400 may have a coupling rib (e.g., stud) 1430 on one side of the outer periphery. The coupling rib 1430 may be inserted into a coupling groove 1340 in the rotary component 1320. When the driving force is provided from the driving component 1100 while the coupling rib 1430 is inserted into the coupling groove 1340, the driving force of the driving component 1100 may be transferred to the rotary component 1320 by the first gear component 1200 and the driving force transfer component 1400, and thus, the shaft 1310 may be configured to rotate and change the shift stage of the transmission 3. In addition, the coupling groove 1340 may have a guide surface 1342 inclined at a predetermined angle formed on one side of the insertion port 1341 into which the coupling rib 1430 is inserted.

The coupling groove 1340 may be formed such that the insertion port 1341 has an opening that faces the rotary component 1320. One end of the guide surface 1342 may be connected to one side of the insertion port 1341, and the other end of the guide surface 1342 may have an inclined surface in a direction away from the rotary component 1320. When the driving force transfer component 1400 rotates with the coupling rib 1430 detached from the coupling groove 1340, the coupling rib 1430 may be guided toward the insertion port 1341 along the guide surface 1342 and inserted into the coupling groove 1340. The coupling rib 1430 may remain in the insertion port 1341 in the coupling groove 1340 until the coupling rib 1430 is detached from the coupling groove 1340. An exemplary embodiment of the present disclosure has the plurality of coupling ribs 1430 and the plurality of coupling grooves 1340, but the present disclosure is not limited thereto. The number of the coupling rib 1430 and the coupling grooves 1340 may vary.

The driving component 1100 may perform an initializing procedure when the coupling rib 1430 is either inserted into or detached from the coupling groove 1340. In particular, the coupling rib 1430 may remain inserted into the coupling groove 1340, when the driver turns off the vehicle at a shift stage other than the initial stage at the end of the vehicle operation. The driving component 1100 may perform the initializing procedure by returning the shaft 1310 to the initial stage to eliminate a potential problem which may occur due to not knowing the shift stage when the driver starts the vehicle next time. Hereinafter, the description will be given for an exemplary embodiment where the initial stage is the parking stage (P). However, the present disclosure is not limited to thereto, and the initial stage may be different. For example, the driving component 1100 may perform the initializing procedure by returning the shaft 1310 to the initial stage, or the parking stage (P), when the vehicle is turned off at a non-parking stage in order to prevent any confusion by the driver the next time the vehicle is started. In an exemplary embodiment of the present disclosure, the statement that the shaft 1310 is rotated to return to the initial stage may be understood as that the rotary component 1320 is rotated. The driving component 1100 may be configured to rotate the first gear component 1200 to transfer the driving force of the driving component 1100 to the output component 1300 via the driving force transfer component 1400, thereby rotating the shaft 1310 to return to the initial stage.

In an exemplary embodiment of the present disclosure, a stopper 1330 may be disposed on the rotary path of the support portion 1330 to restrict the rotation of the support portion 1330 to more accurately return the shaft 1310 to the initial stage 1350. The point on which the support portion 1330 abuts the stopper 1350 may correspond to the initial stage. Additionally, the statement that the rotation of the support portion 1330 is restricted by the stopper 1350 may be understood as that the support portion 1330 is obstructed by the stopper 1350 and cannot rotate further. Hereinafter, the description will be given for an exemplary embodiment of the present disclosure, where the point at which the support portion 1330 abuts the stopper 1350 corresponds to the parking stage (P), and as the output component 1300 rotates in the direction in which the support portion 1330 moves away from the stopper 1350, the shift stage sequentially changes to the reverse stage (R), the neutral stage (N), and the drive stage (D). When the output component 1300 rotates in the opposite direction thereof, the drive stage (D), the neutral stage (N), the reverse stage (R), and the parking stage (P) are sequentially selected.

In an exemplary embodiment of the present disclosure, the stopper 1350 may be formed in the housing which accommodates the controlling apparatus 1 for the transmission, but the present disclosure is not limited thereto. Therefore, even when the output component 1300 attempts to rotate further, the rotation of the output component 1300 is restricted since the rotation of the support portion 1330 is restricted by the stopper 1350, and the shaft 1310 may return to the initial stage.

In the above-described exemplary embodiment, the initializing procedure of returning the shaft 1310 to the initial stage is performed with the coupling rib 1430 of the driving force transfer component 1400 inserted into the coupling groove 1340 in the rotary component 1320. However, the present disclosure is not limited thereto, and the initializing procedure may be performed when the coupling rib 1430 is detached from the coupling groove 1340. In particular, when the coupling rib 1430 is detached from the coupling groove 1340, the driving force transfer component 1400 may be configured to rotate as the first gear component 1200 is rotated by the driving component 1100. However, since the output component 1300 does not receive the driving force of the driving component 1100, the shaft 1310 does not rotate, and instead, the initializing procedure of inserting the coupling rib 1430 into the coupling groove 1340 may be performed. During this procedure, the first end 1241 of the elastic component 1240 may be fixed to the first gear component 1200 and the second end 1242 may be supported by the support portion 1330. The support portion 1330 may be disposed to abut the stopper 1350 due to the restoring force of the elastic component 1240 when the coupling rib 1430 is detached from the coupling groove 1340, and the shaft 1310 may be returned to the initial stage.

Figure 11:
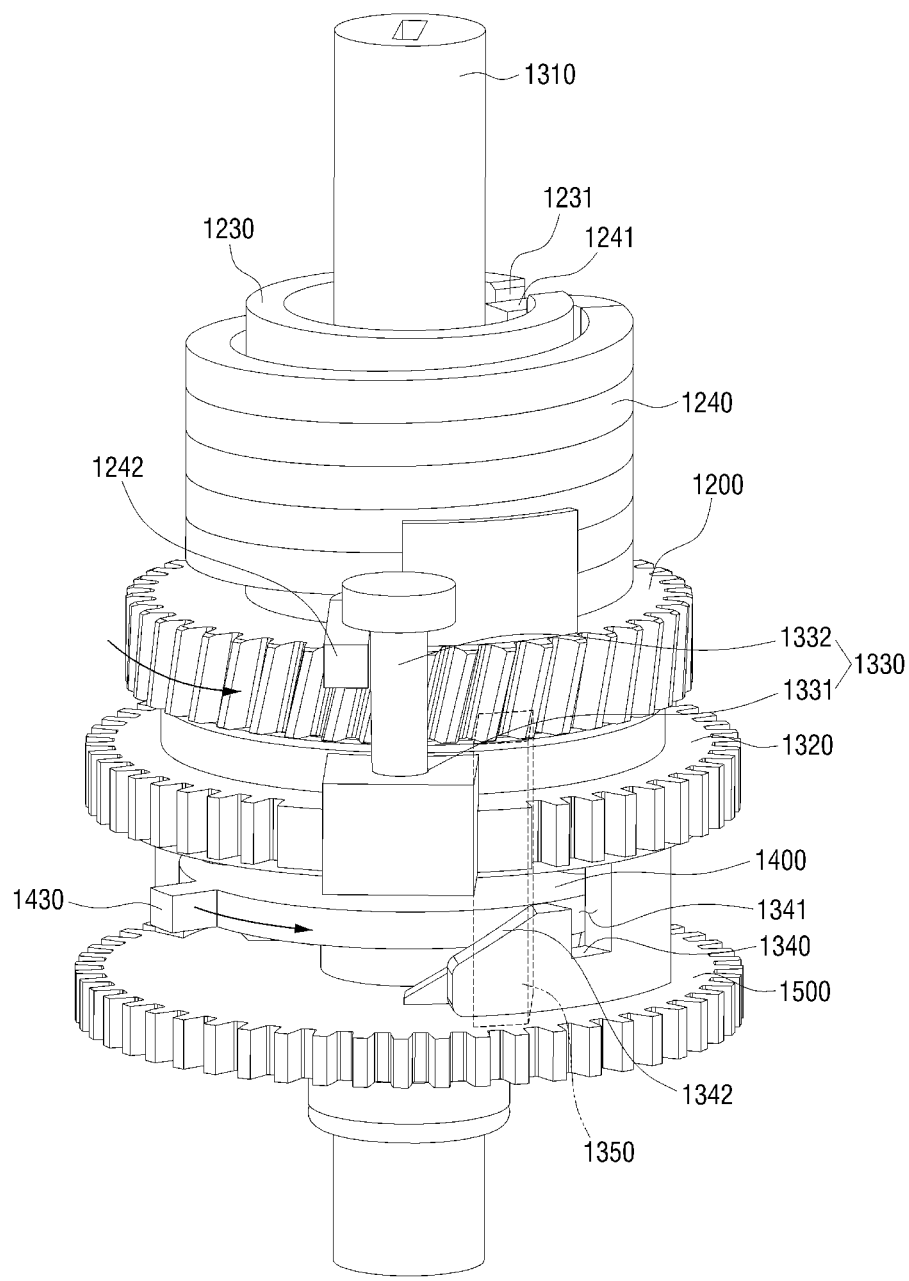
FIGS. 11 to 13 are exemplary perspective views illustrating an initializing procedure in a case when a coupling rib according to an exemplary embodiment of the present disclosure is detached from a coupling groove.
Figure 12:
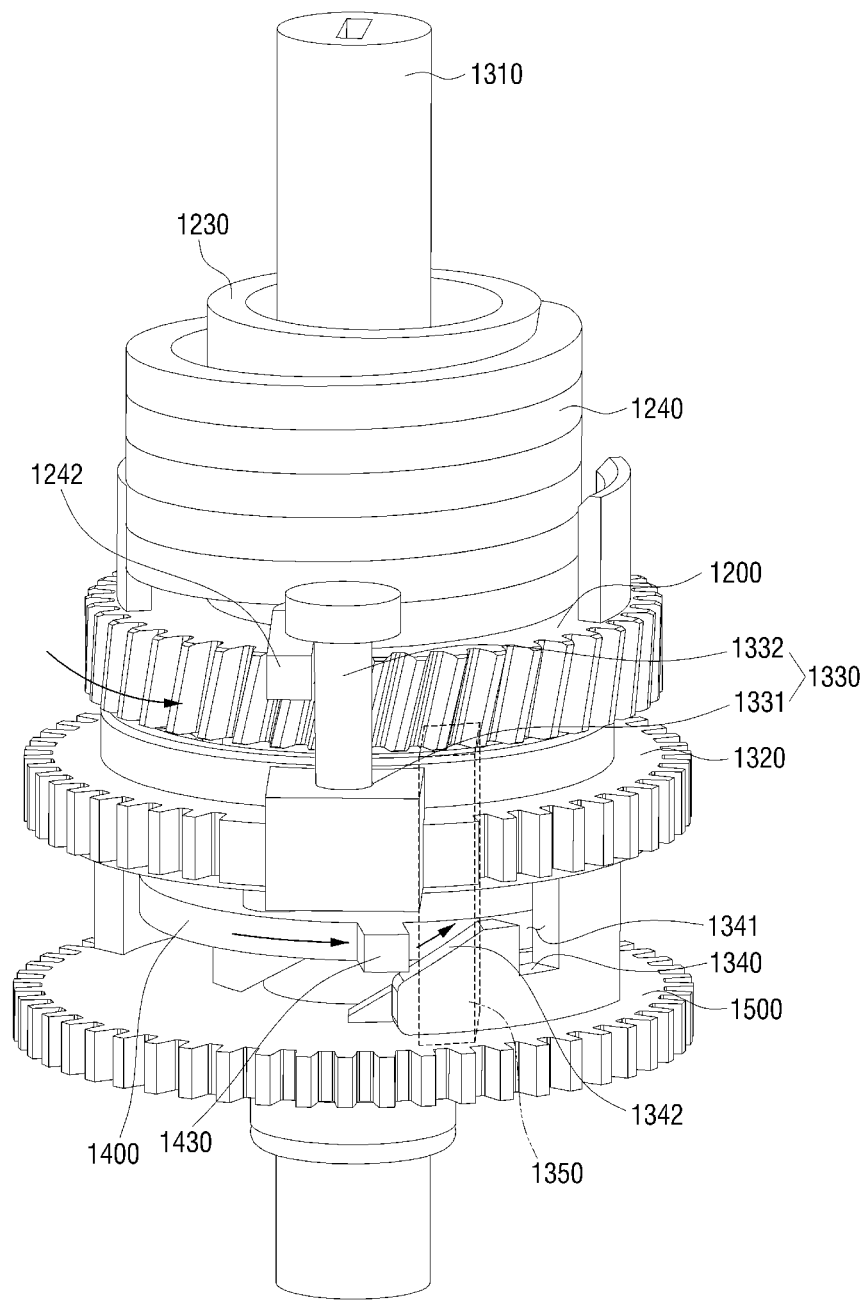
Figure 13:
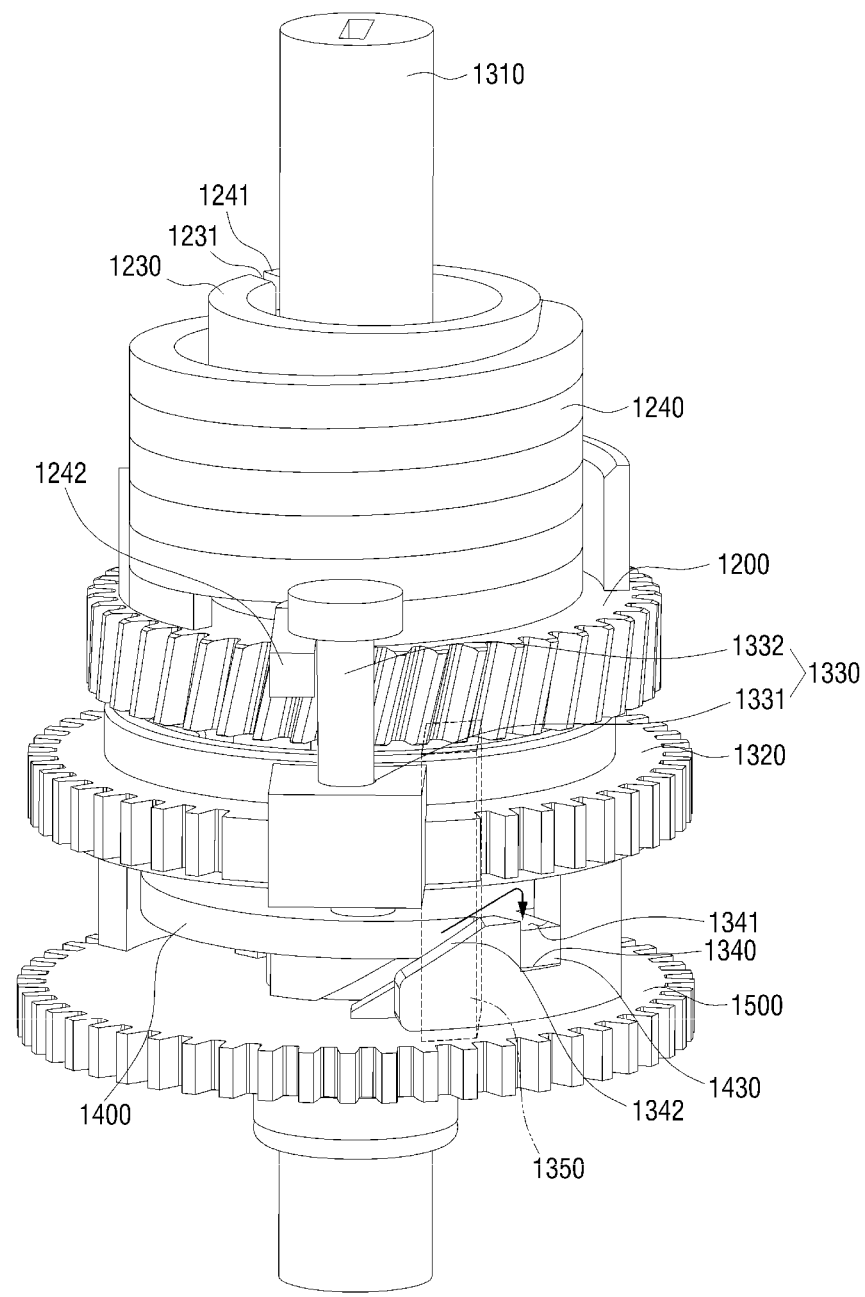

During the aforementioned initializing procedure when the coupling rib 1430 is detached from the coupling groove 1340, the operations of the first gear component 1200, the output component 1300, the driving force transfer component 1400, and the second gear component 1500 will be described in more detail with reference to FIGS. 11 to 13. When the first gear component 1200 is rotated by the driving component 1100 with the coupling rib 1430 detached from the coupling groove 1340, the output component 1300 does not rotate as illustrated in FIG. 11. However, the elastic component 1240 may be compressed as the first gear component 1200 rotates, and at the time same, the driving force transfer component 1400 with the second rod 1420 inserted into the insertion groove 1221 of the first rod 1220 may be rotated to enable the coupling rib 1430 to approach the coupling groove 1340. When the driving force transfer component 1400 rotates further as the coupling rib 1430 is disposed at the receiving side of the guide surface 1342, the second rod 1420 may be displaced in a direction of compressing the spring component 1221a in the insertion groove 1221 of the first rod 1220 due to the inclination angle of the guide surface 1342 as illustrated in FIG. 12. Further, while the position of the driving force transfer component 1400 is changed, the coupling rib 1430 may be guided to the end of the guide surface 1342. When the coupling rib 1430 is disposed at the insertion port 1341 of the coupling groove 1340 as illustrated in FIG. 13, the second rod 1430 may be displaced in a direction of relaxing (e.g., elongating) the spring component 1221a in the insertion groove 1221 of the first rod 1220, and when the position of the driving force transfer component 1400 is changed, the coupling rib 1430 may be inserted into the coupling groove 1340.

After the coupling rib 1430 is inserted into the coupling groove 1340, the coupling rib 1430 remains inserted into the coupling groove 1340, unless the position of the driving force transfer component 1400 is changed to enable the second rod 1420 to compress the spring component 1221a of the insertion groove 1221 of the first rod 1220. Accordingly, the output component 1300 may be rotated by the driving force transferred from the driving component 1100 via the first gear component 1200 and the driving force transfer component 1400. In the aforementioned FIGS. 11 to 13, the second gear component 1500 may have fixed position because a returning component 1600, to be described later, is not actuated, and the detailed description thereof will be given later.

Figure 14:
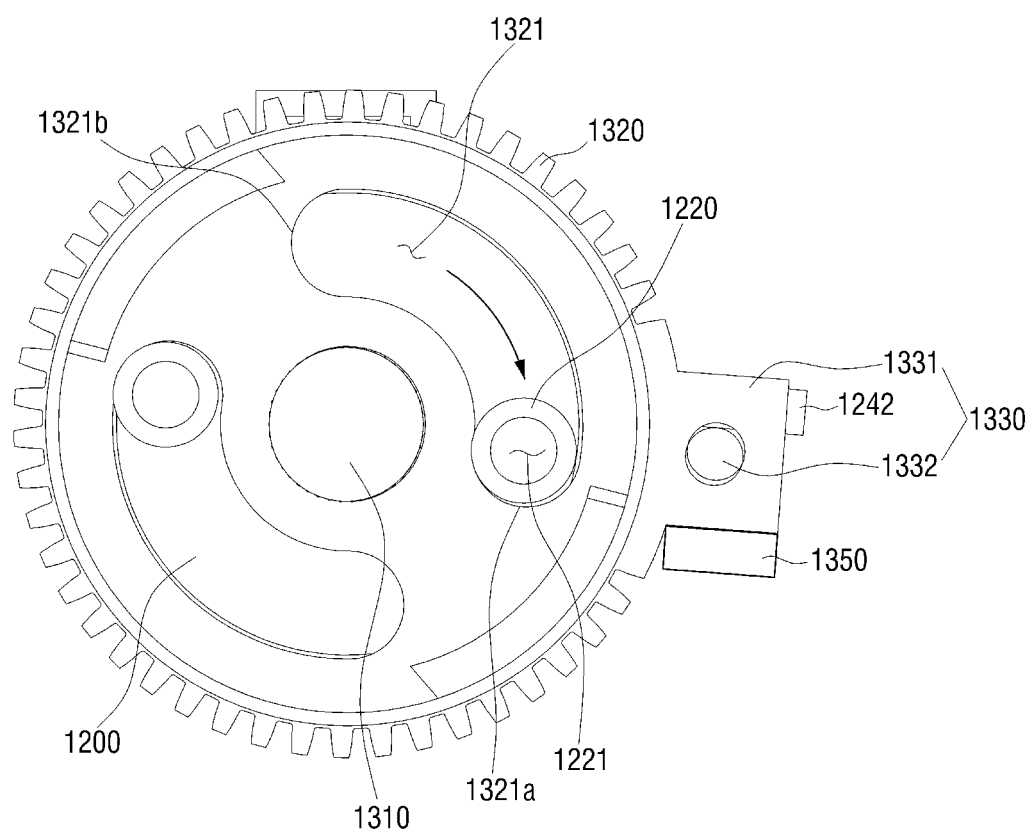
FIG. 14 is an exemplary schematic view illustrating a position of a first rod when an elastic component according to an exemplary embodiment of the present disclosure is compressed.

Conversely, since the further rotation of the support portion 1330 supporting the second end 1242 of the elastic component 1240 is restricted by the stopper 1350, and the first gear component 1200 may be configured to rotate with the first end 1241 of the elastic component 1240 fixed, the elastic component 1240 may be compressed when the first gear component 1200 is rotated with the coupling rib 1430 detached from the coupling groove 1340. When the first gear component 1200 is rotated to compress the elastic component 1240, the rotation of the output component 1300 may be restricted by the support portion 1330 and the stopper 1350. However, the first rod 1220 of the first gear component 1200 may move along the insertion aperture 1321 of the output component 1300, and as illustrated in FIG. 14, the elastic component 1240 may be compressed while the first rod 1220 is rotated until it is disposed on a first end 1321a of the insertion aperture 1321. In an exemplary embodiment of the present disclosure, the elastic component 1240 may be compressed to utilize the restoring force of the elastic component 1240 when a returning component 1600, to be described later, returns the shaft 1310 to the initial stage, and a detailed description thereof will be given later.

The position of the driving force transfer component 1400 may be changed by the second gear component 1500 having a third aperture 1510 through which the shaft 1310 passes. The second gear component 1500 may maintain a fixed position or may be rotated by the returning component 1600 to be described later. As described above, when the driving component 1100 performs the initializing procedure with the coupling rib 1430 detached from the coupling groove 1340, the second gear component 1500 may be maintain a fix position.

In the driving force transfer component 1400 and the second gear component 1500, a first protruding portion 1440 and a second protruding portion 1520 may be formed on the surfaces facing each other, respectively. Since the first protruding portion 1440 and the second protruding portion 1520 have the same rotary path, they may come into contact with each other when at least one of the first protruding portion 1440 or the second protruding portion 1520 rotates. The contact surfaces of the first protruding portion 1440 and the second protruding portion 1520 may be formed to be inclined toward each other, and one of the first protruding portion 1440 or the second protruding portion 1520 may be disposed above the other thereof.

In an exemplary embodiment of the present disclosure, the second gear component 1500 is disposed below the driving force transfer component 1400, and when the first protruding portion 1440 and the second protruding portion 1520 come into contact with each other (e.g., abut), the first protruding portion 1440 may move along the upper side of the second protruding portion 1520. When the first protruding portion 1440 is disposed on the second protruding portion 1520, the second rod 1420 may be displaced in the direction of compressing the spring component 1221a inside the insertion groove 1221 of the first rod 1220, and when the first protruding portion 1440 and the second protruding portion 1520 are separated from each other, the second rod 1420 may move in the direction of relaxing (e.g., elongating) the spring component 1221a within the insertion groove 1221 of the first rod 1220, changing the position of the driving force transfer component 1400.

The returning component 1600 may serve to return the shaft 1310 to the initial stage when at least one return condition is satisfied. In an exemplary embodiment of the present disclosure, the returning component 1600 may detach the coupling rib 1430 from the coupling groove 1340 to return the shaft 1310 to the initial stage. The return condition in an exemplary embodiment of the present disclosure may be an emergency situation such as the case when the battery is discharged or the engine is abnormally turned off.

Additionally, since the power supply from the vehicle may be cut off in the emergency situation, the returning component 1600 may include an auxiliary power supply device, for example, an auxiliary battery for supplying the power capable of returning the shaft 1310 to the initial stage. The auxiliary power supply device may be charged when the vehicle is in operation. The returning component 1600 may be operated by the output signal from the above-mentioned controller when a returning condition is satisfied, and may maintain the position of the second gear component 1500 to prevent rotation when the returning conditions are not satisfied. Further, when the returning component 1600 operates, the driving component 1100 does not operate, and the first gear component 1200 may be freely rotatable.

The returning component 1600 may include an actuator 1610, and transfer gears 1621 and 1622 which transfer the driving force of the actuator 1610 to the second gear component 1500. At least one of the transfer gears 1621 or 1622 may include a plurality of gears having different gear ratios in order to achieve speed reduction. The returning component 1600 may be configured to generate the driving force to rotate the second gear component 1500 when the above-mentioned emergency situation occurs. In particular, while the first protruding portion 1440 and the second protruding portion 1520 are brought into contact with each other, the first protruding portion 1440 may be disposed on the second protruding portion 1520.

Figure 15:
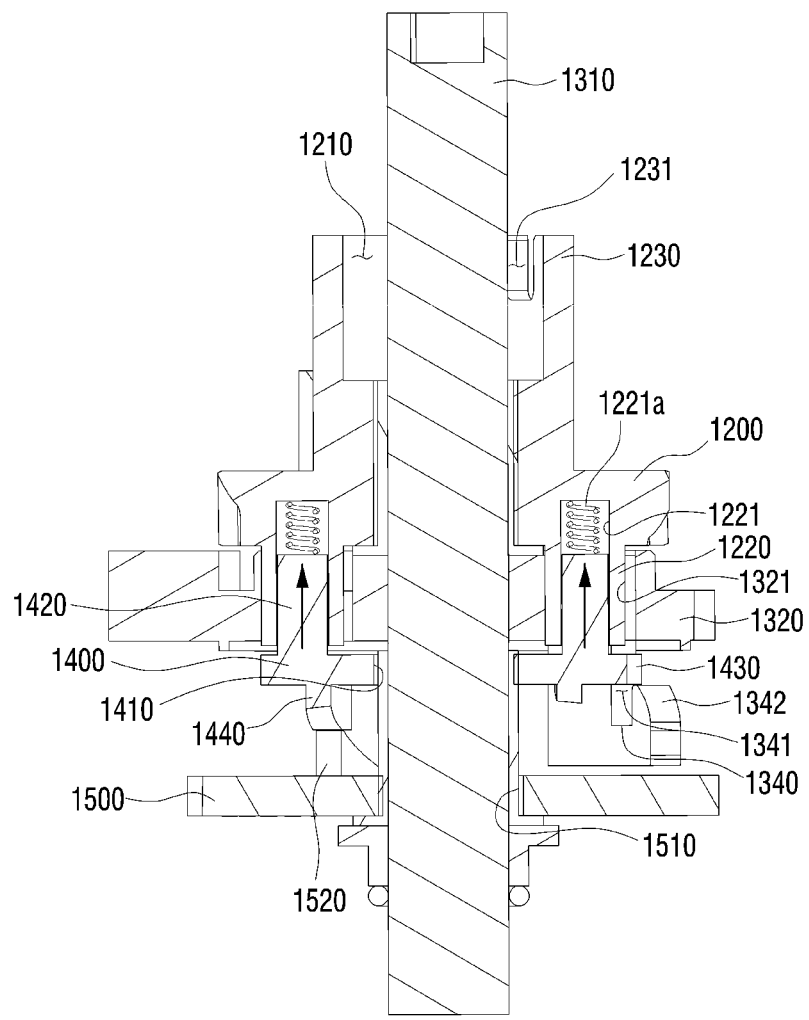
FIG. 15 is an exemplary cross-sectional view illustrating the coupling rib detached from the coupling groove according to an exemplary embodiment of the present disclosure.
Figure 16:
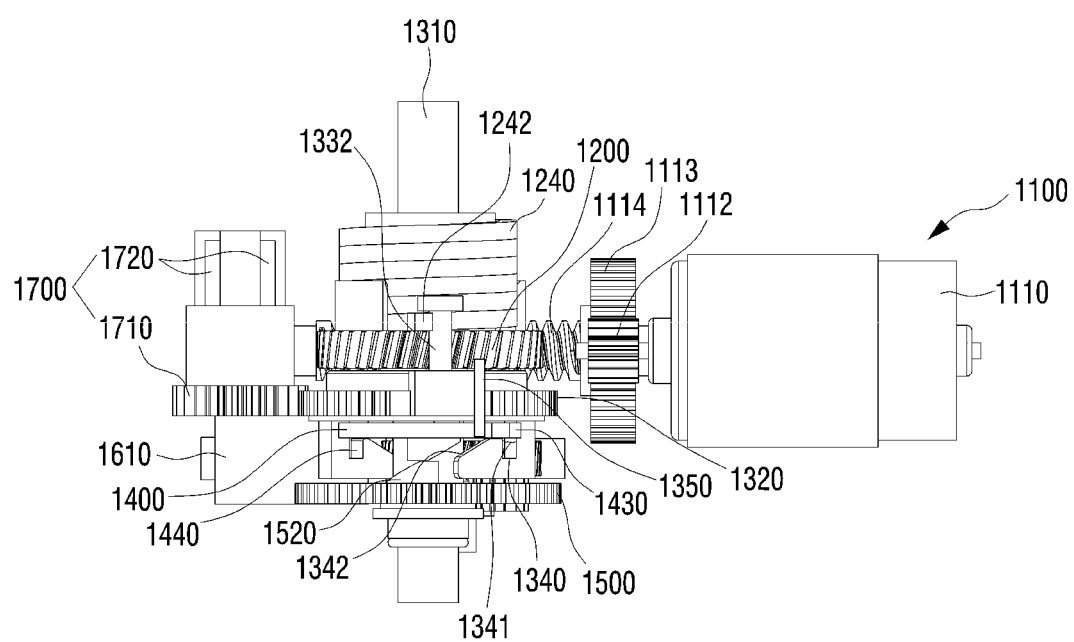
FIG. 16 is an exemplary side view illustrating the coupling rib detached from the coupling groove according to an exemplary embodiment of the present disclosure.
Figure 17:
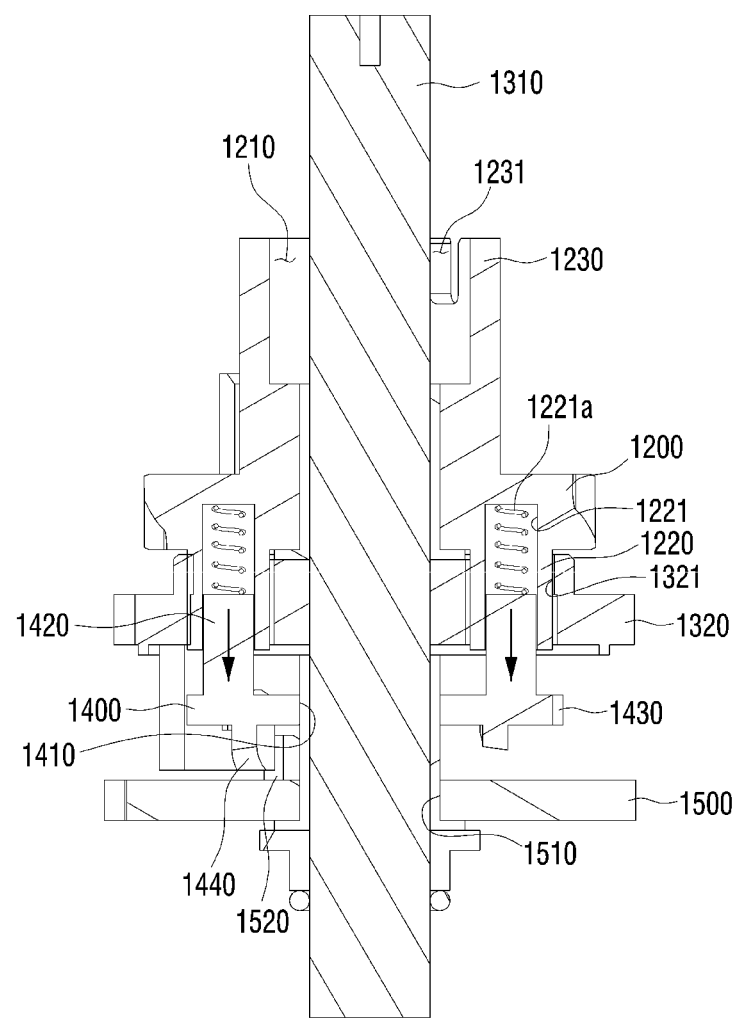
FIG. 17 is an exemplary cross-sectional view illustrating a state in which the coupling rib is detached from the coupling groove according to an exemplary embodiment of the present disclosure and the shaft is returned to the initial stage.
Figure 18:
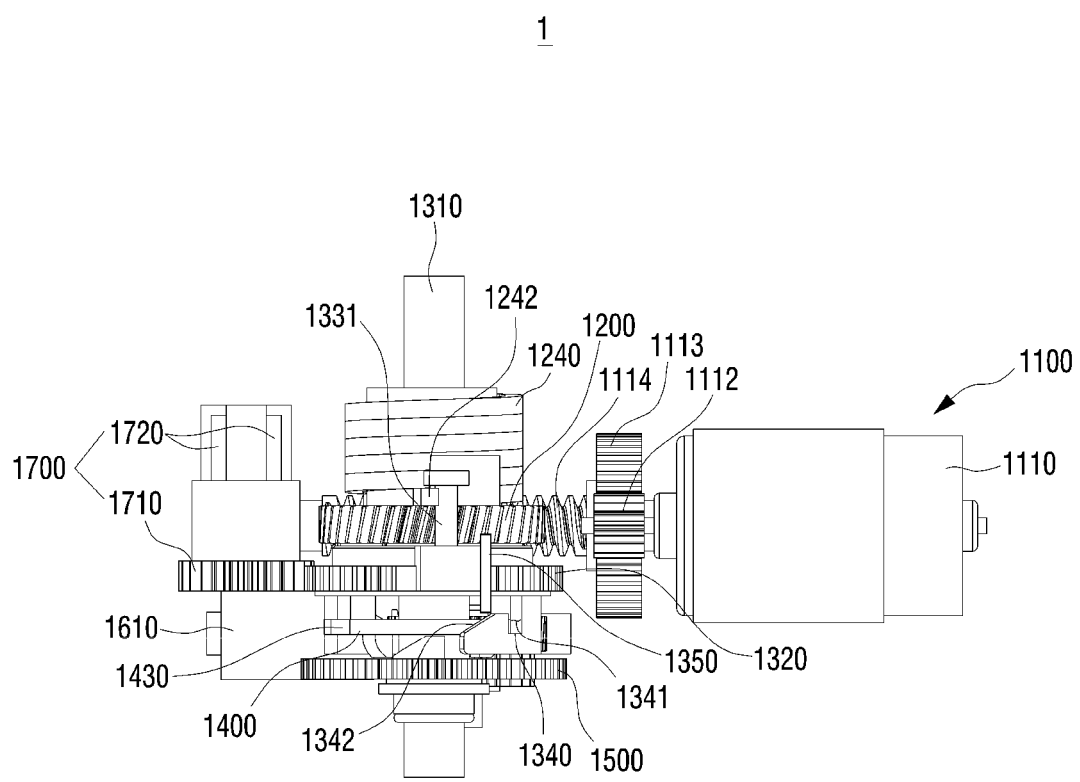
FIG. 18 is an exemplary side view illustrating the shaft which is returned to the initial stage by detachment of the coupling rib from the coupling groove according to an exemplary embodiment of the present disclosure.
Figure 19:
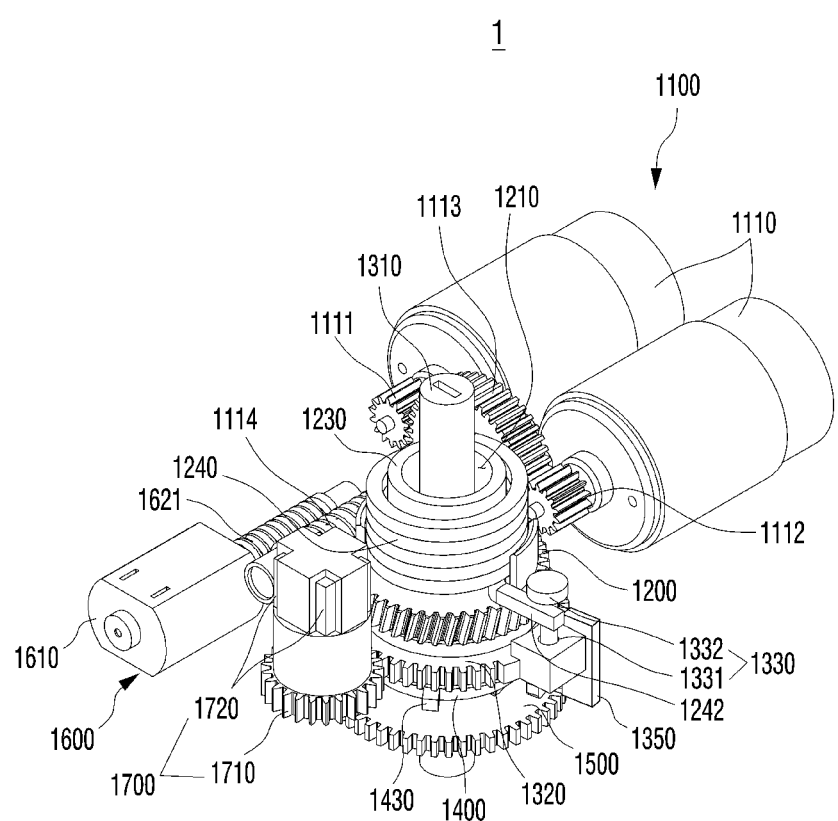
FIG. 19 is an exemplary perspective view illustrating the shaft which is returned to the initial stage by detachment of the coupling rib from the coupling groove according to an exemplary embodiment of the present disclosure.

When the first protruding portion 1440 is disposed on the second protruding portion 1520, as illustrated in FIG. 15, the driving force transfer component 1400 may be displaced in the direction of compressing the spring component 1221*a* within the insertion groove 1221 of the first rod 1220. As illustrated in FIG. 16, the coupling rib 1430 may be detached from the coupling groove 1340 through the insertion port 1341 of the coupling groove 1340. When the coupling rib 1430 is detached from the coupling groove 1340, due to the restoring force of the elastic component 1240 which is under compression, the support portion 1330 of the output component 1300 may be configured to rotate in the direction toward the stopper 1350, and the first gear component 1200 may be configured to rotate in the direction opposite to the output component 300. When the first gear component 1200 rotates in a direction opposite to the output component 1300, the first protruding portion 1440 and the second protruding portion 1520 may be spaced apart from each other, and as illustrated in FIGS. 17 to 19, the second rod 1420 of the driving force transfer component 1400 may be displaced in the direction of relaxing the spring component 1221*a* within the insertion groove 1221 of the first rod 1220. Therefore, when the output component 1300 is rotated by the restoring force of the elastic component 1240 and the support portion 1330 abuts the stopper 1350, the rotation of the output component 1300 may be restricted by the stopper 1350, and the shaft 1310 may return to the initial stage.

Figure 20:
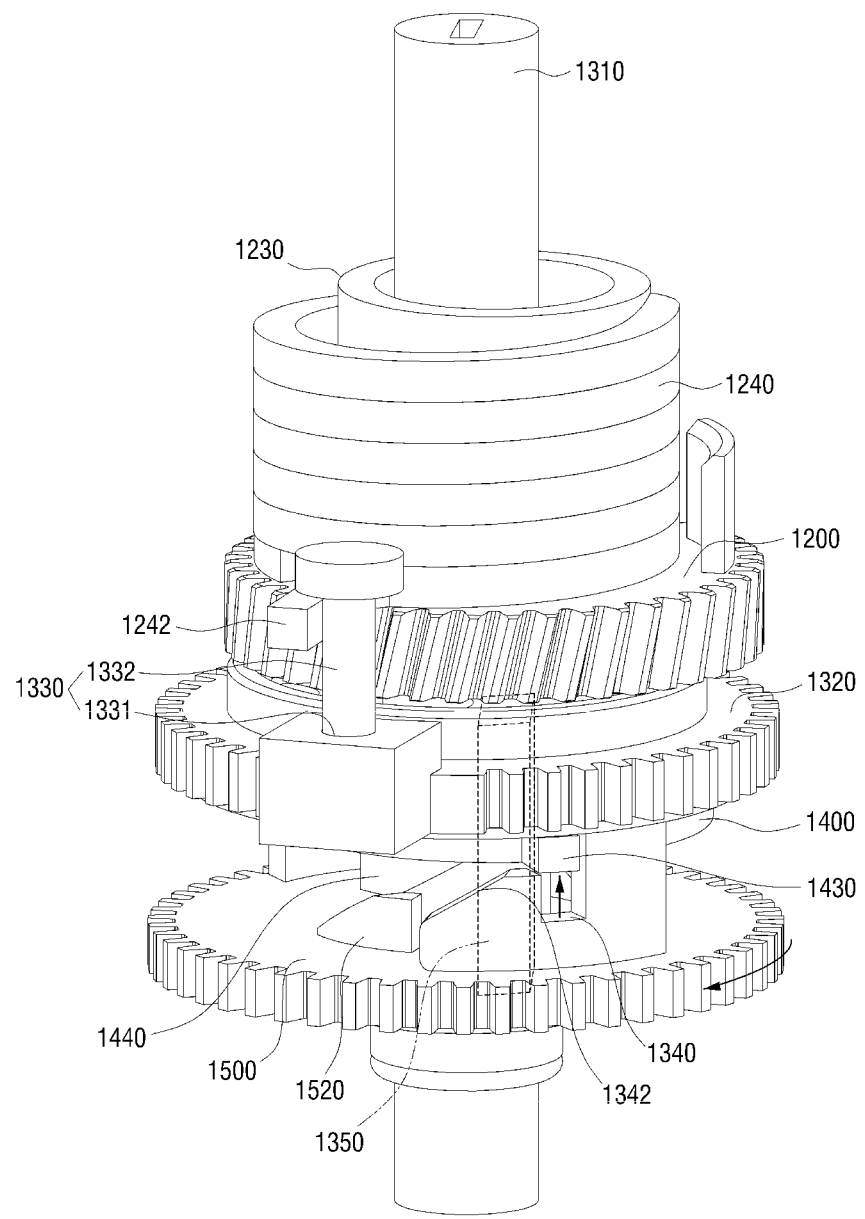
FIGS. 20 and 21 are exemplary perspective views illustrating a process in which the shaft is returned to the initial stage by the returning component according to an exemplary embodiment of the present disclosure.
Figure 21:
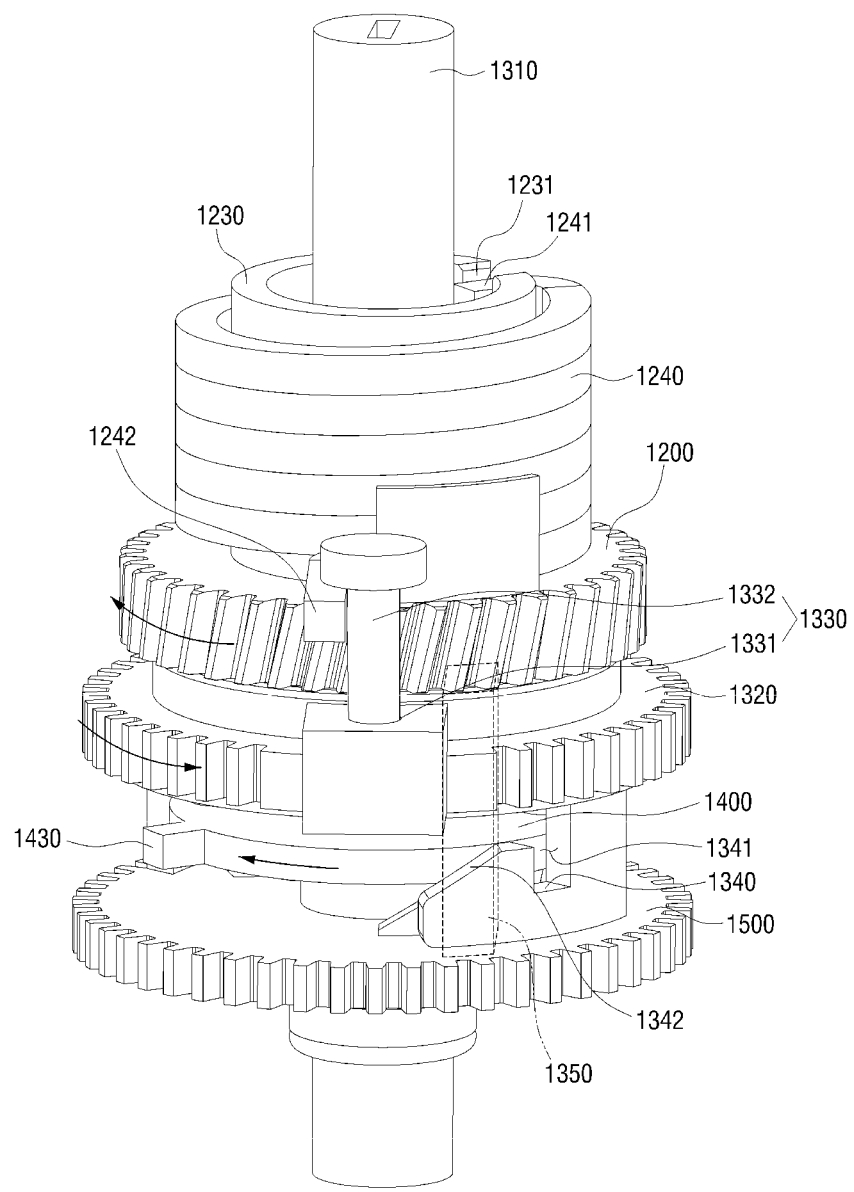
Figure 22:
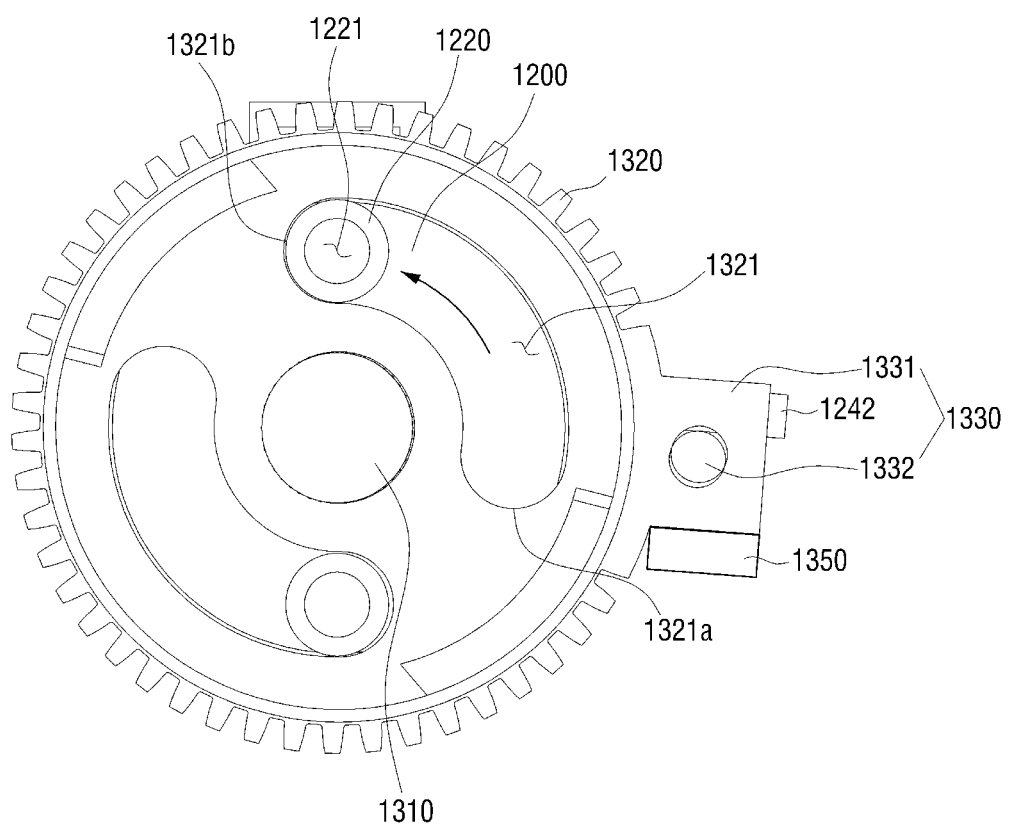
FIG. 22 is an exemplary schematic view illustrating the position of the first rod when the elastic component according to an exemplary embodiment of the present disclosure is relaxed.
Figure 23:
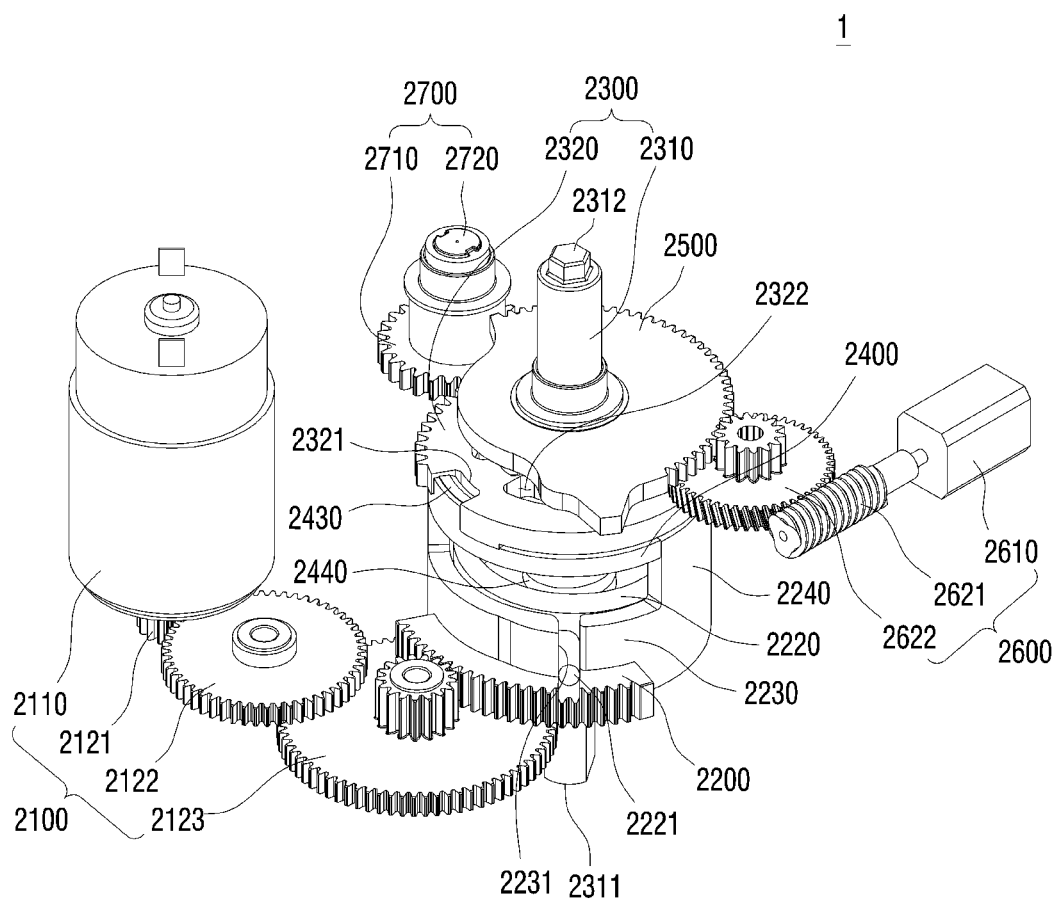
FIGS. 23 to 26 are exemplary perspective views illustrating a controlling apparatus for a transmission according to another exemplary embodiment of the present disclosure.
Figure 24:
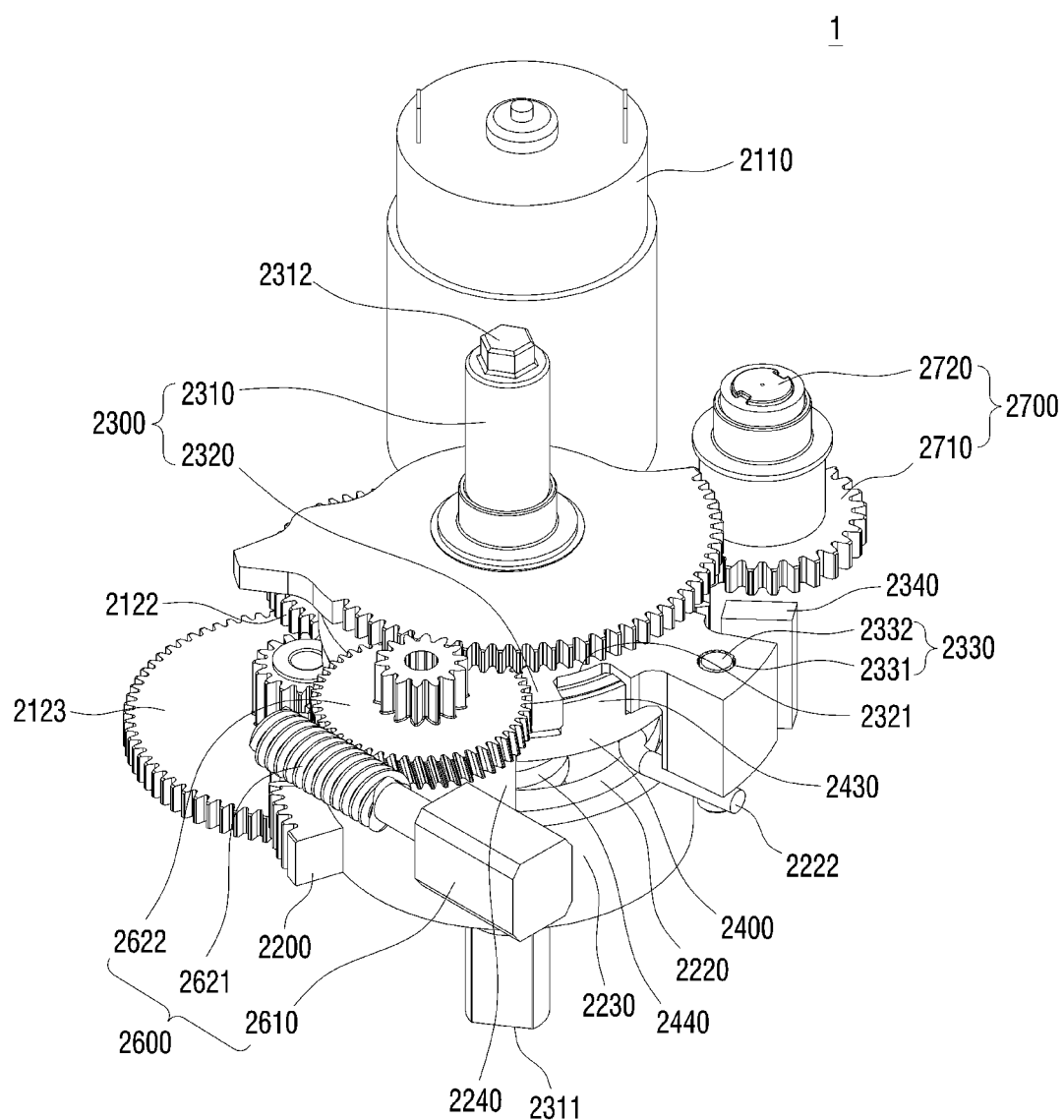
Figure 25:
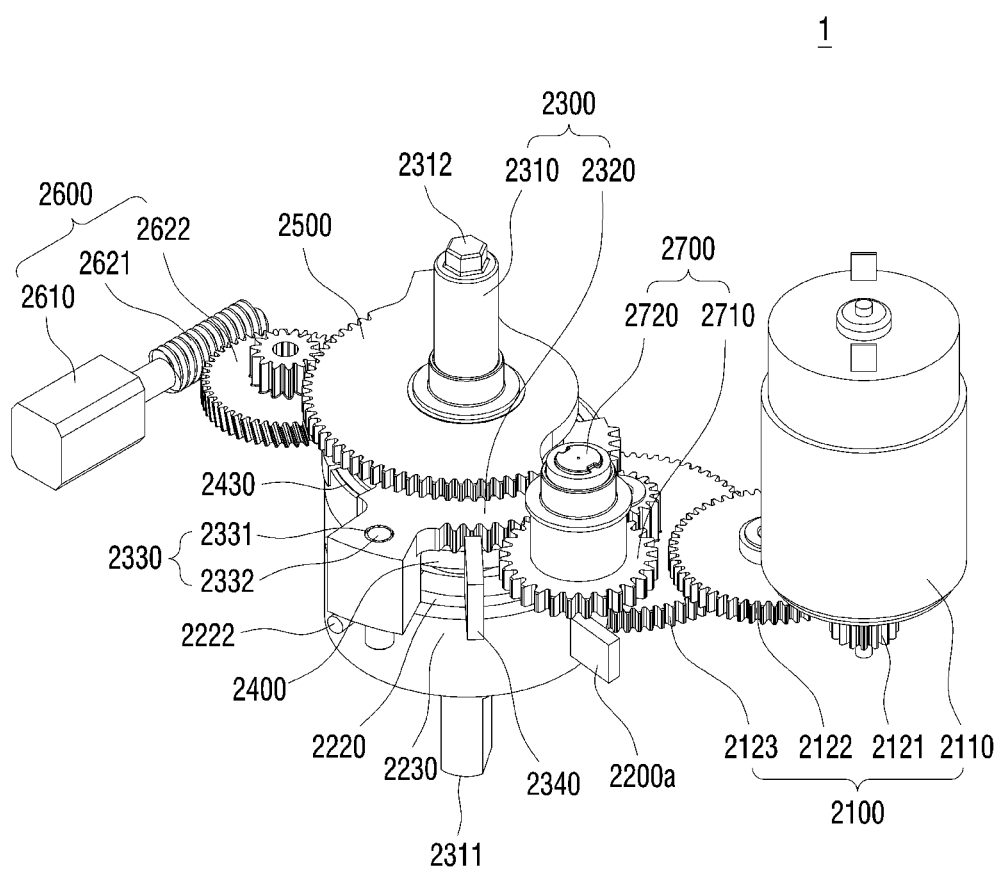
Figure 26:
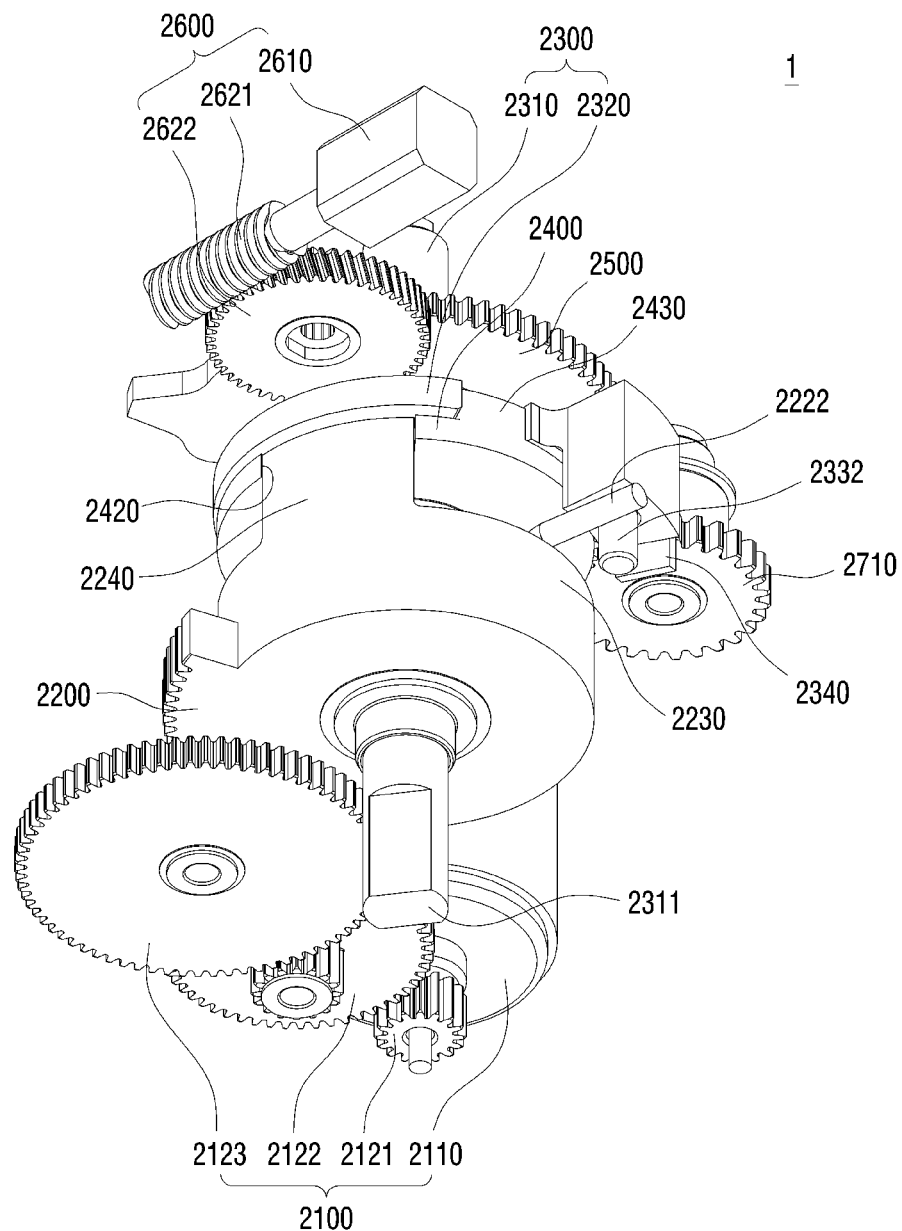

While the returning component 1600 returns the shaft 1310 to the initial stage as described above, the operation of the first gear component 1200, the output component 1300, the driving force transfer component 1400, and the second gear component 1500 will be described in more detail with reference to FIGS. 20 and 21. When at least one returning condition is satisfied while the shift stage is at a non-parking stage, the returning component 1600 rotates the second gear component 1500 as illustrated in FIG. 20. In this exemplary case, the second protruding portion 1520 may displace the first protruding portion 1510 in an upward direction, and the second rod 1420 may be displaced in the direction of compressing the spring component 1221*a* within the insertion groove 1221 of the first rod 1220. Accordingly, when the position of the driving force transfer component 1400 is changed, the coupling rib 1430 may be detached through the insertion port 1341 of the coupling groove 1340. When the coupling rib 1430 is detached from the coupling groove 1340, due to the restoring force of the elastic component 1240, the support portion 1330 of the output component 1300 may be configured to rotate in the direction toward the stopper 1350, and the first gear component 1200 and the driving force transfer component 1400 may be rotated in the opposite direction to the output component 1300 to enable the shaft 1310 to return to the initial stage. Further, when the first gear component 1200 and the output component 1300 rotate in the opposite directions to each other by the elastic component 1240, the first rod 1220 may be disposed on a second end 1321*b* of the insertion aperture 1321 that restricts the rotation range.

After the shaft 1310 is returned to the initial stage by the restoring force of the elastic component 1240, when the aforementioned returning condition is not satisfied any more, i.e., when the emergency situation is relieved, the driving component 1100 may perform the initializing procedure to insert the coupling rib 1430 of the driving force transfer component 1400 into the coupling groove 1340 again, and the shift stage may be changed as the shaft 1310 is rotated by the driving force of the driving component 1100.

The position detecting component 1700 may be configured to detect the selected shift stage based on the rotation (e.g., angular position) of the shaft 1310. In an exemplary embodiment of the present disclosure, the position detecting component 1700 may include a gear 1710 positioned to mesh with the output component 1300, and a magnet 1720 which changes the position in accordance with the rotation of the gear 1710. The position detecting component 1700 may be configured to detect the shift stage selected by the gear (e.g., shaft) 1710 via a sensor such as a Hall sensor which may detect a change in magnetic force based on the position of the magnet 1720. In an exemplary embodiment of the present disclosure, the position detecting component 1700 may be an external gear with the gear teeth formed at the outer periphery, and the rotary component 1320 may mesh with the gear 1710 to enable the position detecting component 1700 to detect the shift stage through a change in magnetic force induced by the magnet 1720 which changes the position in accordance with the rotation of the gear 1710. However, the disclosure is not limited thereto, and the position detecting component 1700 may be configured to detect the selected shift stage by the shaft 1310 in various ways including counting the number of the slits passing between a light-emitting element and a light-receiving element. In particular, the rotary component 1320 may have different structures such as a structure including slits as well as the external gear.

In the first exemplary embodiment, the first gear component 1200 and the driving force transfer component 1400 may be disposed on both (e.g., opposite) sides of the rotary component 1320 in terms of the lengthwise (e.g., longitudinal) direction of the shaft 1310, and the driving force transfer component 1400 may move in a direction toward the first gear component 1200 and the rotary component 1320 to be separated from the output component 1300. Additionally, the driving force transfer component 1400 may move in the direction away from the first gear component 1200 and the rotary component 1320 to be coupled with the output component 1300. However, the direction of movement may vary based on how the driving force transfer component 1400 is coupled with or separated from the output component 1300 with respect to the position of the driving force transfer component 1400.

Figure 27:
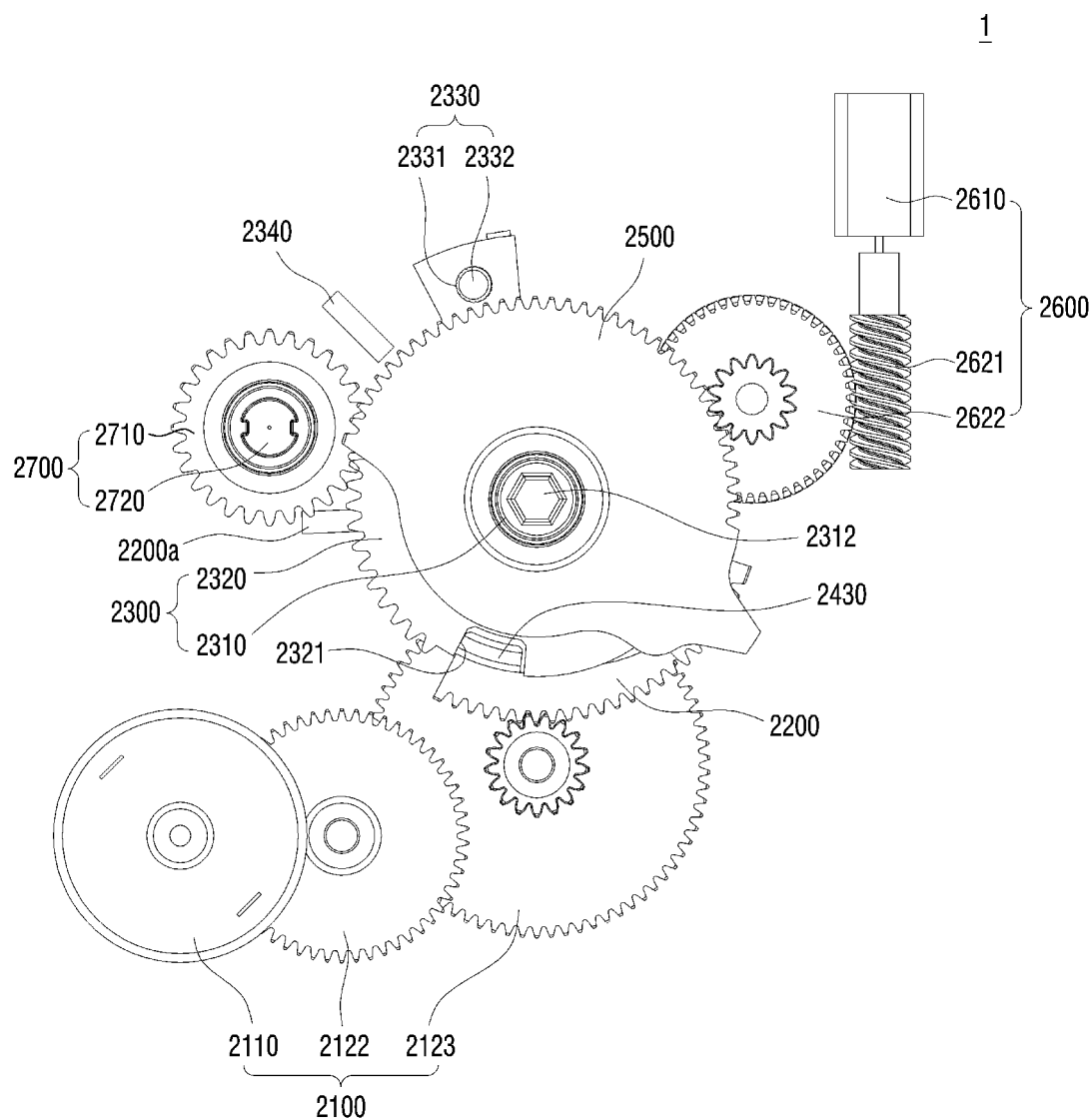
FIG. 27 is an exemplary plan view illustrating the controlling apparatus for the transmission according to another exemplary embodiment of the present disclosure.
Figure 28:
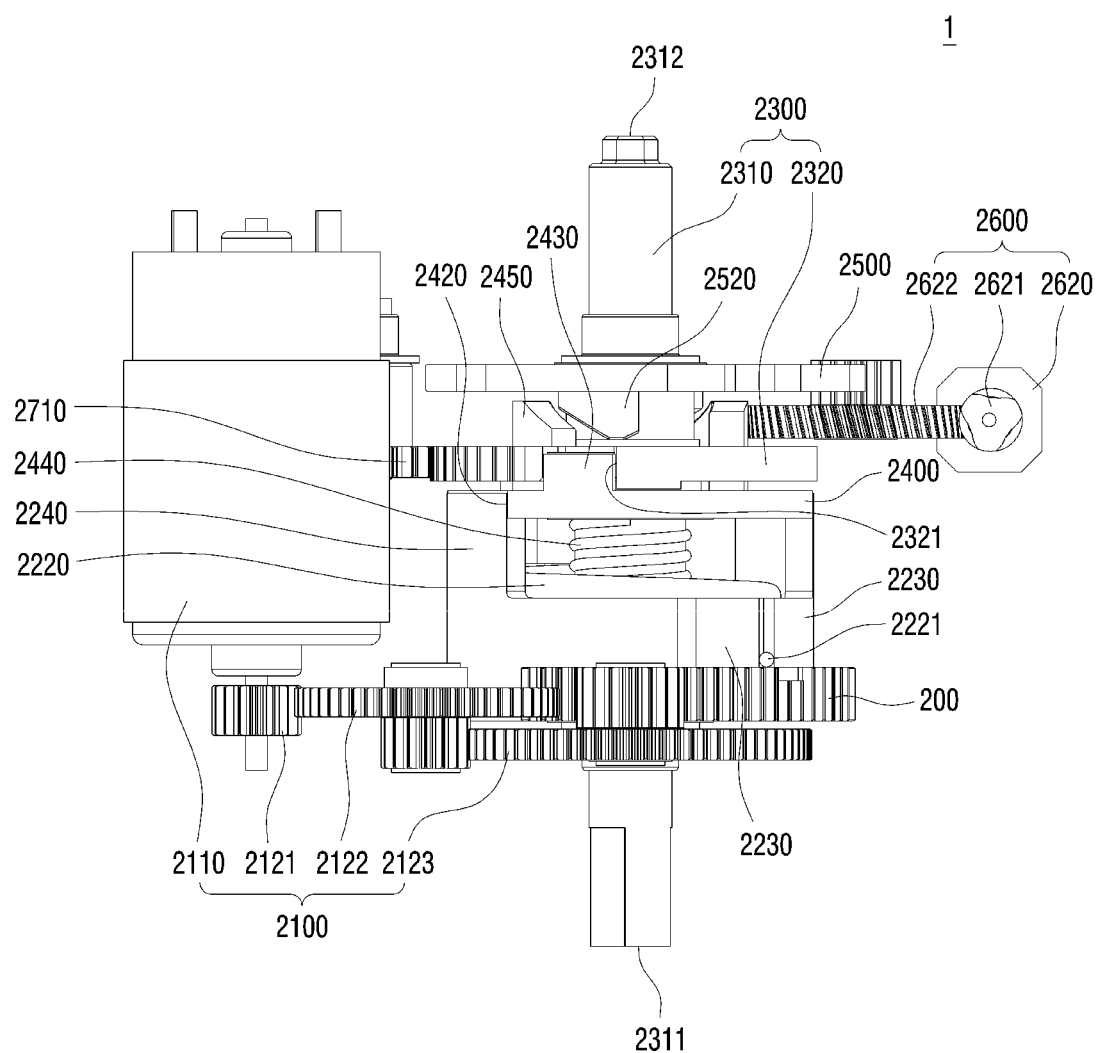
FIG. 28 is an exemplary side view illustrating the controlling apparatus for the transmission according to another exemplary embodiment of the present disclosure.
Figure 29:
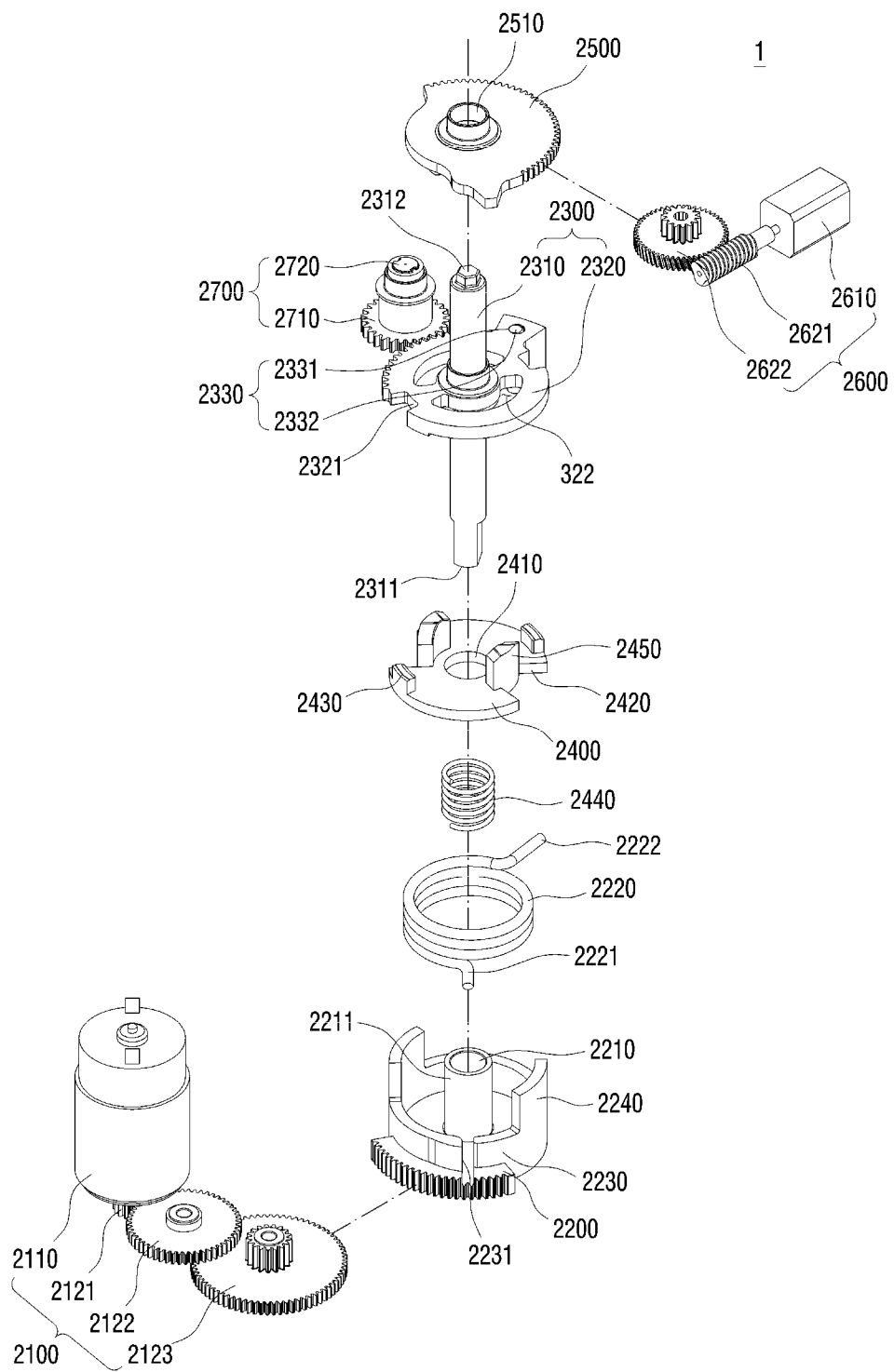
FIGS. 29 to 31 are exemplary exploded perspective views illustrating the controlling apparatus for the transmission according to another exemplary embodiment of the present disclosure.
Figure 30:
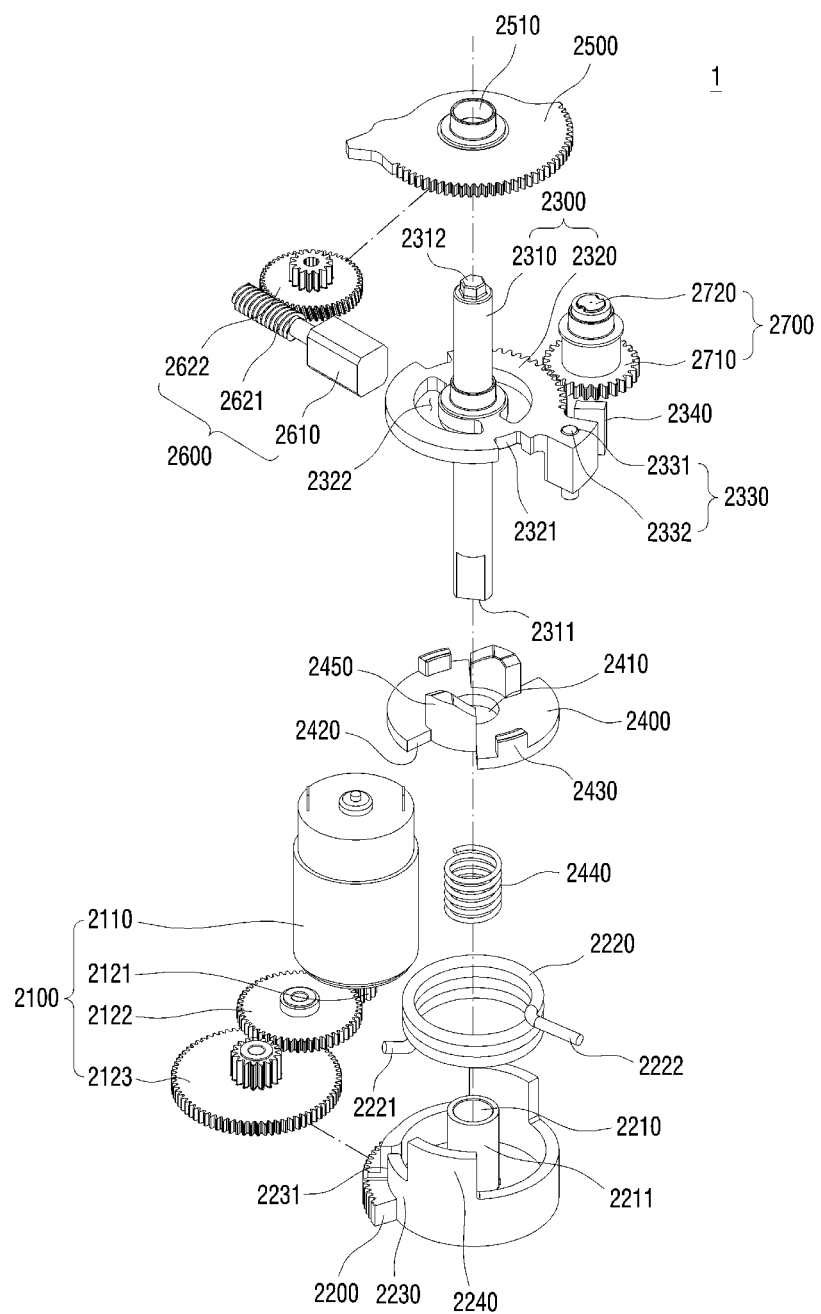
Figure 31:
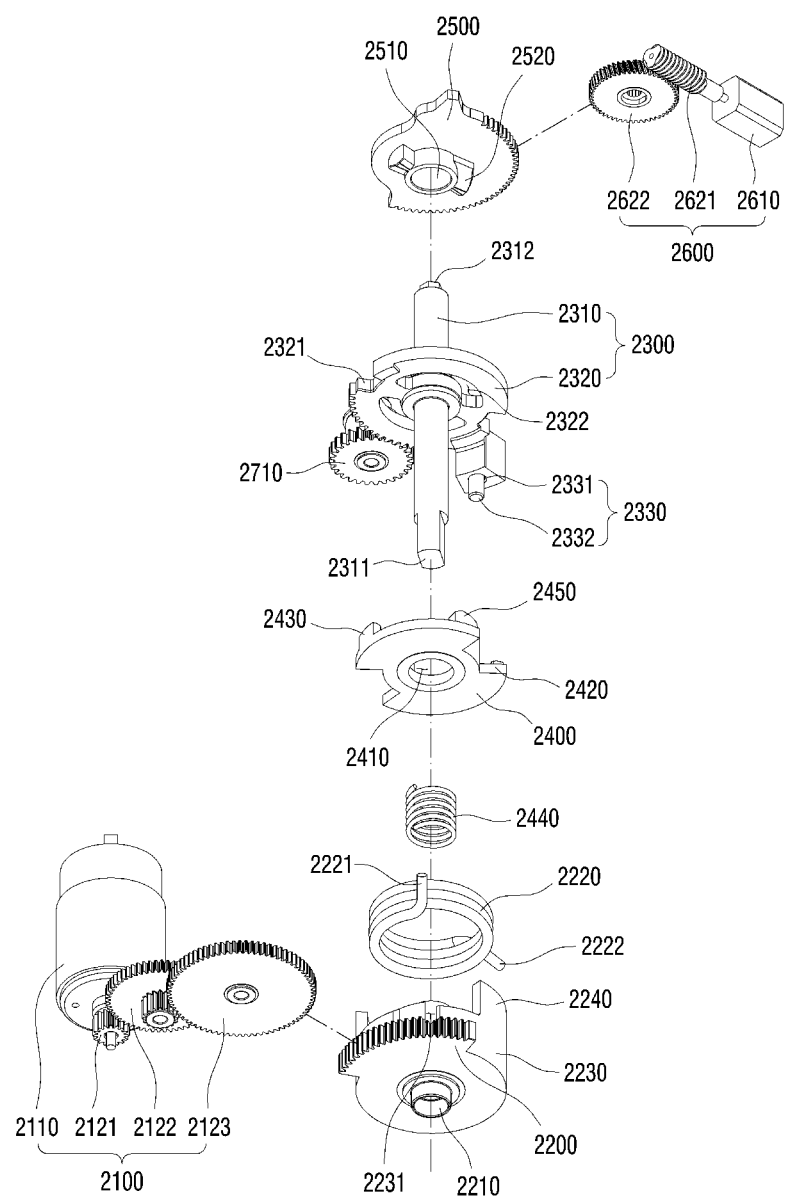

FIGS. 23 to 26 are exemplary perspective views illustrating the controlling apparatus for the transmission according to a second exemplary embodiment of the present disclosure. FIG. 27 is an exemplary perspective view illustrating a controlling apparatus for a transmission according to the second exemplary embodiment of the present disclosure. FIG. 28 is an exemplary plan view illustrating controlling apparatus for a transmission according to the second exemplary embodiment of the present disclosure. FIGS. 29 to 31 are exemplary exploded perspective views illustrating the controlling apparatus for the transmission according to the second exemplary embodiment of the disclosure.

Referring to FIGS. 23 through 31, a controlling apparatus 1 for the transmission according to the second exemplary embodiment of the present disclosure may include a driving component 2100, a first gear component 2200, an output component 2300, a driving force transfer component 2400, a second gear component 2500, a returning component 2600, and a position detecting component 2700.

In the second exemplary embodiment of the present disclosure, each of the driving component 2100, the first gear component 2200, the output component 2300, the driving force transfer component 2400, the second gear component 2500, the returning component 2600, and the position detecting component 2700 may operate similar to each of the driving component 1100, the first gear component 1200, the output component 1300, the driving force transfer component 1400, the second gear component 1500, the returning component 1600, and the position detecting component 1700 of the aforementioned first exemplary embodiment, except for some differences in shape, relative positions, and the like.

The driving component 2100 may provide the driving force to change the shift stage based on the gear selected by the driver's operation of the shift lever 2. The driving component 2100 may include an actuator 2110, and at least one driving gear 2121, 2122, and 2123 for transferring the driving force generated from the actuator 2110. The type or number of driving gears may be changed based on the driving force transfer mechanism, the reduction ratio, and the like. The driving component 2100 determines a shift stage based on the operating signal transferred from the shift lever 2, and may be controlled by a controller (not illustrated) which controls the power supplied to the driving component 2100 to rotate the shaft 2310 connected to the transmission 3 in accordance with the determined shift stage. The shaft 2310 may connect to the transmission 3 through a first aperture 2210 formed in the first gear component 2200, and first gear component 2200 may rotate around the shaft 2310 by the driving force through at least one driving gear 2121, 2122, and 2123 from the driving component 2100.

At least a part of the outer periphery of the first gear component 2200 may include a portion with gear teeth to mesh with at least one driving gear 2121, 2122, and 2123, and the driving force may be transferred to the first gear component 2200 through at least one driving gear 2121, 2123, and 2123. The output component 2300 may include a shaft 2310 connected to the transmission 3, and a rotary component 2320 coupled with the shaft 2310 and configured to rotate around the shaft 2310. When the rotary component 2320 is rotated, the shaft 2310 may simultaneously rotate, and the shift stage of the transmission 3 can be changed. One end 2311 of the shaft 2310 may be directly or indirectly connected to the transmission 3. The shaft 2310 may be indirectly connected to the transmission 3, and the rotational force of the shaft 2310 may be transferred to the transmission 3 by at least one transfer component capable of transferring the rotational force of the shaft 2310, such as a gear or a link. In the second exemplary embodiment of the present disclosure, the shaft 2310 and the rotary component 2320 may be coupled to each other and may include a case where the shaft 2310 and the rotary component 2320 are integrally formed, in addition to a case where the shaft 2310 and the rotary component 2320 are formed separately, and then coupled to each other.

The first gear component 2200 and the output component 2300 may support a first end 2221 and a second end 2222 of the elastic component 2220, respectively. Thus, the rotation of either the first gear component 2200 or the output component 2300 may elastically deform to compress or relax the elastic component 2220. The elastic component 2220 may be disposed in an internal cavity of an extending portion 2230 extending from at least a portion of the periphery of the first aperture 2210 of the first gear component 2200 toward the output component 2300. The extending portion 2230 may include a fixing groove 2231 into which one end 2221 of the elastic component 2220 may be inserted and fixed. In the second exemplary embodiment of the present disclosure, the extending portion 2230 may be formed at a position separated from the outer periphery of the first aperture 2210 by a predetermined distance. However, the position of the extending portion 2230 may be changed without being limited thereto.

In the second exemplary embodiment of the present disclosure, the first end 2221 of the elastic component 2220 may be inserted and fixed into the fixing groove 2231 formed in the extending portion 2230 of the first gear component 2200. However, the present disclosure is not limited thereto, and the first end 2221 of the elastic component 2220 may be fixed to a housing or another fixing structure, in addition to the first gear component 2200. The second end 2222 of the elastic component 2220 may extend from the first end 2221, wound along the interior surface of the extending portion 2230, and the elastic component 2220 may be supported by the support portion 2330 formed on one side of the outer periphery of the rotary component 2320. The support portion 2330 may include a support groove 2331 on one side of the outer periphery of the rotary component 2320, and a support pin 2332 inserted into the support groove 2331. The second end 2222 of the elastic component 2220 may be supported by the support pin 2332.

In the second exemplary embodiment of the present disclosure, the elastic component 2220 may be disposed to be wound around the interior surface of the extending portion 2230, but the present disclosure is not limited thereto. The elastic component 2220 may be disposed to be wound along the exterior surface of the extending portion 2230, or the extending portion 2230 may be omitted, based on the type of the elastic component 2220 used. Further, in the second exemplary embodiment of the present disclosure, a torsion spring may be used as the elastic component 2220. However, the present disclosure is not limited thereto, as the elastic component 2220 may include various types of springs, such as leaf springs, capable of being compressed and relaxed by rotation of either the first gear component 2200 or the output component 2300, in addition to the torsion spring.

As described above, when the first gear component 2200 and the output component 2300 rotate around the shaft 2310, the first gear component 2200 and the output component 2300 may be disposed in the lengthwise direction of the shaft 2310. As a result, when at least one of the first gear component 2200 or the output component 2300 is rotated, the elastic component 2220 may be compressed or relaxed.

A second aperture 2410 through which the shaft 2310 passes may be formed in the driving force transfer component 2400, and the driving force transfer component 2400 may serve to transfer the driving force from the first gear component 2200 to the output component 2300, by rotating around the shaft 2310 with the driving force transferred from the first gear component 2200. The driving force transfer component 2400 may include an insertion groove 2420 into which the insertion rib 2240 on the first gear component 2200 is inserted. Therefore, the driving force transfer component 2400 and the first gear component 2200 may be coupled and rotate together. The insertion rib 2240 may be formed to extend along the lengthwise (e.g. longitudinal) direction of the shaft 2310 facing the driving force transfer component 2400. Accordingly, when the driving force transfer component 2400 is displaced in the lengthwise (e.g., longitudinal) direction of the shaft 2310, the insertion rib 2240 may be maintained within the insertion groove 2420.

In the second exemplary embodiment of the present disclosure, the insertion groove 2420 of the driving force transfer component 2400 may be formed so as to be recessed from one side of the outer periphery toward the center of the driving force transfer component 2400, and the insertion rib 2240 of the first gear component 2200 may be formed to protrude from the extended distal end of the extending portion 2230 toward the driving force transfer component 2400. However, the disclosure is not limited thereto, and the number or the position of the insertion ribs 2240 may be changed based on the number or the positions of the insertion grooves 2420.

The driving force transfer component 2400 may include a coupling rib 2430 inserted into the coupling groove 2321 formed in the rotary component 2320. When the coupling rib 2430 is inserted into the coupling groove 2321, the driving force transferred from the first gear component 2200 may be transferred to the rotary component 2320 via the driving force transfer component 2400, and the output component 2300 may rotate. When the coupling rib 2430 of the driving force transfer component 2400 is separated (e.g., dislodged) from the coupling groove 2321 of the rotary component 2320, the driving force from the first gear component 2200 is not transferred to the output component 2300 via the driving force transfer component 2400.

Figure 32:
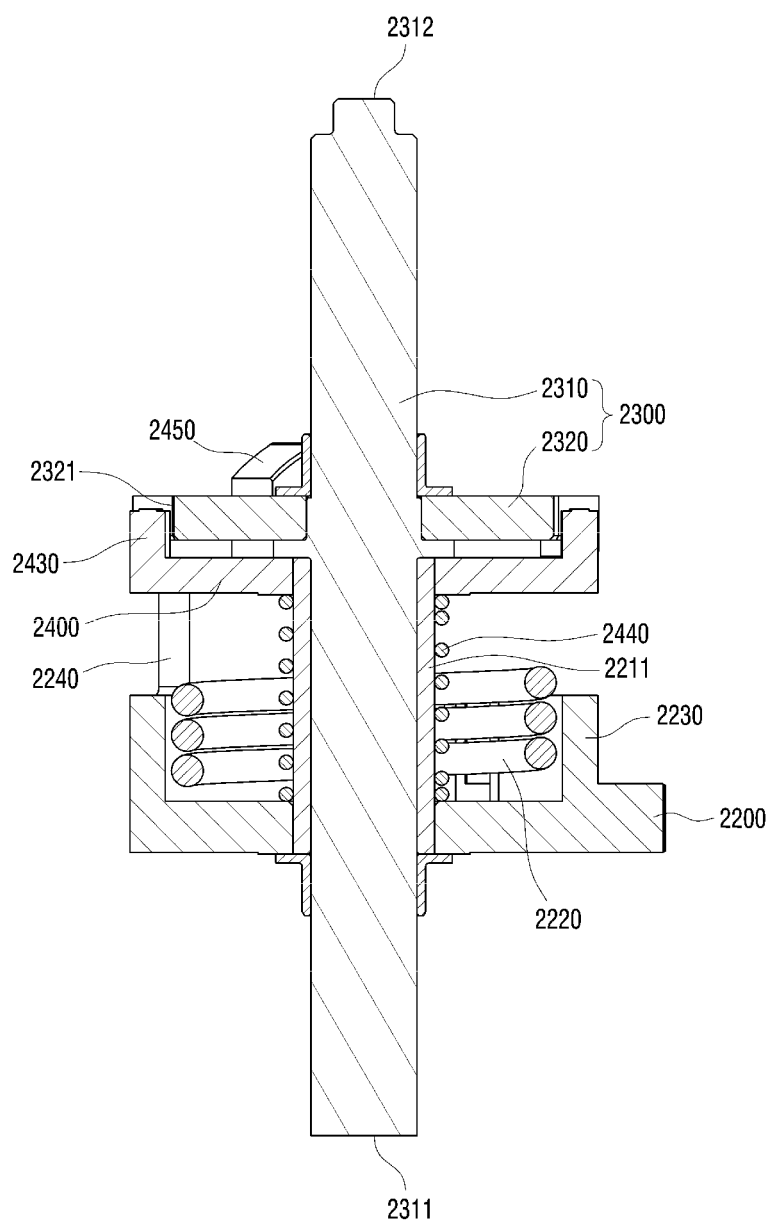
FIGS. 32 and 33 are exemplary cross-sectional views illustrating a driving force transfer component according to another exemplary embodiment of the present disclosure.

A spring component 2440 may be disposed between the first gear component 2200 and the driving force transfer component 2400, and both ends of the spring component 2440 are in contact with the first gear component 2200 and the driving force transfer component 2400, respectively, as illustrated in FIG. 32. The elastic force of the spring component 2440 supports the driving force transfer component 2400 to maintain the coupling rib 2430 inserted into the coupling groove 2321 of the rotary component 2320.

Figure 33:
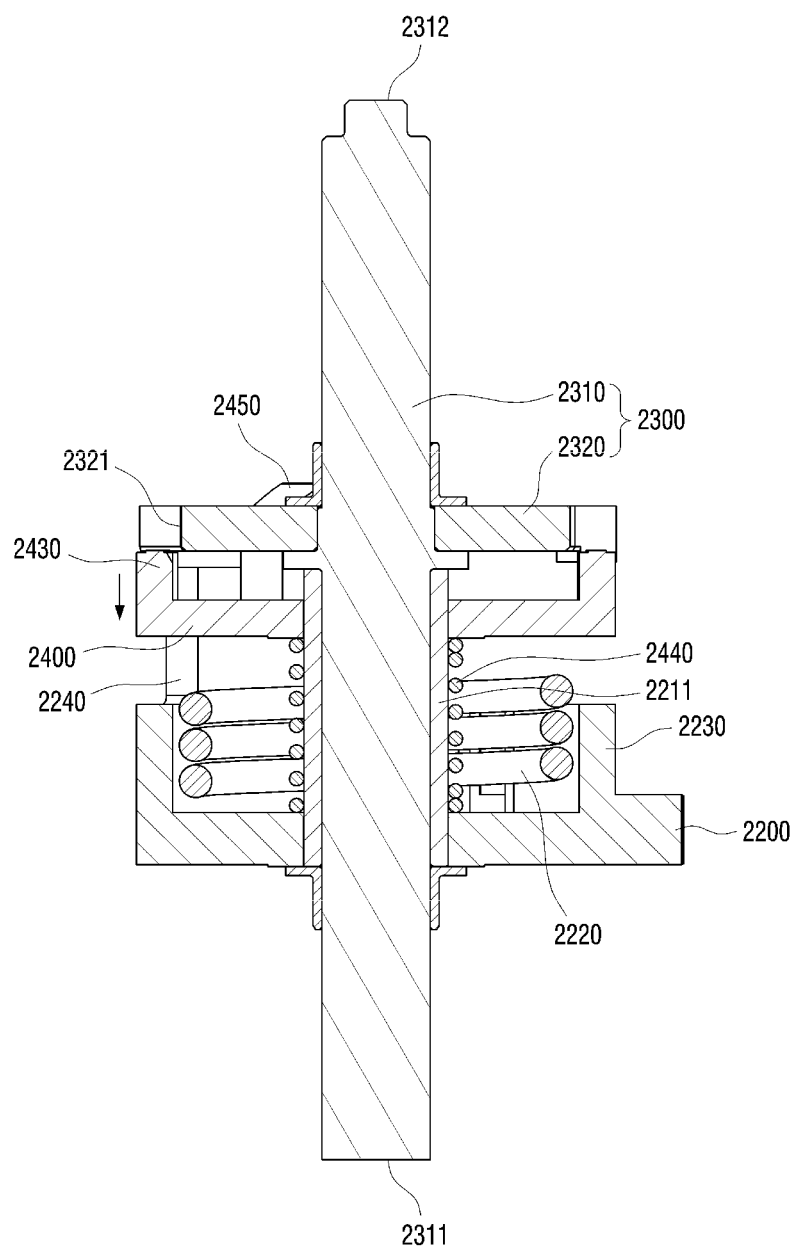

When the driving force transfer component 2400 receives a force in the direction that the spring component 2440 is compressed as illustrated in FIG. 33, the coupling rib 2430 may be detached from the coupling groove 2321 of the rotary component 2320, and the driving force transfer component 2400 may be separated (decoupled) from the output component 2300. When the force applied to the driving force transfer component 2400 is removed, as illustrated in FIG. 32, the restoring force of the spring component 2400 inserts the coupling rib 2430 into the coupling groove 2321 of the rotary component 2320 again, and the driving force transfer component 2400 may be coupled with the output component 2300.

In the second exemplary embodiment of the present disclosure, the spring component 2440 may be a coil spring which is in contact with the driving force transfer component 2400 and the first gear component 2200, and may be wound along the shaft 2310 from one side abutting the first gear component 2200. However, the disclosure is not limited thereto. The spring component 2440 may be various kinds of springs, provided that both ends thereof are in contact with the first gear component 2200 and the driving force transfer component 2400, respectively, and may be elastically deformed when a force is applied to the driving force transfer component 2400. In addition, the spring component 2440 may be wound around the exterior wall 2211 protruding toward the driving force transfer component 2400 from the periphery of the first aperture 2210 and enclosing a portion of the shaft 2310 which passes through the first aperture 2210. Accordingly, a structural interference between the shaft 2310 and the spring component 2440 may be prevented.

Further, in the second exemplary embodiment of the present disclosure, the coupling groove 2321 may be formed to be recessed from one side of the outer periphery of the rotary component 2320 toward the center thereof. The coupling rib 2430 may be formed to extend from the outer periphery of the driving force transfer component 2400 toward the rotary component 2320 along the longitudinal direction of the shaft 2310. However, the present disclosure is not limited thereto, and the number or the position of the coupling ribs 2430 may be varied based on the number or positions of the coupling grooves 2321.

In the second exemplary embodiment of the present disclosure, when the driving force transfer component 2400 may be coupled with the rotary component 2320 and moves away from the first gear component 2200, the driving force transfer component 2400 is coupled with the output component 2300. Additionally, when the driving force transfer component 2400 is separated from the rotary component 2320 and moves toward the first gear component 2200, the driving force transfer component 2400 may be separated from the output component 2300. When the driving force transfer component 2400 moves in the longitudinal direction whether coupled with or separated from the output component 2300, the insertion rib 2240 of the first gear component 2200 may be maintained inserted into the insertion groove 2420 of the driving force transfer component 2400, and the movement of the driving force transfer component 2400 may be guided.

The second gear component 2500 may be configured to be rotated around the shaft 2310 by a returning component 2600 to be described later, and may include a third aperture 2510 through which the shaft 2310 passes, and may serve to separate the driving force transfer component 2400 from the output component 2300. The driving force transfer component 2400 and the second gear component 2500 may be disposed at the opposite sides of the rotary component 2320 in the lengthwise (e.g., longitudinal) direction of the shaft 2310, and the second gear component 2500 may include a second protruding portion 2520 that has the same rotary path as a first protruding portion 2450 formed to protrude toward the second gear component 2500 side from the driving force transfer component 2400 through a passage aperture 2322 of the rotary component 2320. Since the first protruding portion 2450 and the second protruding portion 2520 have the same rotary path, they may contact each other as at least one of the driving force transfer component 2400 or the second gear component 2500 rotates.

The contact surfaces of first protruding portion 2450 and the second protruding portion 2520 may be formed to be inclined toward each other, and one of the first protruding portion 2450 and the second protruding portion 2520 may be disposed above the other thereof.

Figure 34:
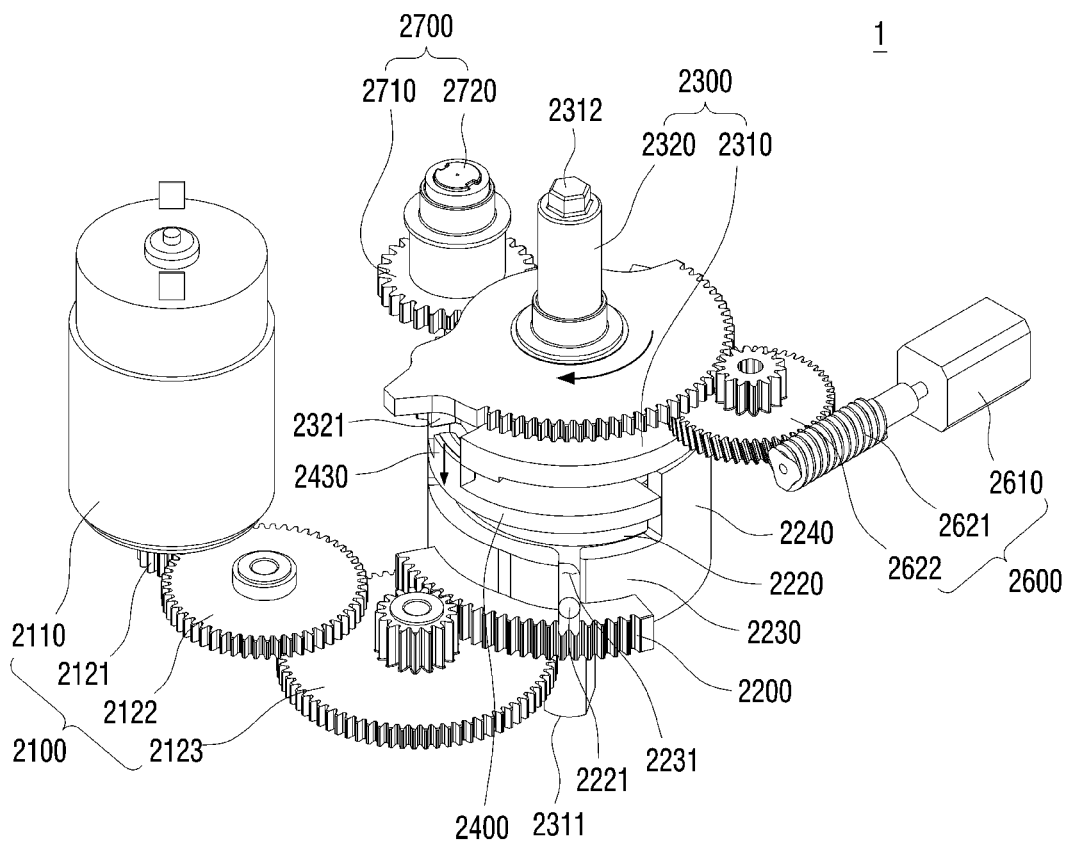
FIG. 34 is an exemplary perspective view of a second gear component rotated by a returning component according to another exemplary embodiment of the present disclosure.
Figure 35:
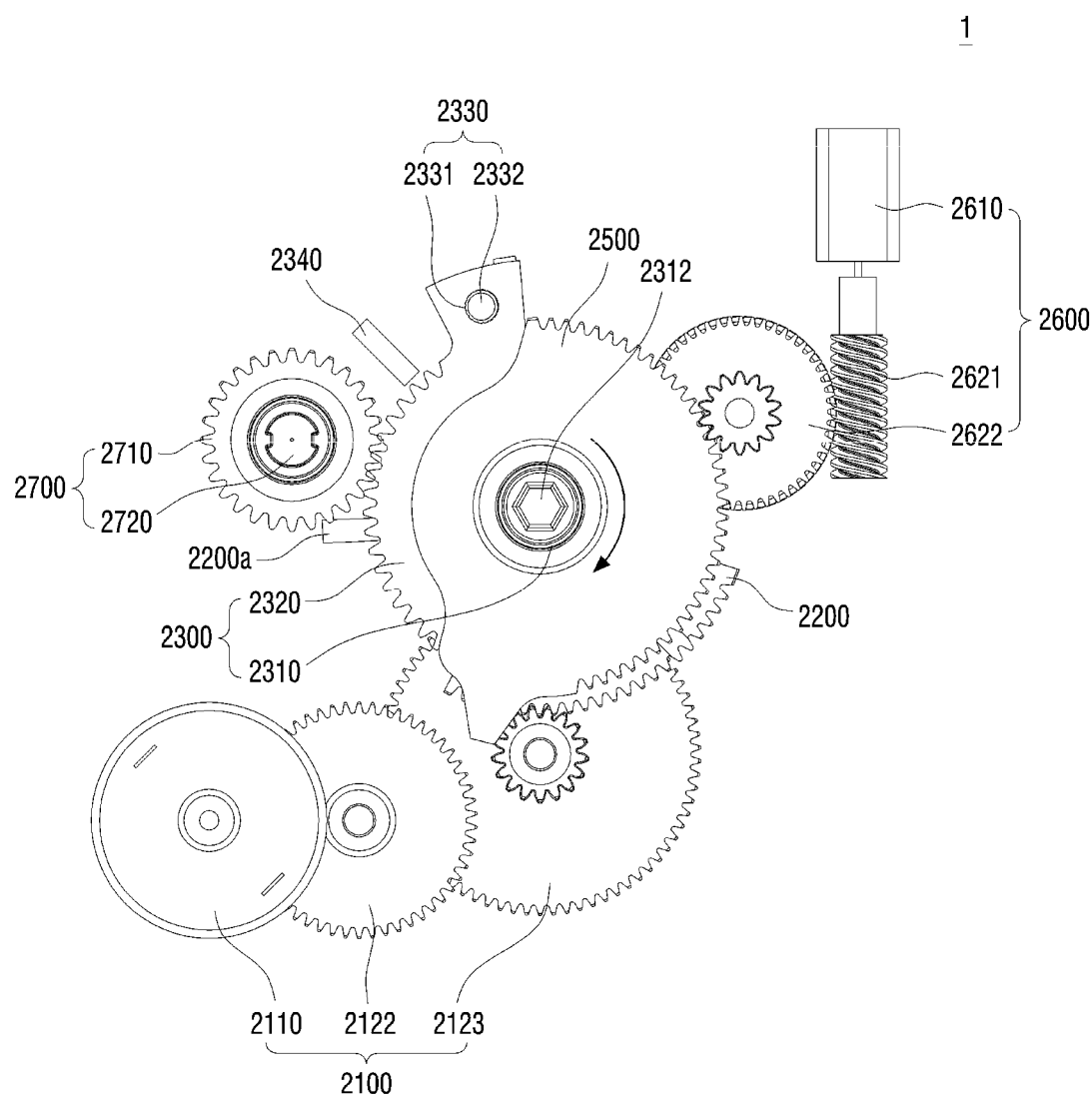
FIG. 35 is an exemplary plan view illustrating a second gear component rotated by the returning component according to another exemplary embodiment of the present disclosure.

In the second exemplary embodiment of the present disclosure, the second gear component 2500 may be rotated by the returning component 2600, and the second protruding portion 2520 may be disposed above the first protruding portion 2450. In other words, when the second gear component 2500 is rotated by the returning component 2600 as illustrated in FIGS. 34 and 35, the second protruding portion 2520 may be disposed on the upper side of the first protruding portion 2450, the first protruding portion 2450 may receive an axial force by the second protruding portion 2520, and the driving force transfer component 2400 may be displaced in the direction away from the rotary component 2450 and toward the first gear component 2200. Consequently, the coupling rib 2430 of the driving force transfer component 2400 may be detached from the coupling groove 3221 of the rotary component 2320, and the output component 2300 and the driving force transfer component 2400 are separated from each other.

In the second exemplary embodiment of the present disclosure, the axial position of the driving force transfer component 2400 may be changed by the second gear component 2500 rotated by the driving force of the returning component 2600, resulting in the driving force transfer component 2400 from being separated from the output component 2300. However, the present disclosure is not limited thereto, and the axial position of the driving force transfer component 2400 may be also changed by various types of the driving forces from the returning component 2600, including a solenoid.

Figure 37:
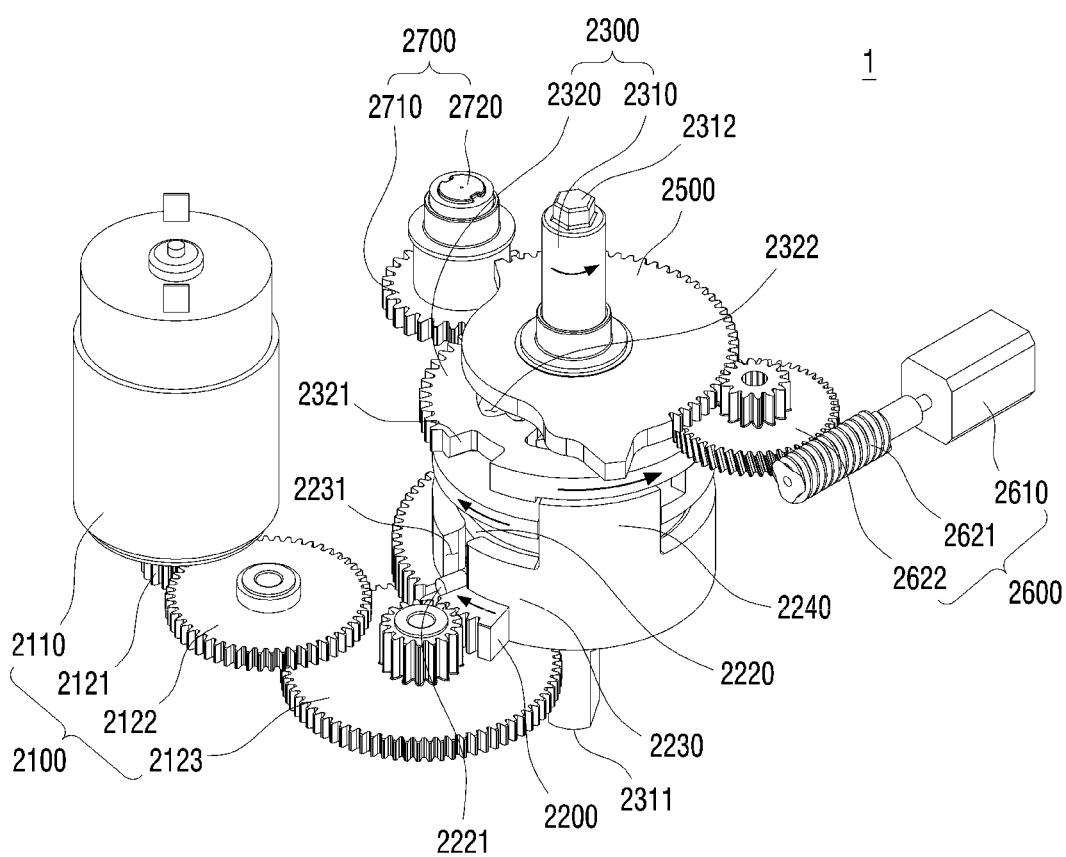
FIGS. 37 and 38 are exemplary schematic views illustrating the operation of returning to the initial stage by the restoring force of the elastic component according to another exemplary embodiment of the present disclosure.
Figure 38:
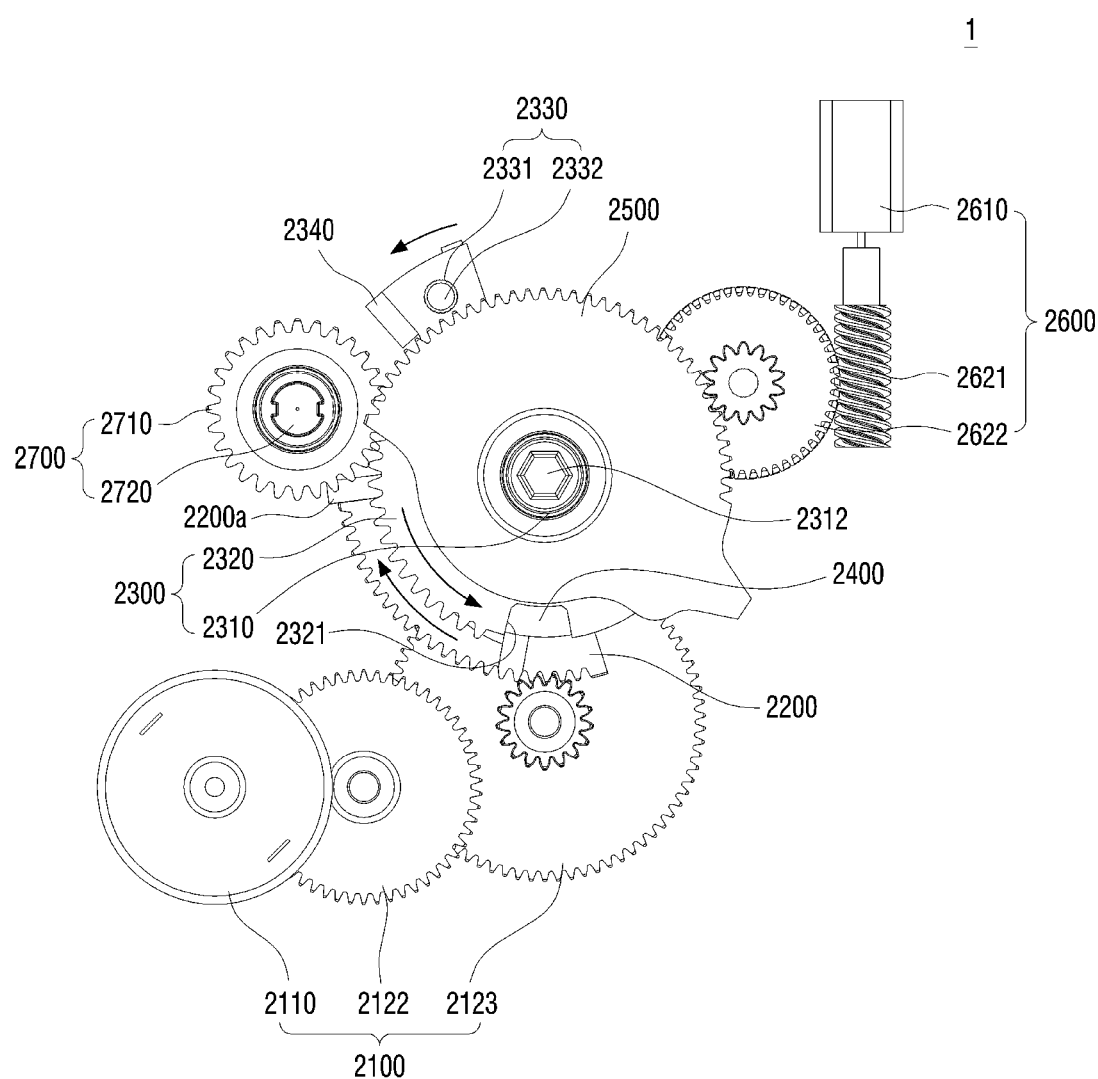

When the driving force transfer component 2400 is separated from the output component 2300, the output component 2300 and the driving force transfer component 2400 may be configured to rotate in the opposite directions due to the restoring force of the elastic component 2220. In other words, since the insertion rib 2240 of the first gear component 2200 is inserted into the insertion groove 2420 in the driving force transfer component 2400, the driving force transfer component 2400 may rotate in the same direction as the first gear component 2200 by the restoring force of the elastic component 2220 when the driving force transfer component 2400 is separated from the output component 2300, as illustrated in FIGS. 37 and 38. At the same time, the output component 2300 may be configured to rotate in the direction opposite to the driving force transfer component 2400.

The rotation of the output component 2300 may be restricted by a stopper 2340 disposed on the rotary path of the support portion 2330 formed at the outer periphery of the rotary component 2320, to allow the shaft 2310 to be returned to the initial stage position. The stopper 2340 may serve to allow the output component 2300 to more accurately return to the initial stage position, and the point on which the support portion 2330 abuts the stopper 2340 may correspond to the initial stage position. In the second exemplary embodiment of the present disclosure, the stopper 2340 may be separately disposed on the rotary path of the support portion 2330, but this is merely an example to enhance understanding of the present disclosure. The present disclosure is not limited thereto, and the interior surface of the housing in which the controlling apparatus 1 for the transmission of the present disclosure may accommodate the stopper 2340. Since the over-rotation of the output component 2300 is restricted by the stopper 2340, the shaft 2310 may more accurately return to the initial stage position. Additionally, restriction of the rotation of the support portion 2330 using the stopper 2340 may prevent rotation of the support portion 2330.

As described above, when the driving force transfer component 2400 is separated from the output component 2300, the first gear component 2200 may be configured to simultaneously rotate with the driving force transfer component 2400 and may be rotated in the opposite direction to the output component 2300 by the restoring force of the elastic component 2220. In particular, rotation of the first gear component 2200 may be restricted by a stopper 2200a disposed in the vicinity of one side of the outer periphery, similarly to the stopper 2340 disposed on the rotary path of the support portion 2330 of the output component 2300. In the second exemplary embodiment of the present disclosure, the stopper 2200a for restricting the rotation of the first gear component 2200 may be separately disposed proximate to the outer periphery of the first gear component 2200. However, the present disclosure is not limited thereto, and the stopper 2200a may be provided by an interior surface of the housing which accommodates the controlling apparatus 1 for the transmission of the present disclosure.

Hereinafter, in the second exemplary embodiment of the present disclosure, the point at which the support portion 2330 abuts the stopper 2340 may correspond to the parking stage (P) as the initial stage position. When the support portion 2330 rotates in a direction away from the stopper 2340, non-parking stages, e.g., the return stage (R), the neutral stage (N), the drive stage (D), and the like, may be selected according to the rotation angle (e.g., angular position) of the support portion 2330.

When at least one returning condition is satisfied, the returning component 2600 may be configured to generate a driving force for returning the output component 2300 to the initial stage position. In the second exemplary embodiment of the present disclosure, the returning component 2600 may be configured to generate the driving force when an emergency situation occurs, such as the case when the battery is discharged or the vehicle is abnormally turned off. Since the power supply from the vehicle may be shut off in an emergency situation, the returning component 2600 may include an auxiliary power supply device such as an auxiliary battery for supplying the power capable of returning the output component 2300 to the initial stage position. The returning component 2600 may be operated by the control signal from the above-described controller 2600 output when at least one returning condition is satisfied, and when the returning condition is not satisfied, the returning component 2600 shuts off the rotation of the second gear component 2500. When the driving force is generated from the returning component 2600, the driving component 2100 does not operate, and the first gear component 2200 may freely rotate.

Figure 36:
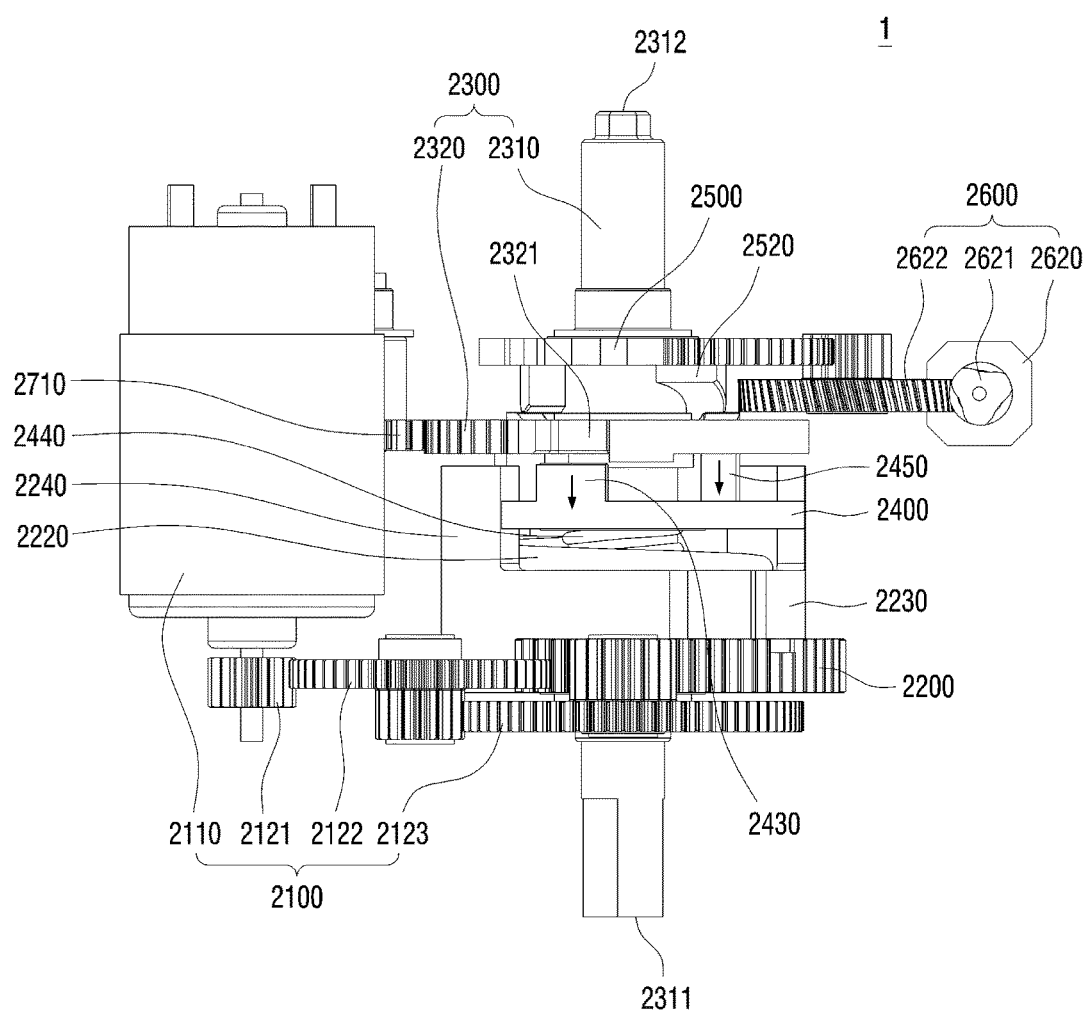
FIG. 36 is an exemplary side view illustrating the driving force transfer component which is separated from the output component by the rotation of the second gear component according to another exemplary embodiment of the present disclosure.

The returning component 2600 may include an actuator 2610, and at least one transfer gear 2621 and 2622 which transfers the driving force of the actuator 2610 to the second gear component 2500. Various kinds or numbers can be used for the gears 2621 and 2622, based on the driving force transfer mechanism, the reduction ratio, and the like. The returning component 2600 may configured to generate the driving force in the above-described emergency situations to rotate the second gear component 2500 as illustrated in FIGS. 34 and 35. In this case, as illustrated in FIG. 36, the driving force transfer component 2400 may be separated from the output component 2300 as the second protruding portion 2520 presses (e.g., applies force to) the first protruding portion 2450. When the driving force transfer component 2400 is separated from the output component 2300, the second gear component 2500 may be rotated in the reverse direction to return the second protruding portion 2520 to the original position.

Figure 39:
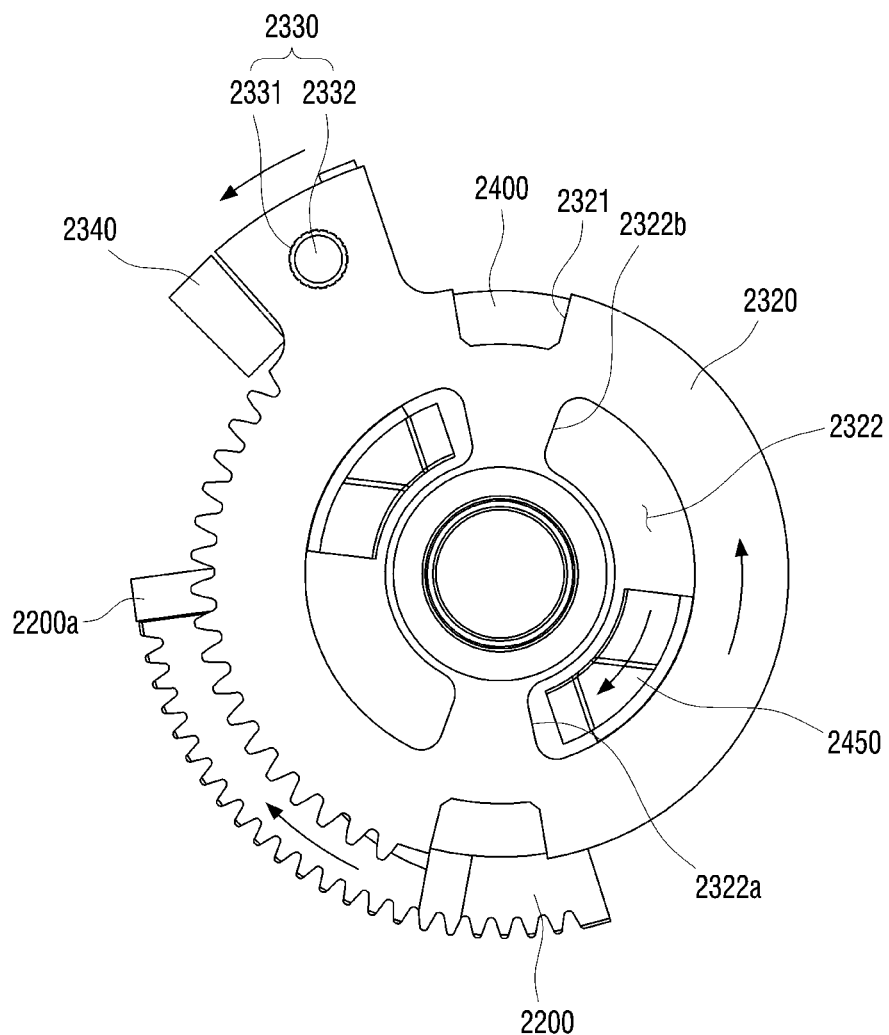
FIG. 39 is an exemplary schematic view illustrating the position of a first protruding portion when returning to the initial stage according to another exemplary embodiment of the present disclosure.

When the driving force transfer component 2400 is separated from the output component 2300, the driving force transfer component 2400 may be configured to rotate in the opposite direction to the output component 300. In this case, as illustrated in FIG. 39, the first protruding portion 2450 may be positioned on a first end 2322a of the passage aperture 2322 of the rotary component 2320, and the rotation of the driving force transfer component 2400 may be restricted. The output component 2300 may be configured to rotate in the opposite direction to the first gear component 2200 and the driving force transfer component 2400 until the support portion 2330 abuts the stopper 2340, and the output component 2300 may return to the initial stage position. The first gear component 2200 may be configured to rotate in the opposite direction to the output component 2300 until the first gear component 2200 abuts the stopper 2200a.

Figure 40:
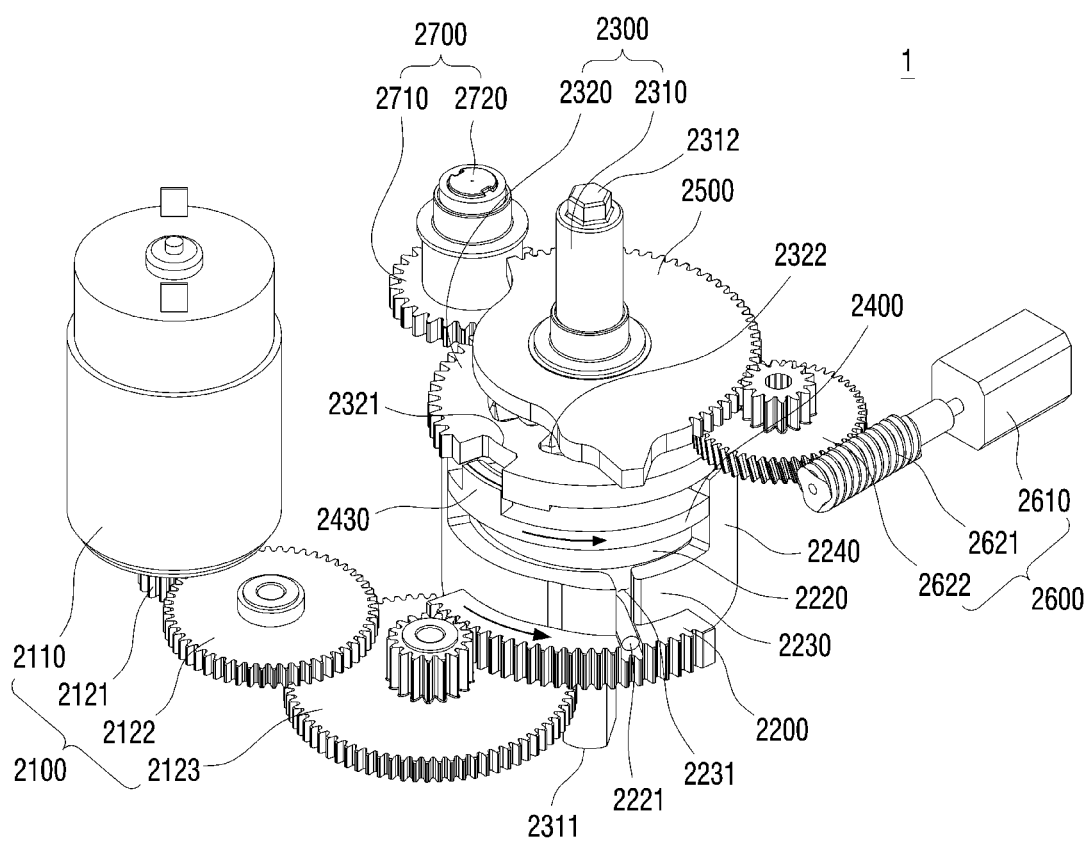
FIGS. 40 and 41 are exemplary schematic views illustrating the operation of the first gear component and the driving force transfer component during the initializing procedure according to another exemplary embodiment of the present disclosure.
Figure 41:
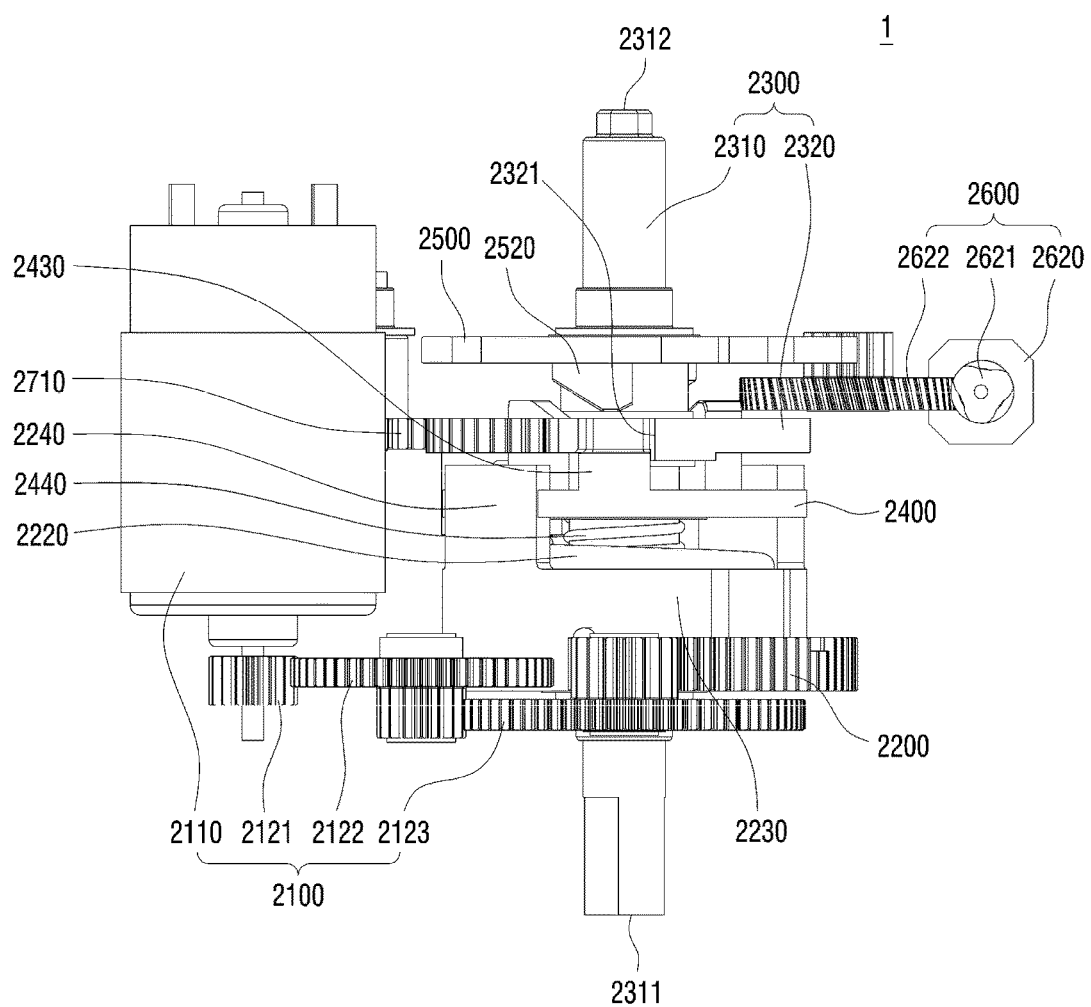
Figure 42:
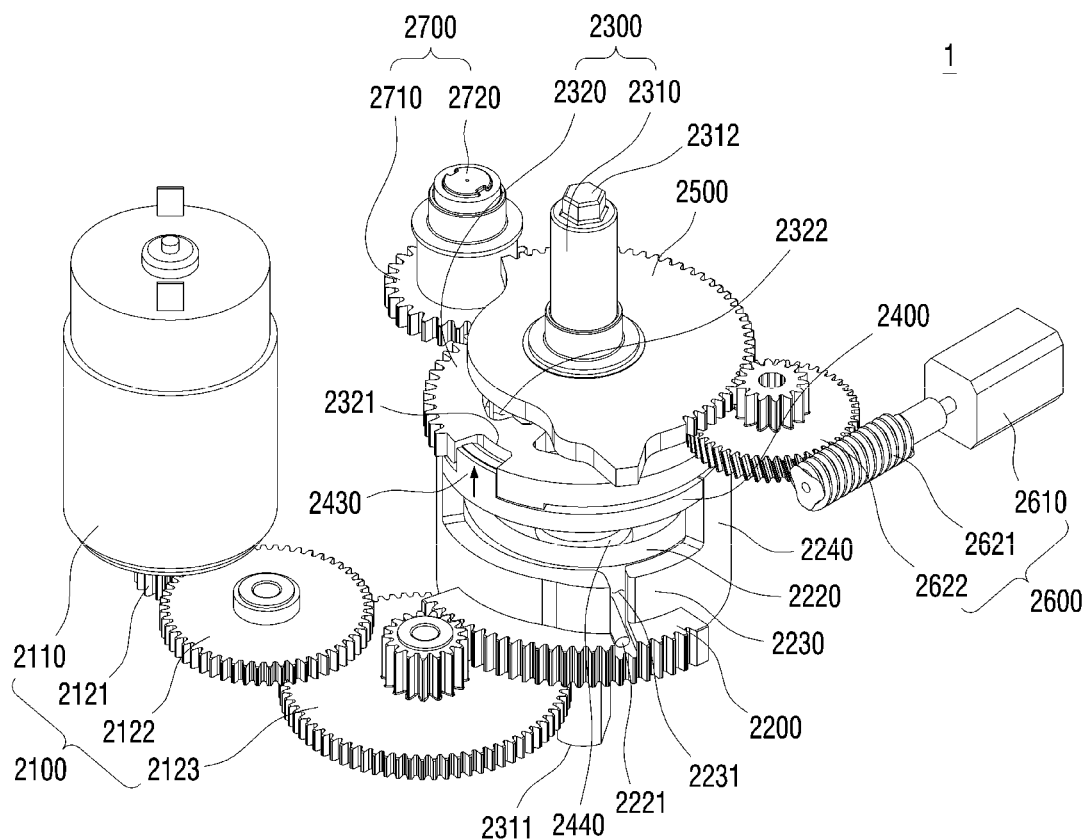
FIGS. 42 and 43 are exemplary schematic views illustrating coupling ribs aligned with the coupling grooves during the initializing procedure according to another exemplary embodiment of the present disclosure.
Figure 43:
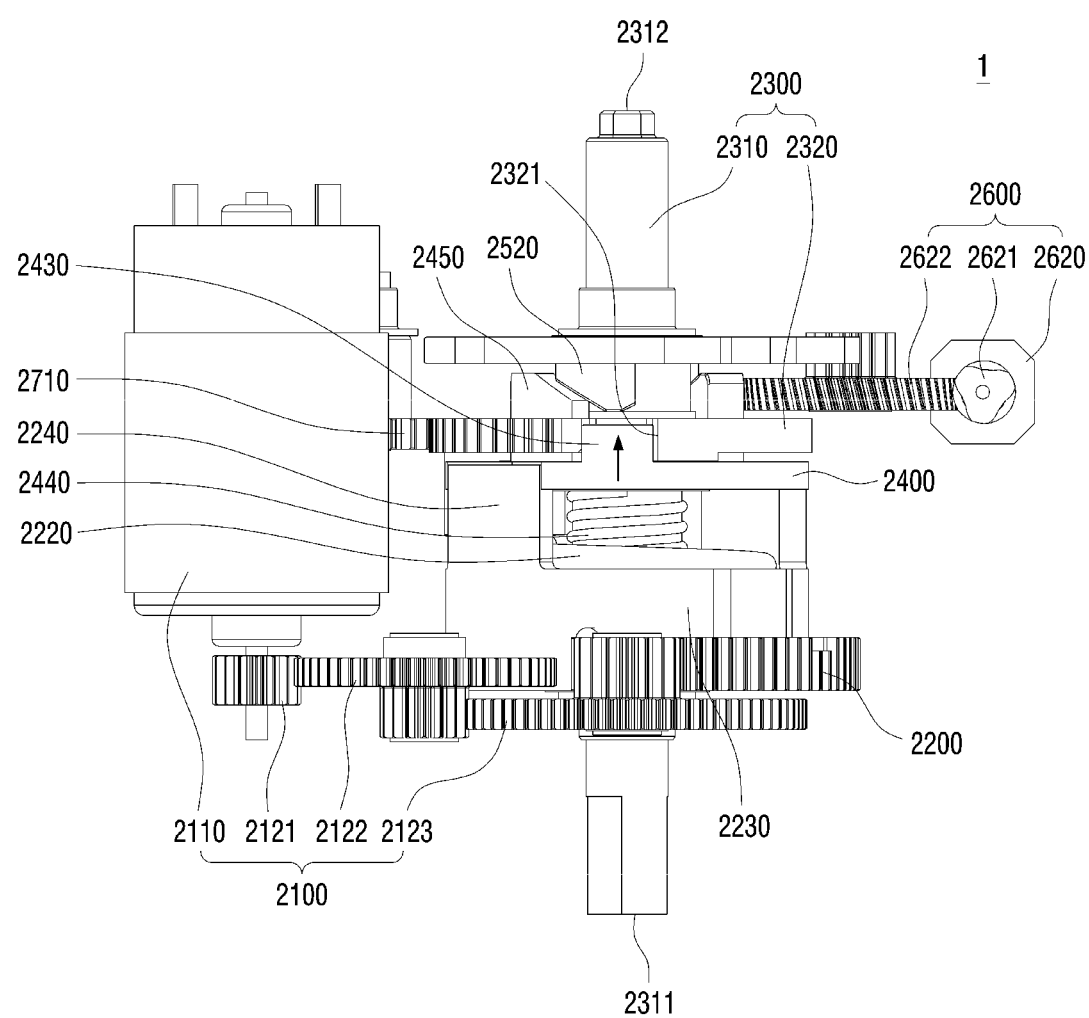
Figure 44:
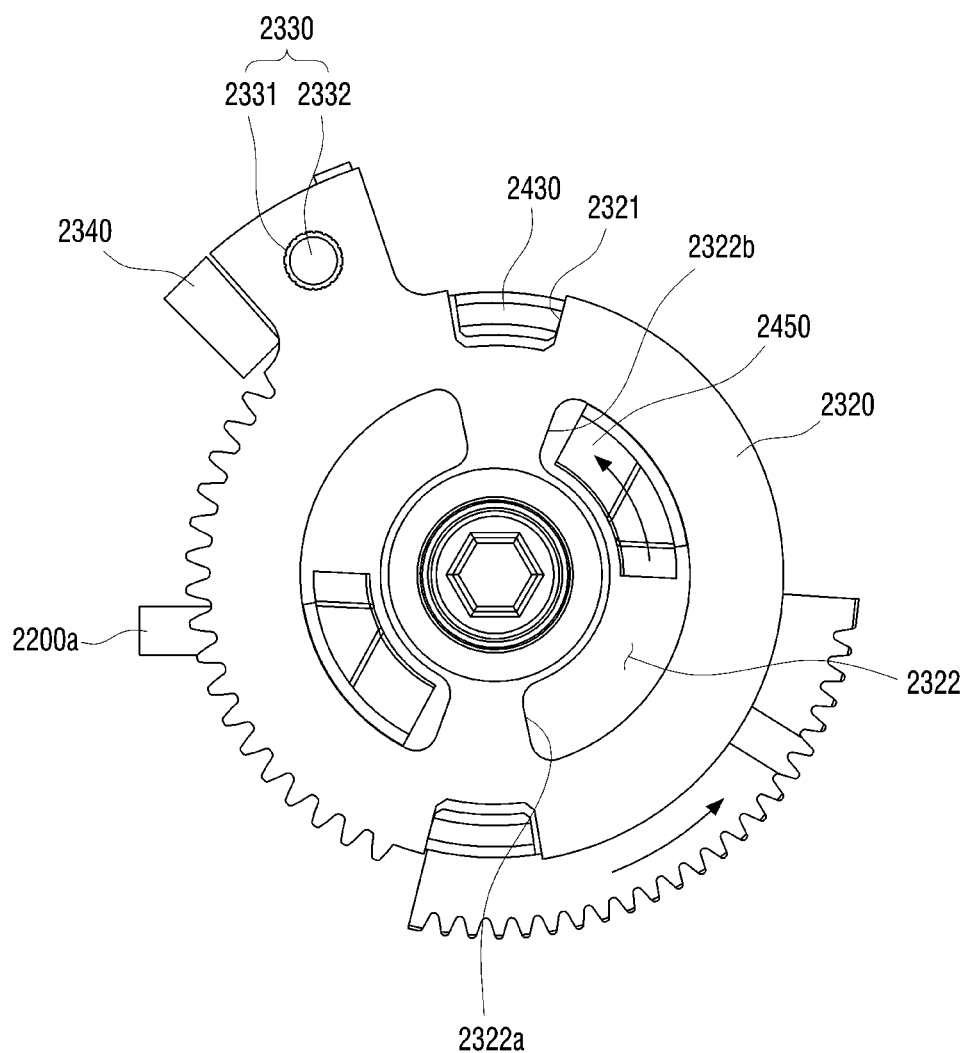
FIG. 44 is an exemplary schematic view illustrating the position of the first protruding portion during the initializing procedure according to another exemplary embodiment of the present disclosure.

As described above, after the output component 2300 may be returned to the initial stage position by the restoring force of the elastic component 2220, when the returning condition is not satisfied, i.e., when the emergency situation is relieved, the driving component 2100 may perform an initializing procedure to enable the driving force transfer component 2400 to be coupled with the output component 2300 again. When the emergency situation is relieved, the driving component 2100 may rotate the first gear component 2200 in a direction in which the elastic component 2220 is compressed. The driving force transfer component 2400 may rotate together with the first gear component 2200. The support portion 2330 of the output component 2300 abuts the stopper 2340 and the rotation thereof may be restricted. Therefore, when the first gear component 2200 is rotated by the driving component 2100, the elastic component 2220 may be compressed. When the first gear component 2200 is rotated by the driving component 2100, and the coupling rib 2430 of the driving force transfer component 2400 aligns with the coupling groove 2321, as illustrated in the aforementioned FIGS. 40 and 41, the coupling rib 2430 may be displaced in the direction of being inserted into the coupling groove 2321 by the restoring force of the spring component 2440 as illustrated in FIG. 32. Then, the driving force transfer component 2400 may be coupled with the output component 2300 as illustrated in FIGS. 42 and 43. In this case, the driver may change the shift stage with the shift lever 2. Further, as described above, while the initializing procedure is performed by the driving component 2100, the first protruding portion 2450 may move along the passage aperture 2322 of the rotary component 2320, and may be disposed on a second end 2322b of the passage aperture 2322 as illustrated in FIG. 44, contrary to the aforementioned FIG. 39.

The position detecting component 2700 may be configured to detect the shift stage selected by the rotation (e.g., angular position) of the output component 2300. In the second exemplary embodiment of the present disclosure, the position detecting component 2700 may include a gear 2710 to mesh with the rotary component 2320 of the output component 2300, and a magnet 2720 which changes its position in accordance with the rotation of the gear 2710. The position detecting component 2700 may be configured to detect the shift stage selected by the shaft 2710 via a sensor (not illustrated) such as a Hall sensor by detecting a change in magnetic force according to the position of the magnet 2720. In the second exemplary embodiment of the present disclosure, the rotary component 2320 may be an external gear having gear teeth formed on at least a part of the outer periphery, and may mesh with the gear 2710. Thus, the gear 2710 may rotate with the rotary component 2320. In the second exemplary embodiment of the present disclosure, the position detecting component 2700 may be configured to detect the shift stage via a change in the magnetic force induced by the magnet 2720 which changes position in accordance with the rotation of the gear 2710. However, the present disclosure is not limited thereto. The position detecting component 2700 may be configured to detect the shift stage, by various methods, such as counting the number of slits passing between a light-emitting element and a light-receiving element. In particular, the rotary component 2320 may have different structures such as a structure in which the slits as well as the external gears are formed.

Figure 45:
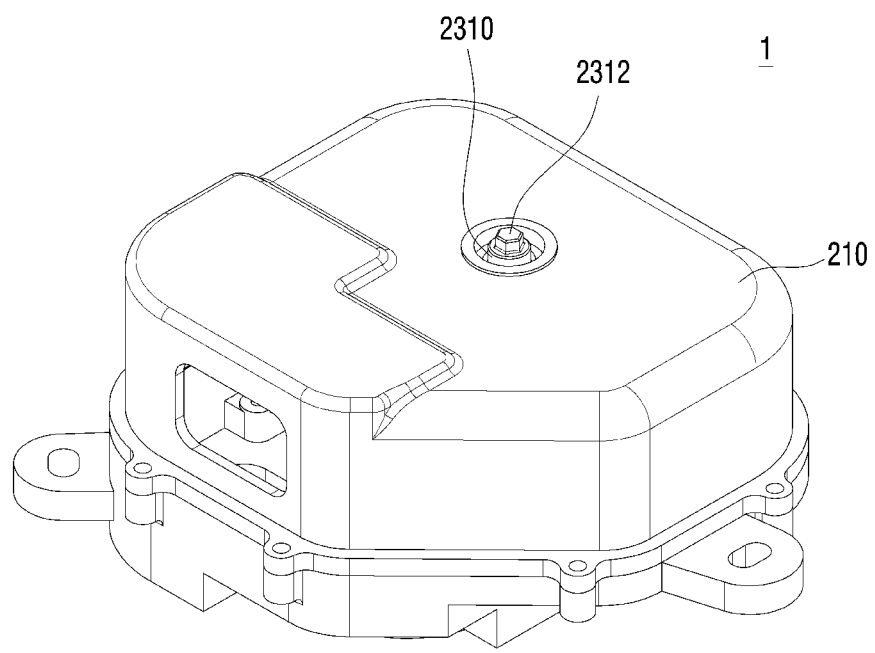
FIGS. 45 and 46 are exemplary perspective views illustrating an external form of the controlling apparatus for the transmission according to another exemplary embodiment of the present disclosure.
Figure 46:
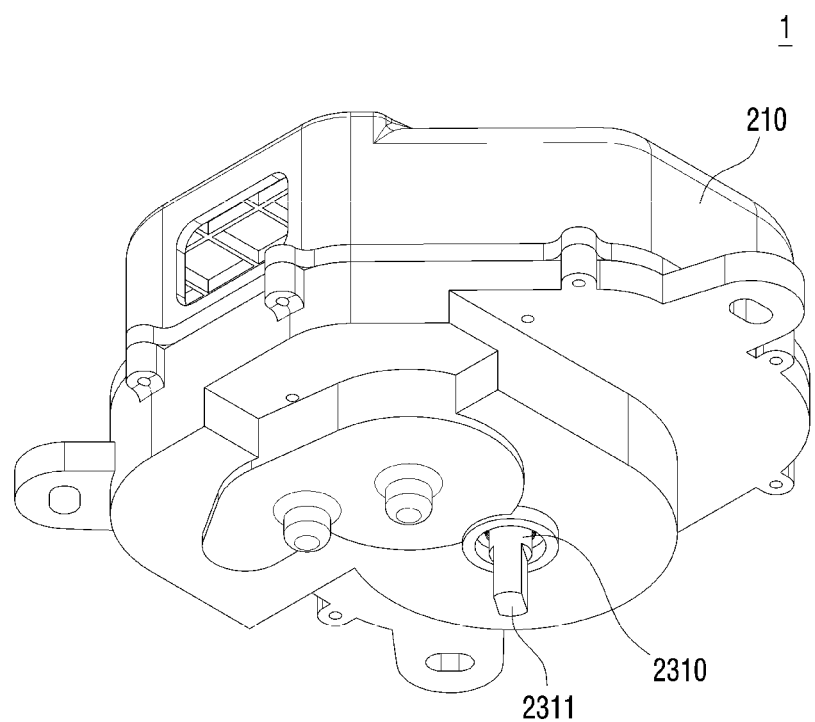

In the second exemplary embodiment of the present disclosure, the initializing procedure is performed by the driving component 2100 when the emergency situation is relieved, but the present disclosure is not limited to this case. When the emergency situation is relieved, but the initializing procedure cannot be performed, for example, due to a failure of the driving component 2100, it is necessary to move the vehicle to repair the vehicle, and therefore, the shaft 2310 may need to be externally rotated in order to manually change the shift stage to a drivable position. In the second exemplary embodiment of the present disclosure, the controlling apparatus 1 of the transmission may be configured to expose both a first end 2311 and a second end 2312 of the shaft 2310 to the exterior of the housing 210 as illustrated in FIGS. 45 and 46. The first end 2311 of the shaft 2310 may be connected to the transmission 3, and a working tool 2313 for rotating the shaft 2310 may be coupled to the second end 2312 of the shaft 2310, to enable an operator to rotate the shaft 2310 with the working tool 2313 and change the vehicle to the drivable shift stage. In the second exemplary embodiment of the present disclosure, a manual operating component having a hexagonal shape is formed at the second end 2312 of the shaft 2310, and the shaft 2310 is rotated by utilizing a socket wrench or the like as the working tool 2313. The disclosure is not limited thereto, and the working tool 2313 may vary based on the shape of the second end 2312 of the shaft 2310.

Figure 47:
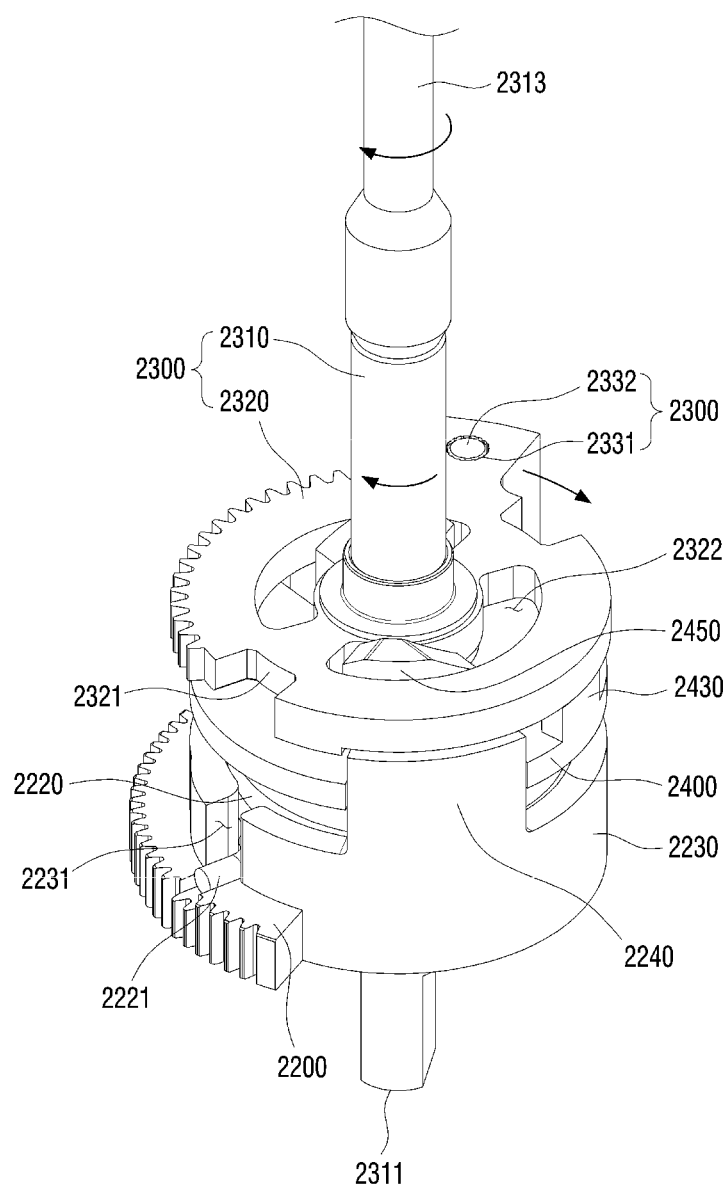
FIGS. 47 to 50 are exemplary schematic views illustrating an output component manually rotated to a non-parking stage by a working tool after returning to the initial stage according to another exemplary embodiment of the present disclosure.
Figure 48:
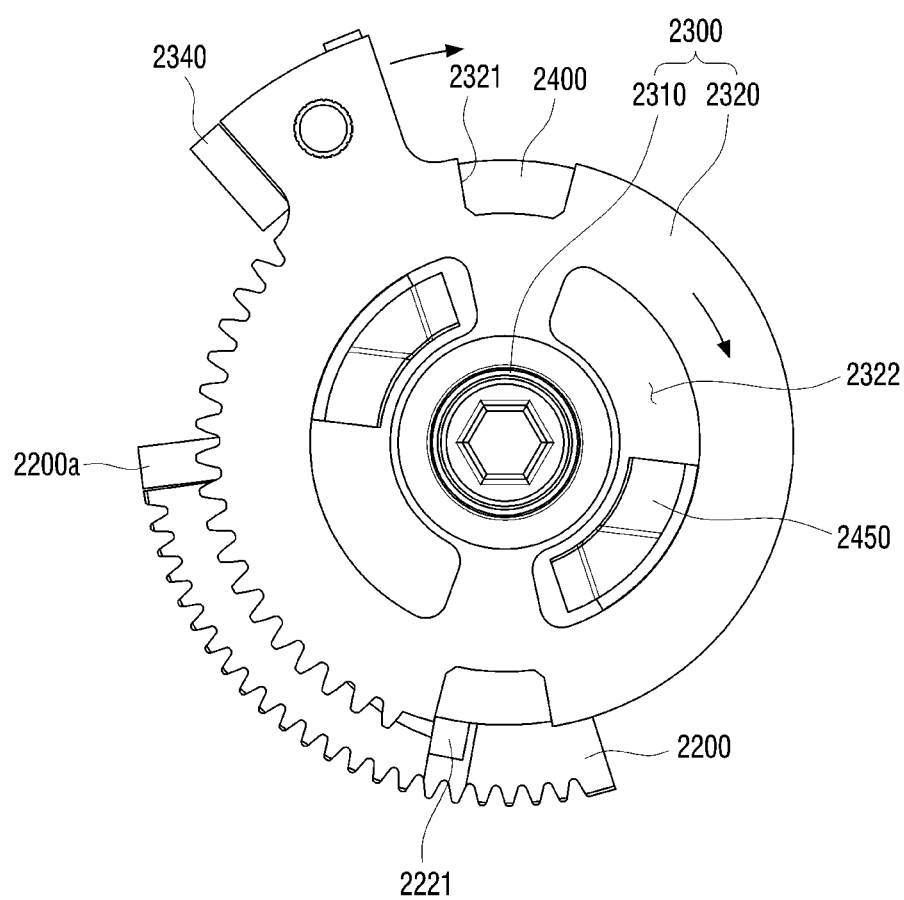
Figure 49:
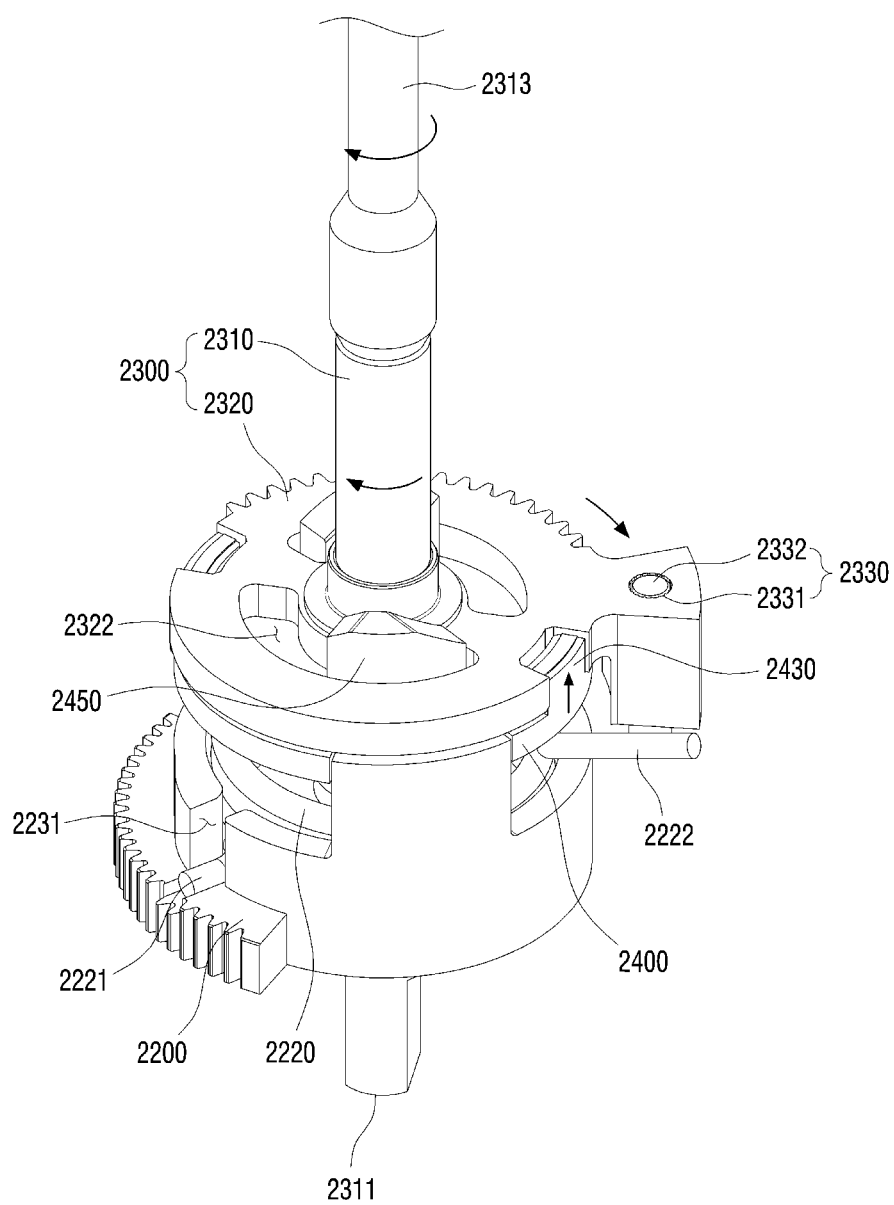
Figure 50:
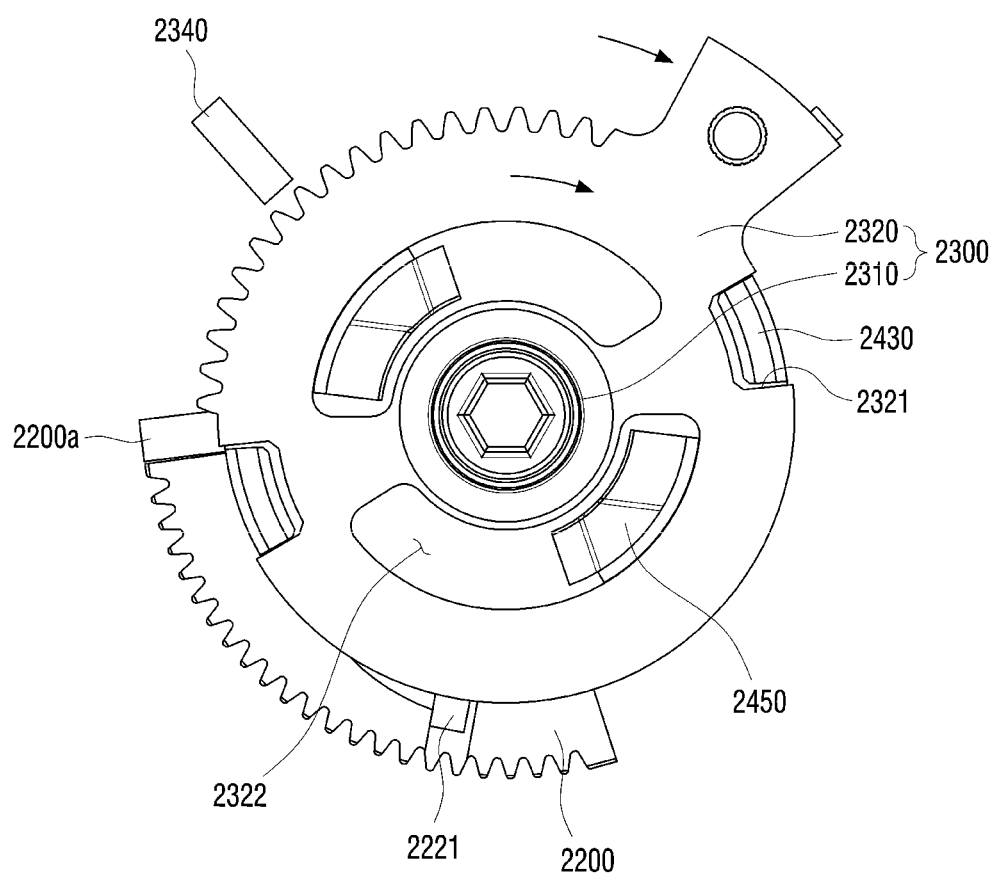

When the initializing procedure is not achieved by the driving component 2100, the operator may couple the working tool 2313 with the second end 2312 of the shaft 2310 to rotate the shaft 2310 as illustrated in FIGS. 47 and 48. In particular, since the rotation of the first gear component 2200 is restricted by the stopper 2200a, the rotary component 2320 can rotate in a direction in which the support portion 2330 moves away from the stopper 2340 with the rotation of the shaft 2310. When the rotary component 2320 rotates and the coupling groove 2321 of the rotary component 2320 aligns with the coupling rib 2430 of the driving force transfer component 2400 as illustrated in FIG. 32, the coupling rib 2430 may be displaced in the direction of being inserted into the coupling groove 2321 by the restoring force of the spring component 2440, and the driving force transfer component 2400 may be coupled with the output component 2300 as illustrated in FIGS. 49 and 50. In particular, the operator may manually rotate the shaft 2310 via the working tool 2313 to change the vehicle to a drivable shift stage. Even when the shaft 2310 is rotated and the vehicle is changed to a drivable shift stage, the shaft 2310 returns to the initial stage position again by the restoring force of the elastic member 2220 when the external force is removed, unless the coupling rib 2430 of the driving force transfer unit 2400 is inserted into the coupling groove 2321 of the rotary member 2320. Therefore, the operator may rotate the shaft 2310 until the coupling groove 2321 of the rotary component 2320 is aligned with the coupling rib 2430 of the driving force transfer component 2400 in order to change the vehicle into a movable shift stage. As shown in FIGS. 46 to 50, the driving component 2100, the second gear component 2500, the returning component 2600, and the position detecting component 2700 are omitted.

In the second exemplary embodiment of the present disclosure, the description has been given for the case where the shaft 2310 is manually rotated by the working tool 2313 to allow the shift operation of the transmission 3 in lieu of a structure where the driving force transfer component 2400 moves away from the rotary component 2320 toward the first gear component 2100 to be separated from the output component 2300. However, the disclosure is not limited thereto, and the disclosure may be similarly applied in a structure where the driving force transfer component 1400 moves toward the first gear component 1200 and the rotary component 1320 to be separated from the output component 1300.

In the above-described exemplary embodiments, the controlling apparatus 1 for the transmission of the present disclosure may be configured such that the transmission 3 may be returned to the initial stage by utilizing the restoring force of the elastic component 1240 and 2220 under emergency situations such as discharging of the battery or the abnormal turning-off of the vehicle. As a result, the transmission 3 may be easily returned to the initial stage, without requiring a separate device for returning the shift stage of the transmission 3 to the initial stage. Thus, the system may be simplified, and the cost may be reduced.

According to the controlling apparatus for the transmission of the present disclosure as described above, there are one or more following effects. Since the shift stage of the transmission may return to the initial stage under the emergency situation such as abnormal turning-off of the vehicle or discharging of the battery, the possibility of a vehicle accident may be prevented.

Those having ordinary skill in the technical field to which the present disclosure pertains will appreciate that the present disclosure may be implemented in other specific forms without changing its technical idea and essential features thereof. It is therefore to be understood that the above-described exemplary embodiments are illustrative in all aspects and not restrictive. It is to be understood that the scope of the present disclosure is defined by the appended claims rather than the above detailed description, and all alternations or modified forms derived from the claims and their equivalent concepts should be interpreted as being within the scope of the present disclosure. In concluding the detailed description, those skilled in the art will appreciate that many variations and modifications can be made to the preferred embodiments without substantially departing from the principles of the present disclosure. Therefore, the disclosed exemplary embodiments of the disclosure are to be used in a generic and descriptive sense only and not for purposes of limitation.

What is claimed is:

1. A controlling apparatus for a transmission, the apparatus comprising:
   a first gear component which is configured to rotate based on a driving force provided from a driving component;
   an output component which is configured to generate an operating force to control the transmission;
   an elastic component in which a first end is fixed and a second end is supported by the output component;
   a driving force transfer component which is configured to be selectively coupled to the output component to transfer the driving force from the first gear component to the output component; and
   a returning component configured to actuate the driving force transfer component to be separated from the output component when at least one returning condition is satisfied,
   wherein the output component includes a shaft configured to be connected to the transmission, and the first gear component and the driving force transfer component are configured to rotate around the shaft, and
   wherein the returning component is configured to cause the driving force transfer component to be axially displaced along the shaft to separate the output component and the driving force transfer component from each other.

2. The controlling apparatus for the transmission of claim 1, wherein the first gear component comprises:
   an extending portion which extends in a lengthwise direction of the shaft from a periphery of a first aperture through which the shaft passes, and a first end of the elastic component is inserted into a fixing groove formed on one side of the extending portion.

3. The controlling apparatus for the transmission of claim 2, wherein the first gear component comprises:
   an insertion rib which is inserted into an insertion groove formed in the driving force transfer component, and the insertion rib is formed to extend from the extending portion toward the driving force transfer component to enable the driving force transfer component to be movable along the insertion rib.

4. The controlling apparatus for the transmission of claim 1, further comprising:
   a rotary component which is coupled with the shaft and rotates around the shaft, having a support portion formed to support the second end of the elastic component.

5. The controlling apparatus for the transmission of claim 4, wherein the support portion is formed on a side of an outer peripheral end of the rotary component, and the support portion includes a support groove; and a support pin inserted into the support groove to support the second end of the elastic component.

6. The controlling apparatus for the transmission of claim 4, wherein the driving force transfer component comprises:
   a coupling rib configured to be selectively inserted into a coupling groove formed in the rotary component, and the coupling rib is detached from the coupling groove when the output component and the driving force transfer component are separated from each other.

7. The controlling apparatus for the transmission of claim 6, wherein the coupling groove comprises:
   a guide surface which is inclined at a predetermined angle from a first end to a second end disposed at one side of a insertion port into which the coupling rib is inserted, and the coupling rib is guided into the coupling groove by the guide surface when the driving force transfer component is rotated by the driving component.

8. The controlling apparatus for the transmission of claim 4, further comprising:

a stopper disposed on a rotary path of the support portion to restrict the rotation of the driving force transfer component,
wherein the output component is configured to rotate to a point where the support portion abuts the stopper to enable the shaft to be rotated to a parking stage position.

9. The controlling apparatus for the transmission of claim 8, wherein, after the output component and the driving force transfer component are separated from each other and the shaft is returned to the parking stage position, the driving component is configured to rotate the first gear component to enable the output component and the driving force transfer component to be coupled with each other and the elastic component to be compressed.

10. The controlling apparatus for the transmission of claim 4, further comprising:
a second gear component which is configured to rotate about the shaft to enable the driving force transfer component to be separated from the output component.

11. The controlling apparatus for the transmission of claim 10, wherein the returning component is configured to rotate the second gear component to enable the driving force transfer component to be axially displaced along the shaft to separate the output component and the driving force transfer component from each other.

12. The controlling apparatus for the transmission of claim 10, wherein the second gear component is configured to displace the driving force transfer component away from the rotary component and toward the first gear component, to enable the output component and the driving force transfer component to be separated from each other.

13. The controlling apparatus for the transmission of claim 10, wherein the driving force transfer component has a first protruding portion formed on a surface facing the second gear component, the second gear component has a second protruding portion formed on a surface facing the driving force transfer component, and the first protruding portion and the second protruding portion have the same rotary path.

14. The controlling apparatus for the transmission of claim 13,
wherein the first protruding portion and the second protruding portion have inclined contact surfaces that are configured to abut each other, and
wherein the driving force transfer component is configured to be separated from the output component when one of the first protruding portion or the second protruding portion is disposed on the upper side of the other thereof.

15. The controlling apparatus for the transmission of claim 13, wherein the first protruding portion is disposed to protrude toward the second gear component through a passage aperture formed in the rotary component.

16. The controlling apparatus for the transmission of claim 15, wherein the first protruding portion is configured to be disposed at a first end of the passage aperture by the restoring force of the elastic component when the output component and the driving force transfer component are separated from each other, and the first protruding portion is configured to be disposed at a second end of the passage aperture while the elastic component is compressed when the output component and the driving force transfer component are coupled with each other.

17. The controlling apparatus for the transmission of claim 1, wherein the first gear component includes a first rod formed to pass through an insertion aperture formed in the output component, and the driving force transfer component includes a second rod coupled to the first rod through the insertion aperture.

18. The controlling apparatus for the transmission of claim 17, wherein the first rod is configured to be disposed at a first end of the insertion aperture while the elastic component is compressed when the output component and the driving force transfer component are coupled with each other, and
wherein the first rod is configured to be disposed at a second end of the insertion aperture by the restoring force of the elastic component when the output component and the driving force transfer component are separated from each other.

19. The controlling apparatus for the transmission of claim 17, wherein the first rod or the second rod has an insertion groove formed therein, and the other of the first or second rods is inserted into the insertion groove.

20. The controlling apparatus for the transmission of claim 19, wherein a spring component is disposed in the insertion groove formed in the first rod or the second rod to enable position of the driving force transfer component to be variable by movement of the second rod in a direction of compressing or relaxing the spring component.

* * * * *